US007216350B2

(12) United States Patent
Martin et al.

(10) Patent No.: US 7,216,350 B2
(45) Date of Patent: May 8, 2007

(54) METHODS AND APPARATUS FOR CALL SERVICE PROCESSING BY INSTANTIATING AN OBJECT THAT EXECUTES A COMPILED REPRESENTATION OF A MARK-UP LANGUAGE DESCRIPTION OF OPERATIONS FOR PERFORMING A CALL FEATURE OR SERVICE

(75) Inventors: Robert Martin, Coral Springs, FL (US); Jared Dubin, Coconut Creek, FL (US); Jeff Williamson, Boca Raton, FL (US); Cathy Tio, Boca Raton, FL (US)

(73) Assignee: CopperCom, Inc., Boca Raton, FL (US)

( * ) Notice: Subject to any disclaimer, the term of this patent is extended or adjusted under 35 U.S.C. 154(b) by 372 days.

(21) Appl. No.: 09/823,940

(22) Filed: Mar. 30, 2001

(65) Prior Publication Data

US 2002/0085696 A1 Jul. 4, 2002

Related U.S. Application Data

(60) Provisional application No. 60/193,701, filed on Mar. 31, 2000, provisional application No. 60/193,807, filed on Mar. 31, 2000, provisional application No. 60/193,809, filed on Mar. 31, 2000, provisional application No. 60/193,700, filed on Mar. 31, 2000.

(51) Int. Cl.
*G06F 9/44* (2006.01)
*G06F 15/16* (2006.01)

(52) U.S. Cl. .................. 719/315; 709/217; 379/201.01

(58) Field of Classification Search ............... 379/265, 379/201.01, 201.02, 201.03; 709/244, 311, 709/315, 316, 318, 332, 200–205, 217–224; 718/310–318, 100–104; 719/315–318, 310–312, 719/331, 332; 362/357.1; 455/400, 401, 455/415–425; 715/513; 717/100, 114
See application file for complete search history.

(56) References Cited

U.S. PATENT DOCUMENTS

| 4,656,624 A | 4/1987 | Collins et al. |
| 4,757,497 A | 7/1988 | Beierle et al. |
| 4,771,425 A | 9/1988 | Baran et al. |

(Continued)

FOREIGN PATENT DOCUMENTS

| EP | 000789470 A2 | 8/1997 |
| JP | 402065498 A | 3/1990 |
| JP | 404324734 A | 11/1992 |

(Continued)

OTHER PUBLICATIONS

V/IP Phone/Fax IP Gateway, Analog Models NetWare and DOS User's Manual, 232pp. (Sep. 1997).
"ADC Provides Homeworx™ Telephony System to Nanjing CATV," printed from stele.adc.com, 1 pg. (Sep. 13, 2000).
Final Network Status Report, LEARN-ED Deliverable 12, 22 pp. (Mar 10, 1997).

(Continued)

*Primary Examiner*—John Follansbee
*Assistant Examiner*—Haresh Patel
(74) *Attorney, Agent, or Firm*—David J. Powsner; Reza Mollaaghababa; Nutter McClennen & Fish LLP

(57) ABSTRACT

Improved methods and apparatus for telecommunications call service and call feature processing utilize a compiled representation of a textual description in a mark-up language of operations describing a telecommunication service is generated. Objects access this compiled representation, in response to events occurring with respect to a telecommunication service, in order to cause operations represented in the compiled representation to be executed.

13 Claims, 75 Drawing Sheets

U.S. PATENT DOCUMENTS

| | | | |
|---|---|---|---|
| 4,872,158 A | 10/1989 | Richards | |
| 4,872,159 A | 10/1989 | Hemmady et al. | |
| 4,872,160 A | 10/1989 | Hemmady et al. | |
| 4,893,302 A | 1/1990 | Hemmady et al. | |
| 4,899,333 A | 2/1990 | Roediger | |
| 4,922,486 A | 5/1990 | Lidinsky et al. | |
| 4,949,373 A | 8/1990 | Baker, Jr. et al. | |
| 4,958,341 A | 9/1990 | Hemmady et al. | |
| 4,977,556 A | 12/1990 | Noguchi | |
| 5,282,244 A | 1/1994 | Fuller et al. | |
| 5,329,619 A | 7/1994 | Page et al. | |
| 5,341,374 A | 8/1994 | Lewen et al. | |
| 5,384,840 A | 1/1995 | Blatchford et al. | |
| 5,452,289 A | 9/1995 | Sharma et al. | |
| 5,453,986 A | 9/1995 | Davis et al. | |
| 5,463,629 A | 10/1995 | Ko | |
| 5,535,204 A | 7/1996 | Li | |
| 5,550,906 A | 8/1996 | Chau et al. | |
| 5,553,063 A | 9/1996 | Dickson | |
| 5,568,475 A | 10/1996 | Doshi et al. | |
| 5,581,596 A | 12/1996 | Hogan | |
| 5,583,872 A | 12/1996 | Albrecht et al. | |
| 5,617,423 A | 4/1997 | Li et al. | |
| 5,619,508 A | 4/1997 | Davis et al. | |
| 5,636,218 A | 6/1997 | Ishikawa et al. | |
| 5,646,947 A * | 7/1997 | Cooper et al. | 370/510 |
| 5,659,541 A | 8/1997 | Chan | |
| 5,706,286 A | 1/1998 | Reiman et al. | |
| 5,726,984 A | 3/1998 | Kubler et al. | |
| 5,742,596 A | 4/1998 | Baratz et al. | |
| 5,751,706 A | 5/1998 | Land et al. | |
| 5,757,895 A | 5/1998 | Aridas et al. | |
| 5,764,628 A | 6/1998 | Davis et al. | |
| 5,764,750 A | 6/1998 | Chau et al. | |
| 5,787,088 A | 7/1998 | Dagdeviren et al. | |
| 5,799,317 A | 8/1998 | He et al. | |
| 5,822,420 A | 10/1998 | Bolon et al. | |
| 5,841,840 A | 11/1998 | Smith et al. | |
| 5,841,841 A | 11/1998 | Dodds et al. | |
| 5,848,069 A | 12/1998 | Milne et al. | |
| 5,862,134 A | 1/1999 | Deng | |
| 5,867,494 A * | 2/1999 | Krishnaswamy et al. | 370/352 |
| 5,867,495 A * | 2/1999 | Elliott et al. | 370/352 |
| 5,881,060 A | 3/1999 | Morrow et al. | |
| 5,889,845 A | 3/1999 | Staples et al. | |
| 5,901,205 A | 5/1999 | Smith et al. | |
| 5,945,989 A * | 8/1999 | Freishtat et al. | 345/760 |
| 5,970,066 A | 10/1999 | Lowry et al. | |
| 5,974,135 A | 10/1999 | Breneman et al. | 379/265 |
| 5,978,373 A | 11/1999 | Hoff et al. | |
| 5,987,102 A | 11/1999 | Elliott et al. | |
| 5,991,389 A * | 11/1999 | Ram et al. | 379/230 |
| 5,995,831 A * | 11/1999 | Gulliford et al. | 455/426.1 |
| 5,999,525 A * | 12/1999 | Krishnaswamy et al. | 370/352 |
| 5,999,965 A | 12/1999 | Kelly | |
| 6,009,469 A | 12/1999 | Mattaway et al. | |
| 6,021,158 A | 2/2000 | Schurr et al. | |
| 6,026,087 A | 2/2000 | Mirashrafi et al. | |
| 6,029,203 A | 2/2000 | Bhatia et al. | 709/244 |
| 6,034,953 A | 3/2000 | Smith, Jr. | |
| 6,058,104 A | 5/2000 | Snelling et al. | |
| 6,061,392 A | 5/2000 | Bremer et al. | |
| 6,069,879 A | 5/2000 | Chatter | |
| 6,072,865 A | 6/2000 | Haber et al. | |
| 6,075,784 A | 6/2000 | Frankel et al. | |
| 6,081,591 A | 6/2000 | Skoog | |
| 6,104,796 A | 8/2000 | Kasrai | |
| 6,108,704 A | 8/2000 | Hutton et al. | |
| 6,125,113 A | 9/2000 | Farris et al. | |
| 6,131,162 A | 10/2000 | Yoshiura et al. | |
| 6,134,446 A | 10/2000 | Sasuta et al. | |
| 6,144,723 A * | 11/2000 | Truchon et al. | 379/88.01 |
| 6,188,760 B1 | 2/2001 | Oran et al. | |
| 6,226,286 B1 * | 5/2001 | Danne et al. | 370/352 |
| 6,229,803 B1 | 5/2001 | Bog et al. | |
| 6,289,382 B1 * | 9/2001 | Bowman-Amuah | 709/226 |
| 6,332,163 B1 * | 12/2001 | Bowman-Amuah | 709/231 |
| 6,333,931 B1 * | 12/2001 | LaPier et al. | 370/385 |
| 6,335,927 B1 * | 1/2002 | Elliott et al. | 370/352 |
| 6,339,832 B1 * | 1/2002 | Bowman-Amuah | 714/35 |
| 6,343,318 B1 * | 1/2002 | Hawkins et al. | 709/219 |
| 6,345,307 B1 * | 2/2002 | Booth | 709/247 |
| 6,370,141 B1 * | 4/2002 | Giordano et al. | 370/386 |
| 6,407,997 B1 | 6/2002 | DeNap et al. | |
| 6,434,568 B1 * | 8/2002 | Bowman-Amuah | 707/103 R |
| 6,434,628 B1 * | 8/2002 | Bowman-Amuah | 714/48 |
| 6,438,594 B1 * | 8/2002 | Bowman-Amuah | 709/225 |
| 6,442,748 B1 * | 8/2002 | Bowman-Amuah | 717/108 |
| 6,477,580 B1 * | 11/2002 | Bowman-Amuah | 709/231 |
| 6,477,665 B1 * | 11/2002 | Bowman-Amuah | 714/39 |
| 6,490,564 B1 * | 12/2002 | Dodrill et al. | 704/275 |
| 6,493,447 B1 * | 12/2002 | Goss et al. | 379/265.09 |
| 6,496,850 B1 * | 12/2002 | Bowman-Amuah | 709/203 |
| 6,502,213 B1 * | 12/2002 | Bowman-Amuah | 714/49 |
| 6,529,909 B1 * | 3/2003 | Bowman-Amuah | 707/10 |
| 6,529,948 B1 * | 3/2003 | Bowman-Amuah | 709/217 |
| 6,535,506 B1 * | 3/2003 | Narain et al. | 370/352 |
| 6,539,396 B1 * | 3/2003 | Bowman-Amuah | 707/103 R |
| 6,549,949 B1 * | 4/2003 | Bowman-Amuah | 709/236 |
| 6,550,057 B1 * | 4/2003 | Bowman-Amuah | 717/126 |
| 6,571,282 B1 * | 5/2003 | Bowman-Amuah | 709/219 |
| 6,578,068 B1 * | 6/2003 | Bowman-Amuah | 709/203 |
| 6,597,689 B1 * | 7/2003 | Chiu et al. | 370/354 |
| 6,601,192 B1 * | 7/2003 | Bowman-Amuah | 714/38 |
| 6,601,234 B1 * | 7/2003 | Bowman-Amuah | 717/108 |
| 6,606,660 B1 * | 8/2003 | Bowman-Amuah | 709/227 |
| 6,606,744 B1 * | 8/2003 | Mikurak | 717/174 |
| 6,615,199 B1 * | 9/2003 | Bowman-Amuah | 706/50 |
| 6,615,253 B1 * | 9/2003 | Bowman-Amuah | 709/219 |
| 6,636,242 B2 * | 10/2003 | Bowman-Amuah | 715/764 |
| 6,640,238 B1 * | 10/2003 | Bowman-Amuah | 709/201 |
| 6,640,244 B1 * | 10/2003 | Bowman-Amuah | 709/207 |
| 6,640,249 B1 * | 10/2003 | Bowman-Amuah | 709/228 |
| 6,671,818 B1 * | 12/2003 | Mikurak | 714/4 |
| 6,715,145 B1 * | 3/2004 | Bowman-Amuah | 718/101 |
| 6,724,747 B1 | 4/2004 | Arango et al. | |
| 6,731,625 B1 * | 5/2004 | Eastep et al. | 370/352 |
| 6,742,015 B1 * | 5/2004 | Bowman-Amuah | 718/101 |
| 6,754,181 B1 * | 6/2004 | Elliott et al. | 370/252 |
| 6,772,139 B1 * | 8/2004 | Smith, III | 707/3 |
| 6,804,716 B1 * | 10/2004 | Koch et al. | 709/225 |
| 6,842,906 B1 * | 1/2005 | Bowman-Amuah | 719/330 |
| 2001/0028649 A1 | 10/2001 | Pogossiants et al. | |
| 2003/0058277 A1 * | 3/2003 | Bowman-Amuah | 345/765 |

FOREIGN PATENT DOCUMENTS

| | | |
|---|---|---|
| JP | 406105384 A | 4/1994 |
| JP | 406338887 A | 12/1994 |
| JP | 407307789 A | 11/1995 |
| JP | 408111692 A | 4/1996 |
| JP | 408274812 A | 10/1996 |
| JP | 409214484 A | 8/1997 |
| JP | 409247214 A | 9/1997 |
| JP | 410051453 A | 2/1998 |
| JP | 410126819 A | 5/1998 |
| WO | WO 97/23078 | 6/1997 |
| WO | WO 97/27692 | 7/1997 |
| WO | WO 98/118235 | 4/1998 |
| WO | WO 98/20701 | 5/1998 |

WO WO 99/34612 7/1999

OTHER PUBLICATIONS

*IBM Nways ATM Solutions Fact Sheet*, "Award-winning, industry-leading, low-cost, end-to-end ATM solutions," pp. 1-15 (Mar. 11, 1997).
"Dual Path Receiver Added to ADC's Line of Homeworx™ AM Transmission Products," printed from stele.adc.com, 1 pg. (Sep. 13, 2000).
Micom, Cell Relay for SUB T1/E1 Networks, Overview: Data, Voice, Fax, and LAN Integration, 19pp. (1995).
Yang et al., "A Taxonomy for Congestion Control Algorithms in Packet Switching Networks," *IEEE Network Magazine*, vol. 9, pp. 1-17 (1995).
Grant Lenahan, Executive Director, NGN Solutions Bellcore, "Next Generation Networks—A Practical View of Network Evolution", pp. 1-10, May 9, 1999.
Mauricio Arango et al., Internet Engineering Task Force, "Media Gateway Control Protocol—(MGCP)" Nov. 9, 1998, pp. 1-88, internet draft, version 0.1 draft, expires May 9, 1999, www.normos.org/ietf/draft/draft-ietf-iptel-cpl-00.txt.
IntelliSwitch, "Benefits of the Intelliswitch Gateway vs. Router Based Products", Jun. 21, 1999 [internet] www.intelliswitch/com/frame.htm?pg=200.
Internet Engineering Task Force, "CPL: A Language for User Control of Internet Telephone Services" [internet draft, expires Sep. 1999] pp. 1-21, www.normos.org/ietf/draft/draft-ietf-iptel-cpl-00.txt.
Paula Bernier, "Telephone Switch Vendors Target Internet", www.zdnet.com/intweek/daily/960627b.htm., Jun. 27, 1996.
Kathleen Cholewka, "Smart Networks Gain A Platform", Inter@active week, Jul. 26, 1999, www.zdnet.com/intweek.stories/news.
"A Network View of Service Agent and CAML Servers and their relationship with other network components", May 9, 1999.
KMJ Communications Radius, "Remote Authentication Dial-In User Service" Remote Network Access Security in an Open Systems Environment, Jun. 21, 1999, www.kmj.com/radius.html.
"Call-agent software: Another Step to Next-Generation Networks", Exchange Magazine—winter 1999 www.bellcore.com/newsroom/knowledgebase/.
"Knowledge Base" www.bellcore.com:8822/query.html?bhu=, May 1999.
Christian Huitema, Internet Architecture Research Laboratory, "Who We Are", www.bellcore.com/research/whoware/staff/ May 1999.
"Our Latest Thinking", www.bellcore.com/research/thinking.html, May 1999.
"Call Processing Language Framework and Requirements," Internet Engineering Task Force (Internet-Draft) Columbia University, The Internet Society, Oct. 22, 1999.
Telephony and data networks, Internet for Business (4 pp.) Mar. 1, 1997.
*Homeworx Dual Tech System for Circuit-Switched and IP Telephony*, ADC Telecommunications, Inc., 6 pp. (1998).
Search results for articles about Vienna Systems and voice, or data or integrat, 36pp. (1997, 1998).
Search results for articles about Vina/100 bundle, 52pp. (1997, 1998).
AG Communication Systems, "Infrastructure for DSL Solutions—AGCS," by Mark Emery, printed from agcs.com/techpapers/dsl_inf.htm, pp. 1-6 (Sep. 13, 2000).
Search results for articles about Homeworx access platform and ADC, 10pp. (1995-1996).
Profiling the Current Market, Telecommunications Americas Edition, vol. 32, 5 pp. (Oct. 1998).
RHCs Handle IP the Vienna Way, InternetTelephony News Of The Week, 2pp. (Sep. 3, 1996).
Telephony over IP Statement of Work, "ANA Project Completion Report on CA*Phonell: Telephony over IP," printed from enfm..utcc.utoronto.ca/c2/voip/Final-Report.html, pp. 1-7 (Sep. 2, 2000).
Vienna way: Doing It Your Way, PC Magazine Online, 4pp. (Oct. 21, 1997).
Asymmetric Digital Subscriber Line, Alcatel 1000 ADSL, 1 pg. (Sep. 13, 2000).
PowerVoice Illustration, 1p, Apr. 1997.
26 of 150 Documents, PR Newswire Association, Inc., "ADC Receives Contract to Develop Cable Telephony Network for Scandinavian Service Provider Netcom," 2 pp. (Oct. 20, 1997).
Table of Contents, Cisco Systems Users Magazine, 36pp. (1997).
NetSpeak Corporation to Exhibit First Release of Voice over IP, IP-to-PSTN Networking Products, NetSpeak Corporation Press Release. 3 pp. (Sep. 25, 2000).
V/IP: Phone/Fax IP Gateway, The Micom V/IP Phone/Fax IP Gateway, http:www3.nortelnetworks.com/product/vip/together.html, 4pp. (Sep. 18, 2000).
Micom sends Voice over IP net., Business Communications Review, vol. 26, pp. 22-23 (Dec. 1, 1996).
V/IP: Phone/Fax IP Gateway, Applications Guide: Complete Voice and Fax Integration Over IP Networks, http:www3.nortelnetworks.com/product/vip/cov.html, 2pp. (Sep. 18, 2000).
Micom V/IP gateway saves TexasBank 42,200 per month; Article May 6, 1997.
V/IP: Phone/Fax IP Gateway, Putting It All Together, http:www3.nortelnetworks.com/product/vip/together.html, 6pp. (Sep. 18, 2000).
Voice-over-DSL patent battle looming?, Network World Fusion, 3 pp. (Sep. 3, 2000).
MICOM showcases new V/IP phone/fax IP gateway at Internet World, 2 pp. (Dec. 11, 1996).
Thompson, George A., Micom Communications Corp, Corporate Profile, Digital Age, v16, n6, p7(1), 3pp. (Jun. 1997).
VINA Technologies, M2 Presswire, 4 pp. (Jul. 15, 1998).
David P. Koester, "Fiber Distributed Digital Interface (FDDI)," 1 pg. (Oct. 22, 1995).
Micom, Integrated Networking: Voice and Fax Share LAN/WAN Connections, 16pp. (1995).
Micom: Marathon Data/Voice WAN Solutions, Applications Guide, 56pp. (1997).
Computer Telephony, vol. 5, Issue 4, 3 pp. (Apr. 1997).
Short, Kristin Illene, "Towards Integrated Intranet Services: Modeling the Costs of Corporate IP Telephony", Massachusetts Institute of Technology, 80pp. (Sep. 1997).
Sears, Andrew Lester, "Directory Services for Internet Telephony: Creating a Spanning Layer Over the Internet and Telephone Networks", Massachusetts Institute of Technology, 39pps. (Aug. 8, 2000).
"Fast & Furious," MICOM Communications Corp., 1 pg. (May 15, 1997).
Press Release: CLECS and Service Providers Line Up Behind VINA Technologies' T1 Integrator, 3 pp. (May 5, 1998).
Nortel Networks, Products Documentation Webpage, 2pp.
Powerpoint Presentation to MCI, Reducing the Cost of Network Access, 28 pp. (Dec. 9, 1997).
Cisco Introduces First Internetworking Routers with Built-In DSR/CSU Telecommunications Functionality, printed from leng.com/warp/public/146/pressroom/1996/Mar96, 2 pp. (Sep. 6, 2000).
CopperCom, Creating Voice Services Over Broadband, 19 pp. (Sep. 2, 2000).
V/IP: Phone/Fax IP Gateway, V/IP Applications, http:www3.nortelnetworks.com/products/vip/application.html, 3pp. (Sep. 18, 2000).
Corporate Fact Sheet, CopperCom—Company Info, 3 pp. (Sep. 2, 2000).
Kenneth Guy, Business Landscape, "Save as you speak," *The Daily Yomiuri*, 5 pp. (Feb. 19, 1997).
Micom, V/IP Voice Gateway, PC Magazine Online, 3 pp. (Oct. 21, 1997).
Zooming toward 2000, Special Report: China; ISSN: 1067-6317, 5 pp. (Nov. 1996).
Inter-Tel Illustration from Apr. 1997, 1p.
Computer Telephony, vol. 4, Issue 9, 5 pp. (Dec. 1996).
Joe Rinde, "Telephony in the Year 2003," MCI, Powerpoint presentation, 20 pp. (Mar. 31, 1998).

IAC (SM) Newsletter Database (TM), Broadband: ADC Creates Broadband Communications Division,: printed from Lexis-Nexis, pp. 3-5 (Aug. 26, 1996).

Micom Netrunner 75E, Integration Router, 4 pp. (Sep. 20, 2000).

122 Computer Telephony, Best of Show, "UNPBXs Becoming the Rage" (Apr. 1997).

Mishra, et al., "A Hop by Hop Rate-based Congestion Control Scheme," pp. 112-123 (1992).

Steve Craddock, "Advancing IP Telephony with Residential Broadband," Spring '98 VON Conference, Powerpoint presentation, 17 pp. (Apr. 1, 1998).

Chris Fair, et al., "Strategic Report Regarding The Deployment of ATM Within NCAR/UCAR," National Center for Atmospheric Research, 25 pp. (Sep. 3, 2002).

Computer Telephony, vol. 4, Issue 12, 3 pp. (Sep. 1996).

Metropolitan-area Networks, IEEE Spectrum, pp. 40-42 (May 1990).

Storage Admin (Windows & NET Magazine Network), NY News Network, 9 pp. (Sep. 3, 2002).

PC Magazine: Divide and Conquer, "Now your company can communicate like the big guys. A sub-T1 leased line—plus a low-end multiplexer—boosts connections," 1 pg., (Feb. 6, 1996).

Applications Guide, Complete Voice and Fax Integration Over IP Networks, V/IP Phone/Fax IP Gateway, 15 pp. (Sep. 10, 2000).

Lexis-Nexis printout: T1: CLECS and Service Providers Line Up Behind VINA Technologies' T1 Integrator, 3 pp. (May 11, 1998).

Lexis-Nexis printout: More on Vina's T1 Integrator For Voice, Data, 2 pp. (Jun. 3, 1997).

Micom News Release, Voice/IP Gateway to Interoperate with Microsoft NetMeeting 2.0 for OffNet Calling, 2pp. (Apr. 28, 1997).

V/IP: Phone/Fax IP Gateway, How V/IP Works, http:www3.nortelnetworks.com/product/vip/how.html, 4pp. (Sep. 18, 2000).

Voice Across the Internet, PC Magazine Online, 2pp. (Oct. 21, 1997).

Search results for articles about Homeworx and Voice and ADC, 25pp. (1996, 1997).

Search results for articles about Vienna Systems and Voice, Video or LAN, 18pp. (1996, 1997).

Lucent Technologies Press Release, "Lucent Technologies and VINA Technologies to Integrate voice and data onto single line, reducing network costs," 2 pp. (Jun. 2, 1998).

FOCUS—88 of 89 Stories, Business Wire, Inc., 6 pp., Mar. 5, 1996, Wednesday.

ADC Telecommunications, Homeworx™ is HFComplete: A Lifeline White Paper, 4 pp., printed from bbg.adc.com/Education/HFC/stories/lifeline.index.html (Sep. 13, 2000).

Table of Contents, Cisco Systems Users Magazine, pp. 1-37 (Sep. 10, 2000).

Lexis-Nexis printout: Workgroup router: NetRunner Integration Router; Micom; 1996 Products of the Year; Product InformationBrief Article, vol. 11, 28 pp. (Sep. 20, 2000).

CopperCom's Integrated Access System for Residences, Small Office Home Offices, and Small Businesses, Requirements Document, Version 1.0, 33 pp. (Oct. 27, 1997).

ADC Telecommunications-Annual Report, "To our Shareholders," printed from media.corporate-ir.net/media...adct/adct_980909_®_100/letter.htm, pp. 1-3 (Sep. 13, 2000).

Paradyne Press Release, Paradyne and e-Net Join Forces to Deliver Low-Cost, high-Speed Hig-Fidelity DSL-Supercharged Data Telephony, 4pp. (Jun. 9, 1997).

Search results for articles about Alcatel and Pots Splitter, 26pp. (1998).

"ADC Introduces HomeworxT Forward Path Receiver for Hub and Office Environments," Press Release printed from stele.adc.com, 1 pg. (Sep. 13, 2000).

Yang, et al., "A Taxonomy for Congestion Control Algorithms in Packet Switching Networks," *IEEE Network Magazine*, vol. 9, 16 pp., Jul./Aug. 1995.

Micom Surpasses 1,200 Voice/IP Gateway—vol. 9, pp. 6-7 (Apr. 1997).

Dialog printout, No. 131., 29/9/131 (Item 114 from file 275), pp. 56-58 (Aug. 1, 2000).

ADC Telecommunications, Inc., "High-Performance Homeworx™ 1550nm Optical Headend Platform Increases Capabilities for Distribution and Supertrunking," 1 pg. (Jun. 4, 1997).

William Stallings, Ph.D., Data and Computer Communications, Chapter 14, Internetworking, 33 pp. (1988).

Micom, V/IP Phone/Fax IP Gateway, Voice Interface Cards and PC Software, 6pp. (1997).

Nortel Networks, Media Center: News and Events, 2pp. (Sep. 27, 2000).

Description of CopperCom, Inc. , Chapter 1, Introduction, through Chapter 9, Financial Projections, 37 pp. (Oct. 27, 1997).

Reference: Rulemaking 8775—ACTA Petition on Internet Telephony—ACTA Petition on Internet Telephony before the Federal Communications Commission, 15pp. (Oct. 11, 2005).

T. Kent Elliott, powerpoint presentation: The Effect of Internet Telephony on Business, 39 pp. (1996).

John Peters, "Voice on the Net, Commercialization of Internet Telephony," Powerpoint presentation, 20 pp. (1996).

Complete Voice and Fax Integration Over IP Networks, VIP Phone/Fax IP Gateway, 8 pp. (1996).

Jeffrey R. Shapiro, "Computer Telephony Strategies," Chapter 12: CT and the Cyberspace Phenominon, 8 pp. (1996).

Jeffrey R. Shapiro, "Computer Telephony Strategies," Chapter 5: CTI, p. 102 and Chapter 12: CT and the Cyberspace Phenomenon, p. 248. (1996).

Micom Press, Welcome to Micom's Press Release Page, 4pp. (Sep. 27, 2000).

Enhancing LAN/WAN Networks, "Integrating Data Voice Fax Lan," by Kenneth R. Guy, Vice President, Marketing and Corporate Strategy, MICOM Communications Group, 20 pp. (1996).

Remote Terminal Server for Marathon Integrations Products, 2 pp. (1997).

David D. Bezar, "LAN times Guide to Telephony," 3 pp., 1995.

Nortel Networks, Products V/IP webpage, 2pp. (Sep. 27, 2000).

Bandwidth Management Technologies, An Introduction to Micom's Frame Relay, Cell Relay and Fast Packet Technologies, Part 1: MicroBand ATM Cell Relay, 31 pp. (1995).

\* cited by examiner

| Feature Mask | Feature Logic Object |
|---|---|
| 000 | NULL |
| 001 | CND_FLO |
| 010 | CFBL_FLO |
| 011 | CFBL_FLO |
| 100 | CW_FLO |
| 101 | CW_CND_FLO |
| 110 | CW_CFBL_FLO |
| 111 | CW_CFBL_CND_FLO |

30A feature mask = abc where bit a – Call Waiting (CW)

bit b – Call Forwarding Busy Line (CFBL)

bit c – Calling Number Delivery (CND)

User defined features are not included in this table.

Figure 8

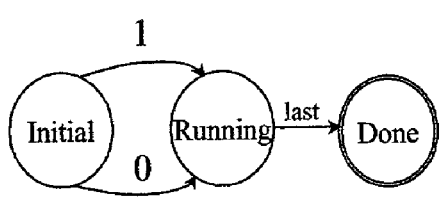

```
(EvenParityLogic
    (Initial  (1Bit   (() (Set odd)          (Running))
              (0Bit   (() (Set even)         (Running))
              (Last   (() (Print "Error!")(Initial))
        )
    (Running  (1Bit   ((IsOdd?) (Set even) (Running))
                      ((IsEven?)(Set odd)  (Running))
              )
              (0Bit   (() () (Running))
              )
              (Last   ((IsOdd?) (Print "Bad!") (Done))
                      ((IsEven?)(Print "Good!")(Done))
              )
        )
    (Done   ())
    )
```

```
(OddParityLogic
    (Initial  (1Bit   (() (Set odd)          (Running))
              (0Bit   (() (Set even)         (Running))
              (Last   (() (Print "Error!")(Initial))
        )
    (Running  (1Bit   ((IsOdd?) (Set even) (Running))
                      ((IsEven?)(Set odd)  (Running))
              )
              (0Bit   (() () (Running))
              )
              (Last   ((IsOdd?) (Print "Good!")(Done))
                      ((IsEven?)(Print "Bad!") (Done))
              )
        )
    (Done   ())
    )
```

Figure 19

```
(LogicName
    (StateName
        (EventName
            ((Predicate)
                (ActionName ())
                (ActionName (ParamSpec,..))
                (StateName)
            )
            (() (ActionName (ParamSpec,..))
                (ActionName (ParamSpec,..))
                (StateName)
            )
        )
        (EventName
            ((Predicate)
                (ActionName (ParamSpec,..))
                (ActionName (ParamSpec,..))
                (StateName)
            )
            (() (ActionName (ParamSpec,..))
                (ActionName (ParamSpec,..))
                (StateName)
            )
        )
    )
    (StateName
        (EventName
            ((Predicate)
                (ActionName (ParamSpec,..))
                (ActionName (ParamSpec,..))
                (StateName)
            )
        )
    )
)
```

Figure 20

| | |
|---|---|
| Definition | Describes call and feature processing behavior. |
| Native Format | ASCII based markup (CPML, CPML+) for external usage and maintenance.<br>Object(s) for internal processing. |
| Source/Authority | Service maintenance and provisioning; the TSP/CSX product provides standardized call and class 5 feature definitions.<br>Service Creation Environment (tool?) provides capability to create new or modify existing call and/or feature policies. |
| Value Initiation Frequency (Low) | Assuming that most polices are defined at carrier or group levels, new call and feature policies with the introduction of new group level call and features types. This frequency is less than the subscriber provisioning frequency.<br>For individual level call and feature types, call and feature policies may be introduced coincident with the provisioning of new subscribers. |
| Value Change Frequency (Low to Moderate) | In general, call and feature logic elements change infrequently—when call or feature logic is modified or upgraded. This frequency is less than the subscriber provisioning frequency.<br>Call and feature parameter elements, e.g., call forwarding destination number, may change at or above the subscriber provisioning frequency. Some parameter elements may change as much as hourly. |
| Value Access Frequency (High) | Call and feature policies, including logic and parameter elements, are accessed with each call. |
| Schema Change Frequency (Low) | Call and feature policy schemas define the structure with which calls and call features are described. Once mature, the schema for defining calls and features should change very infrequently; only as often as needed to upgrade call type and feature specification capabilities. |
| Consumer(s) | Call and feature processing. |
| Consumer Format | Object(s) |
| Replications and Sharing | TSP nodes share call and feature processing specifications. |
| Scope | System, Group, and Individual Subscriber |
| Volume | Group and system level logic elements have few instances.<br>Individual level logic elements are coincident with subscriber volumes.<br>Parameter element volumes are a function of the number of parameterized features in combination with the subscriber population size. |

Figure 32A

Route

| Definition | Describes transmission paths between a network element and its associated endpoints and other network elements and the characteristics of those paths. |
|---|---|
| Native Format | |
| Source/Authority | OAM&P |
| Value Initiation Frequency (Low) | New route entities are introduced when new transmission paths are provisioned and when new transmission path characteristics are provisioned. |
| Value Change Frequency (Low) | Since routes are related to physical equipment and transmission facilities, routes are relatively static. |
| Value Access Frequency (High) | Route data is accessed for each call. |
| Schema Change Frequency (Low) | |
| Consumer(s) | Call processing. |
| Consumer Format | |
| Replications and Sharing | Multiple TSP nodes share route data entities. |
| Scope | |
| Volume | Route volumes are a function of the count of endpoints, associated network elements, and transmission path characteristics. |

Figure 32B

Endpoint/Subscriber

| Definition | Describes endpoint devices (within scope of TSP/CSX), the configuration of those devices, subscribers associated with endpoint devices, and associates endpoint(s)/subscriber(s) with call and feature policies. |
|---|---|
| Native Format | |
| Source/Authority | Subscriber care (subscriber provisioning and maintenance). |
| Value Initiation Frequency (Low) | Endpoint/subscriber instances are initiated as new subscribers are added to the carrier's subscriber base. Call and feature policy associations are initiated as new call types and features are deployed and as subscribers subscriber to different services. |
| Value Change Frequency (Low) | Value changes occur as subscribers modify their calling and/or feature parameters. |
| Value Access Frequency (High) | Endpoint/subscriber data is accessed with each call. |
| Schema Change Frequency (Low to Moderate) | Endpoint schema changes only with software product upgrades. Subscriber schema may be extended through introduction of new features. |
| Consumer(s) | Call and Feature processing. |
| Consumer Format | Object |
| Replications and Sharing | Multiple TSP nodes share Endpoint/subscriber data. |
| Scope | |
| Volume | Endpoint/subscriber volumes equal the carrier's subscriber population. |

Figure 32C

Call/Feature State

| Definition | Describes the current state of calls and/or call features. |
|---|---|
| Native Format | Object |
| Source/Authority | Call and Feature Processing; call and feature state data is generated and maintained for each call and/or feature. |
| Value Initiation Frequency (High) | Call state instances are initiated with each call. Feature state instances are initiated as needed based on call level events. |
| Value Change Frequency (High) | Call and feature state changes occur in response to events throughout the life of the associated call and/or feature(s). |
| Value Access Frequency (High) | Call and feature state are accessed in order to service events throughout the life of the associated call and/or feature(s). |
| Schema Change Frequency (Low) | Call and feature state objects a combination of native application objects and instantiations of call and feature policy schemas. Native object schemas change only with product software upgrades. Call and feature policy schema changes are addressed elsewhere. |
| Consumer(s) | Call and feature processing. |
| Consumer Format | Object |
| Replications and Sharing | Call and feature states are replicated in support of fault tolerance capabilities. |
| Scope | |
| Volume | Call and feature volumes are a function of the subscriber population combined with the subscriber's calling frequency constrained by transmission capabilities. |

Figure 32D

Equipment/Facility

| Definition | Describes an equipment item or a transmission facility, and the configuration of that equipment item or transmission facility. Equipment items include processor devices, remote data terminals, intelligent peripherals, etc. Transmission facilities include network facilities, which connect a CSX to an external network element, and access facilities, which provide endpoints with access to the carrier's network. |
|---|---|
| Native Format | MIB? |
| Source/Authority | OAM&P |
| Value Initiation Frequency (Low) | New equipment descriptions are introduced when the carrier adds new equipment components. New network facilities are introduced when the carrier adds new transmission facilities. |
| Value Change Frequency (Low) | Changes in equipment and transmission facility descriptions and configurations are rare once provisioned and stable. |
| Value Access Frequency (Low) | Equipment and transmission facility descriptions and configurations are accessed only during system initialization and re-boots. |
| Schema Change Frequency (Low) | Equipment and transmission facility schemas change only support for new equipment and/or transmission types is added to the product. |
| Consumer(s) | System initialization and OA&P processes. |
| Consumer Format | |
| Replications and Sharing | TSP nodes share some of the equipment and transmission facility description and configuration data. TSP and CSX elements share certain categories of equipment and transmission facility descriptions and configurations. |
| Scope | |
| Volume | This is a function of the count of equipment items and transmission facilities. |

Figure 32E

Equipment/Facility State

| | |
|---|---|
| Definition | Describes the present state of an equipment item or a transmission facility. |
| Native Format | MIB? |
| Source/Authority | OA&M processes, certain aspects of call processing. NMS may command state changes. |
| Value Initiation Frequency (Low) | Equipment and facility states are initiated during system initialization and re-boots. |
| Value Change Frequency (Moderate to High) | Certain types of equipment and transmission facilities change state frequently. Other types change state with only moderate frequency. Aggregate equipment and facility states change with less frequency than individual components. |
| Value Access Frequency (Varies from Low to High) | In general, this data is accessed at NMS polling intervals. State data that contributes to statistics may be sampled at frequent intervals. |
| Schema Change Frequency (Low) | Equipment and facility state schemas change only with product upgrades. |
| Consumer(s) | NMS |
| Consumer Format | MIB? |
| Replications and Sharing | Multiple TSP nodes may share certain state elements. Certain equipment and facility state elements may be replicated for redundancy support. |
| Scope | |
| Volume | This is a function of the count of equipment items and transmission facilities. |

Figure 32F

Equipment/Facility Statistics

| Definition | Describes a usage or event occurrence history with respect to a particular equipment item or facility. |
|---|---|
| Native Format | MIB? |
| Source/Authority | OA&M processes, certain aspects of call processing. |
| Value Initiation Frequency (Low) | Values are initiated during system initialization and re-boots. |
| Value Change Frequency (Moderate to High) | Statistics on directly measured attributes change with the frequency of related events.<br>Statistics on sampled attributes change with the sampling frequency. |
| Value Access Frequency (Low to Moderate) | These values are accessed at collection and polling intervals. |
| Schema Change Frequency (Low) | Statistic schema changes occur only with product upgrades. |
| Consumer(s) | NMS, OAM&P |
| Consumer Format | SNMP Messages, ASCII based markup logs |
| Replications and Sharing | |
| Scope | |
| Volume | Statistics volume is a function of measurement method, measurement intervals, and count of sampled entities. |

Figure 32G

Automated Message Accounting (AMA)

| | |
|---|---|
| Definition | Describes call and feature usage characteristics relevant to call and feature billing. |
| Native Format | AMA data is packed binary coded decimal.<br>Historically, AMA data is stored and/or transmitted in blocks according to a standard tape record format. |
| Source/Authority | Billing related processing; AMA records are generated from CDRs. |
| Value Initiation Frequency (Low) | AMA records are most likely generated according to an internal schedule, perhaps once or twice daily.<br>AMA generation may occur on demand when polled by an external system.<br>AMA or as specified by call and/or feature definitions to support real-time bill calculation/accounting. |
| Value Change Frequency (Static) | AMA records are static once generated. |
| Value Access Frequency (Low) | In general, AMA records are accessed only when passed to an external system for processing—under nominal circumstances this occurs once for each record.<br>Additional accesses may occur to support recovery of an external processing exception. |
| Schema Change Frequency (Low) | New AMA schemas may be introduced with new service introductions.<br>Existing AMA record schemas are defined by Telcordia standards and therefore change infrequently. |
| Consumer(s) | External bill processing system. |
| Consumer Format | AMA |
| Replications and Sharing | AMA data need not be replicated or shared among TSP processing nodes. |
| Scope | System |
| Volume | AMA volumes are a function of call/ feature volume. |

Figure 32H

Call Detail Record (CDR)

| | |
|---|---|
| Definition | Describes call and feature usage characteristics relevant to call and/or feature billing, and facility usage accounting. |
| Native Format | Log of ASCII based markup. |
| Source/Authority | Call and Feature Processing; call and feature processing generates CDRs according to call and/or feature policy. |
| Value Initiation Frequency (High) | CDRs are generated per call and per feature.<br>There may be multiple CDRs associated with a single call or feature. |
| Value Change Frequency (Static) | CDRs are static once generated. |
| Value Access Frequency (Low) | In general, CDRs are accessed as needed to support AMA or other billing interface data generation, and as needed to support facility usage accounting.<br>AMA generation frequency is described elsewhere.<br>It is anticipated that other billing formats and facility usage accounting data are generated no more often than daily. |
| Schema Change Frequency (Moderate) | New CDR schemas may be introduced with the introduction of new call types and call features.<br>Existing CDR schemas may be modified to support billing or facility usage accounting changes. |
| Consumer(s) | Billing and Usage Accounting processes. |
| Consumer Format | ASCII based markup. |
| Replications and Sharing | CDR data need not be replicated or shared among TSPs. |
| Scope | System |
| Volume | Generally coincident with call and feature volumes. |

Figure 32I

Call Waiting State Machine

Example State Machine

```xml
<?xml version="1.0"?>
<!DOCTYPE LOGIC SYSTEM "fsm.dtd">
<LOGIC Name="CallAuthorizationSvc">
  <FSM InitState="START">
    <STATE Name="START">
      <TRANSITION Name="T1_1" Event="START">
        <FSMSEQUENCE NextState="CALL_AUTHORIZATION_SVC_END">
          <ACTIONS>
            <ACTION Name="postInternalEvent">
              <LITERAL Name="EventLiteral" Value="Authorized"/>
            </ACTION>
          </ACTIONS>
        </FSMSEQUENCE>
      </TRANSITION>
    </STATE>
    <END_STATE Name="CALL_AUTHORIZATION_SVC_END"/>
  </FSM>
</LOGIC>
```

Figure 38

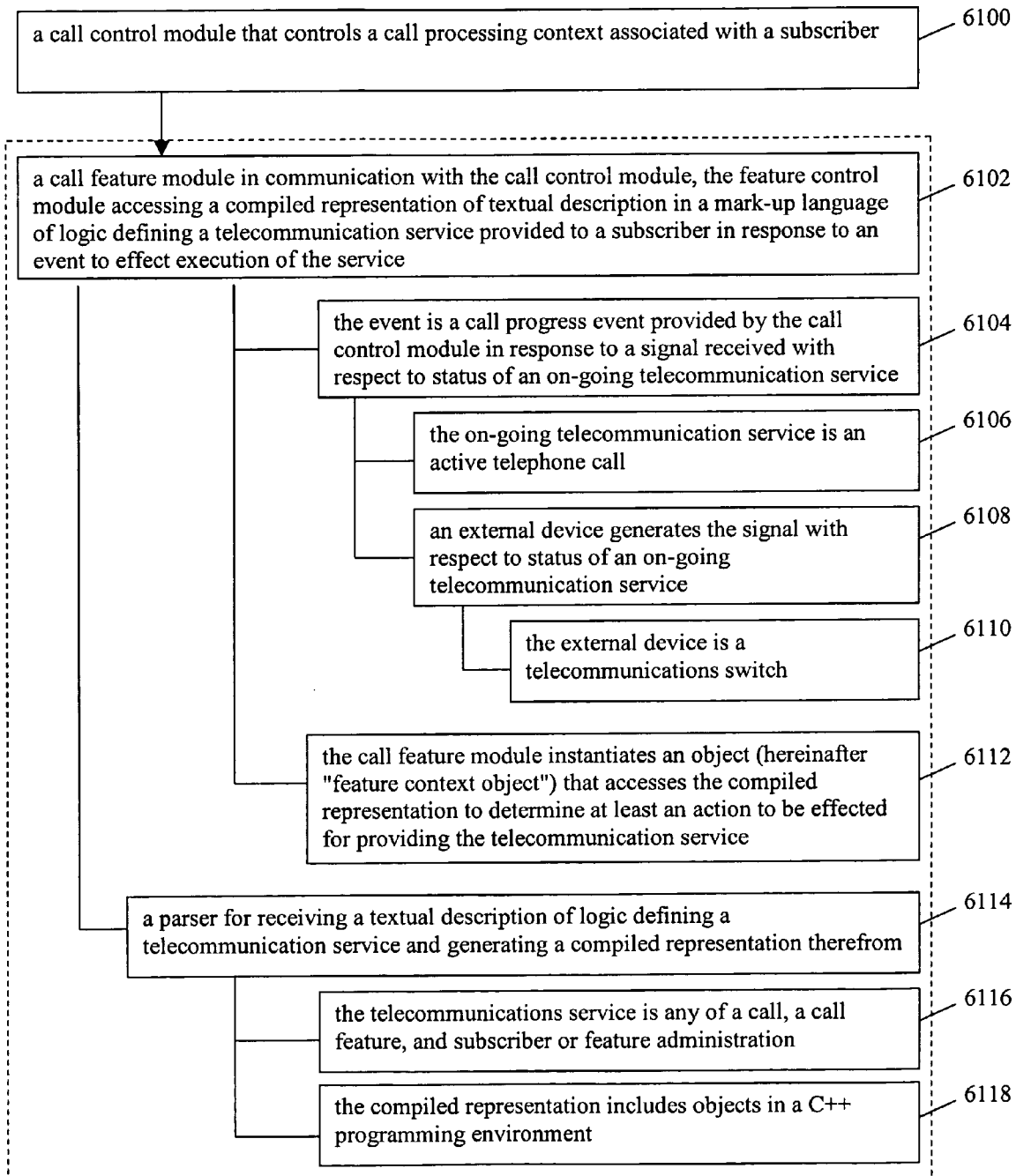

METHODS AND APPARATUS FOR CALL SERVICE PROCESSING BY INSTANTIATING AN OBJECT THAT EXECUTES A COMPILED REPRESENTATION OF A MARK-UP LANGUAGE DESCRIPTION OF OPERATIONS FOR PERFORMING A CALL FEATURE OR SERVICE

REFERENCE TO RELATED APPLICATIONS

This application claims priority to provisional applications having Ser. No. 60/193,701, filed on Mar. 31, 2000, Ser. No. 60/193,807, filed on Mar. 31, 2000, Ser. No. 60/193,809, filed on Mar. 31, 2000, and Ser. No. 60/193,700, filed on Mar. 31, 2000, and Ser. No. 60/193,701, filed on Mar. 31, 2000, the teachings of all of which are incorporated herein by reference. Further, this application is related to U.S. patent application Ser. No. 09/519,557, filed now abandoned Mar. 6, 2000, and entitled SYSTEMS AND PROCESSES FOR CALL AND CALL FEATURE ADMINISTRATION ON A TELECOMMUNICATIONS NETWORK, the teachings of which are incorporated herein by reference.

BACKGROUND OF THE INVENTION

The invention pertains to telephony and, more particularly, to systems and processes for call and call feature setup, administration and processing on public switched telephone networks (PSTN) and other telecommunications networks.

Voice telephony (and data communication via telephone modem) today is conducted primarily by "copper loops" or wireless transmission (via base station) from the user or subscriber to a central office (Class 4/5) switch that initiates the process of connecting the call to its ultimate destination, whether in the same local exchange handled by the central office, or to a remote central office. The call set-up process involves a series of "trigger points" wherein the service options available to the caller are checked against a database that periodically downloaded to the switch from the local carrier's database (typically relational, i.e., table-based). At the central office switch of the receiving subscriber, a similar sequence is followed to check such service options as call waiting and call forwarding. Updates of the databases are cumbersome, and adding new services require additional programming and trigger points in an already complex code.

The process of call set up outside the local service area further requires an "out of band" communication over the SS7 ("Signaling System 7") network and protocols distinct from the network over which voice traffic flows. It is this system that allows the proper switching of traffic for roaming cellular subscribers and for 800- and 900-numbers. It also provides caller identification. The system, however, is limited in its bandwidth and by the small number of knowledgeable programmers.

The prior art has made advances in the middle or "control" layer of a three-layer network model for voice telephony as part of a trend towards "Advanced Intelligent Networks" ("AIN"). These advances have involved call agents using the SS7 network to control new functionality in call set up and upgrading of the International Telecommunications Union H.323 Internet protocol for coordination of voice, data, and video traffic on the Public Switched Telephone Network (PSTN). For example, Bellcore and Cisco developed the Simple Gateway Control Protocol (SGCP) to improve on H.323 and Level 3 developed the Internet Protocol Device Control (IPDC). The Media Gateway Control Protocol (MGCP) is a merger of SGCP and IPDC sponsored by the Internet Engineering Task Force to migrate SS7 functions into Internet Protocol (IP).

The current state of the art remains one of limited service options. Any change in service requires the reloading of service maps stored in relational data bases; each new variable for service requires another table, essentially another dimension in the relational database. Each variable is implemented at a stop point in the switching fabric. Switches still require complex programming and cost in the millions of dollars.

It is an object of the present invention to provide improved systems and methods for call and call feature setup, administration and processing.

Another object is to provide such methods and apparatus as reduce the overhead required for implementation or modification of call feature processing.

A related object is to provide such methods and apparatus as facilitate implemenation of call features, whether defined by system designers, service providers or end users.

Still another object of the invention is to provide such methods and apparatus as are facilitate implementation of both complex and routine call feature processing.

Yet another object of the invention is to provide such methods and apparatus as can be implemented on a variety of telecommunications platforms.

Yet still another object of the invention is to provide such methods and apparatus as can be implemented at reduced cost and in less time.

SUMMARY OF THE INVENTION

The present invention meets the foregoing and other objects by providing, in one aspect, methods in which a compiled representation of a textual description in a mark-up language of operations describing a telecommunication service is generated. Objects, hereinafter referred to as context objects, access this compiled representation, in response to events occurring with respect to a telecommunication service in order to effect the execution of the operations.

Related aspects of the invention provide methods as described above in which the context object is instantiated in response to a boundary event of the underlying telecommunications service or feature. Thus, for example, such methods can result in instantiation of context objects in response to call origination or call termination events.

Further aspects of the invention provide methods as described above in which notification of selected events is passed to an existing context object for processing. The object can respond to such notification by accessing the compiled representation in order to discern one or more operations for execution to further processing of the call feature or service. Notifications which do not result in such further processing can, according to further aspects of the invention, be interpreted as boundary events that result in instantiation of additional context objects.

For example, a system operating in accord with a method of the invention can notify an existing context object of a "hookflash" event. If that event is expected in the normal course of processing of a feature currently being handled by the object, notification results in access of the compiled representation and execution of further operations for the feature. If not, the hookflash is treated as an boundary event and results in creation of a new context object to handle it.

The textual description that embodies the operations can be provided, e.g., by a service provider or subscriber, in a mark-up language such as HTML, XML, or an extension thereof. The operations define a set of rules and actions to be performed in order to provide a telecommunications service. Such a telecommunication service can include, but is not limited to, a call, a call feature, and subscriber or feature administration.

According to further aspects of the invention, the compiled representation is implemented in an object-oriented environment, e.g., a C++ object environment. A virtual function, returned as a result of the context object accessing the compiled representation of the operations, can be utilized to invoke one or more core functions required to carry out the telecommunications service.

In a related aspect, the textual description embodying the operations is parsed to generate the compiled representation. The context object that accesses this compiled representation can also maintain information regarding present state of an ongoing communication service, and be responsive to events occurring with respect thereto.

In another aspect, the invention provides the methods described above in which objects, herein referred to as feature object, associated with the context objects embody the compiled representations of the operations and effect the execution of the telecommunication service. The feature objects can receive signals indicative of events occurring with respect to a communication service from the context objects, and effect performance of one or more actions.

Utilizing a mark-up language to provide a textual description of the logic specifications indicative of a telecommunication service provides a number of advantages. For example, it places the relatively complex task of defining actions to be performed in response to a myriad of different signals in a graphically depictable format, which can be easily validated. Further, new telecommunications services, e.g., call features, can be designed and validated more conveniently.

The method of the invention can be implemented, for example, by a telecommunications system that includes a call control module that controls a call processing context associated with a subscriber, and a call feature module that is in communication with the call control module. In response to a call progress event, the call feature module accesses a compiled representation of a textual description in a mark-up language of logic defining a telecommunication service provided to a subscriber to effect the execution of the service.

In a related aspect, the telecommunication system can include a parser that receives the textual description and generates a compiled representation therefrom. The call feature module can instantiate an object that accesses this compiled representation to determine at least one action to be effected in order to provide the telecommunication service.

Further aspects of the invention provide systems operating in accord with the methods described above.

Further aspects of the invention provide systems and methods as described above in combination with those summarized and described in co-pending, commonly assigned, "Methods and Systems for Implementing Telecommunications and Other Processes Using an Object Graph Generated from a Markup Language," (U.S. Express Mail Label No. EL835823049US), filed this day herewith, "Telecommunications Portal Capable of Interpreting Messages form an External Device," (U.S. Express Mail Label No. EL835823021US), filed this day herewith, and "Markup Language-Defined State Machine for Use in Call Service Processing," (U.S. Express Mail Label No. EL835823035US), filed this day herewith.

These and other aspects of the invention are evident in the drawings and in the claims that follow.

BRIEF DESCRIPTION OF THE DRAWINGS

FIG. 8 is a feature assignment table providing a map of call features to feature logic objects, FIG. 9 schematically illustrates that a feature control module of the call processing subsystem of a system of the invention can contain multiple feature logic objects, FIG. 19 illustrates an exemplary state machine that can determine the parity of a string of 0's and 1's.

FIG. 20 is a diagram depicting an approximate schema for logics associated with the state machine of FIG. 19, FIG. 32A is a table listing exemplary call/feature policy data for a system according to the teachings of the invention, FIG. 32B is a table listing exemplary route policy data for a system according to the teachings of the invention, FIG. 32C is a table listing exemplary endpoint/subscriber data set for a system of the invention, FIG. 32D is a table listing exemplary call and feature state data for a system of the invention, FIG. 32E is a table listing exemplary equipment/facility data for a system according to the teachings of the invention, FIG. 32F is table listing exemplary equipment/facility state data for a system according to the invention, FIGS. 32G, 32H and 32I are tables FIG. 38 is a sample XML document containing the description of a state machine for providing a call feature (call forwarding) to a subscriber of a telecommunications service.

FIG. 61 illustrates a flowchart regarding a call control module that controls a call processing context associated with a subscriber, and a call feature module in communication with the call control module.

DETAILED DESCRIPTION OF THE ILLUSTRATED EMBODIMENT

Figure 1:
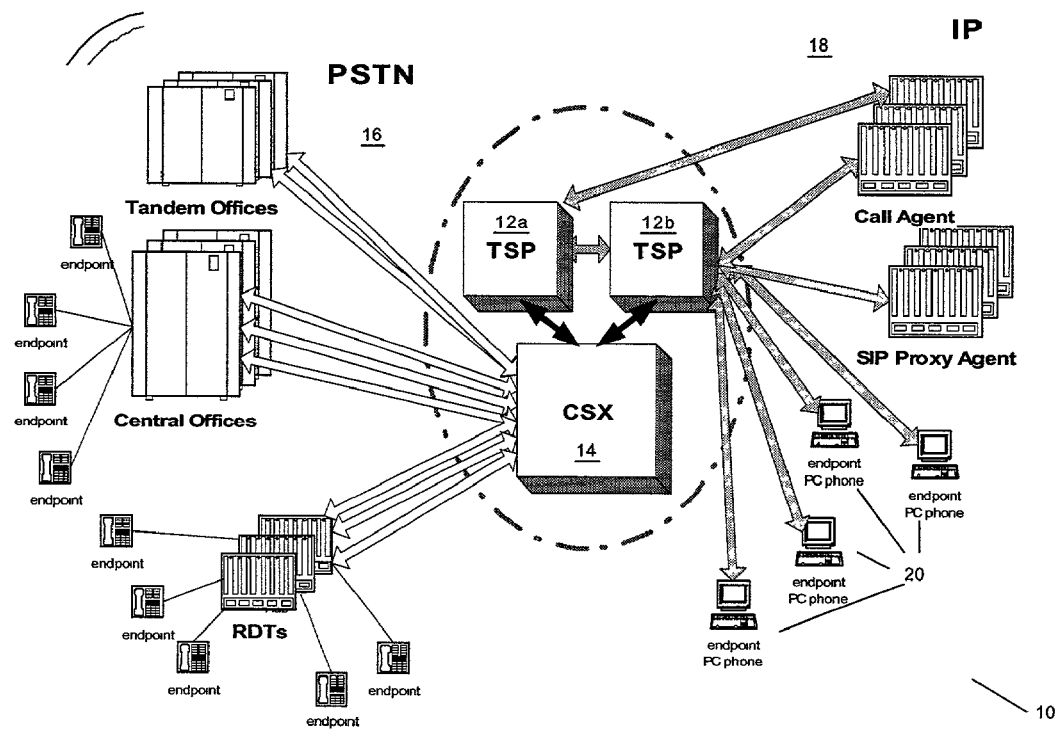
FIG. 1 schematically illustrates a telecommunications system according to the teachings of the invention, FIG. 2 schematically depicts exemplary network and external interfaces associated with a telecommunications system according to the invention, FIG. 3 schematically illustrates the interaction of a TSP node of a system of the invention with some exemplary external networks.

FIG. 1 illustrates an exemplary telecommunications system 10 according to the invention having two Telecommunications Service Portal (TSP) nodes 12a and 12b in communication with each other and with a CSX switch 14 to provide a convergent multimedia services environment. In conjunction with the CSX, the TSP 12a/12b offers class 5 and class 4 voice band services. These services can satisfy, for example, the needs of Competitive Local Exchange Carriers (CLEC) and Internet Service Providers (ISP). When coupled with other network elements, intelligent peripherals, and subscriber premise equipment, the TSP offers a solution to the demand for convergent multimedia services environments.

Figure 2:
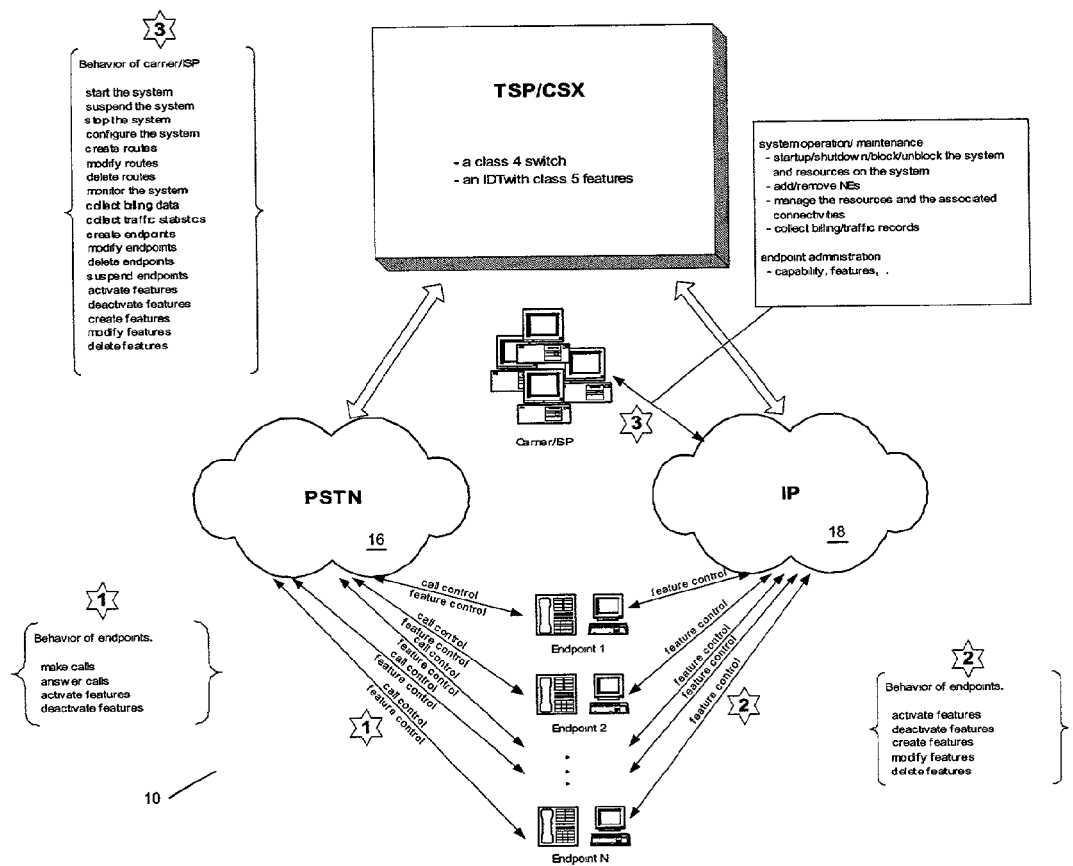

The TSP/CSX system 10 of the invention offers a variety of network and external system interfaces, as depicted in FIG. 2. For example, the TSP/CSX system includes a Call and Feature Processing subsystem that provides class 4 and class 5 call services and features via the interfaces of the CSX switch with a Public Switched Telephone Network (PSTN) 16. In addition to feature delivery, the system 10 also offers certain feature configuration capablities through PSTN voice band circuits. Further, the TSP/CSX system includes a Call and Feature Creation and Maintenance Subsystem that keeps the runtime data stores in sync with externally defined calling models and call features. This subsystem also participates in the maintenance of subscriber specific data attributes that may be configured through voice band network interfaces. In addition, a Network Management Subsystem supports common network element operations, administration, maintenance, and provisioning functions covering endpoints, routes, system configuration tables, and provides surveillance of system status and performance metrics. A Billing Subsystem interfaces with external entities in support of billing and usage accounting processes.

Referring to both FIGS. 1 and 2, the TSP/CSX system 10 is situated on a PSTN network 16 and an IP network 18. In combination, the TSP and CSX provide traditional circuit switch based voice band services. The TSP independently provides call control and feature processing capabilities for IP Telephony Networks (IPTN) assuming multiple roles such as call agent over a MGCP network, proxy server over a SIP network, and so forth.

Call Processing Subsystem

Figure 3:
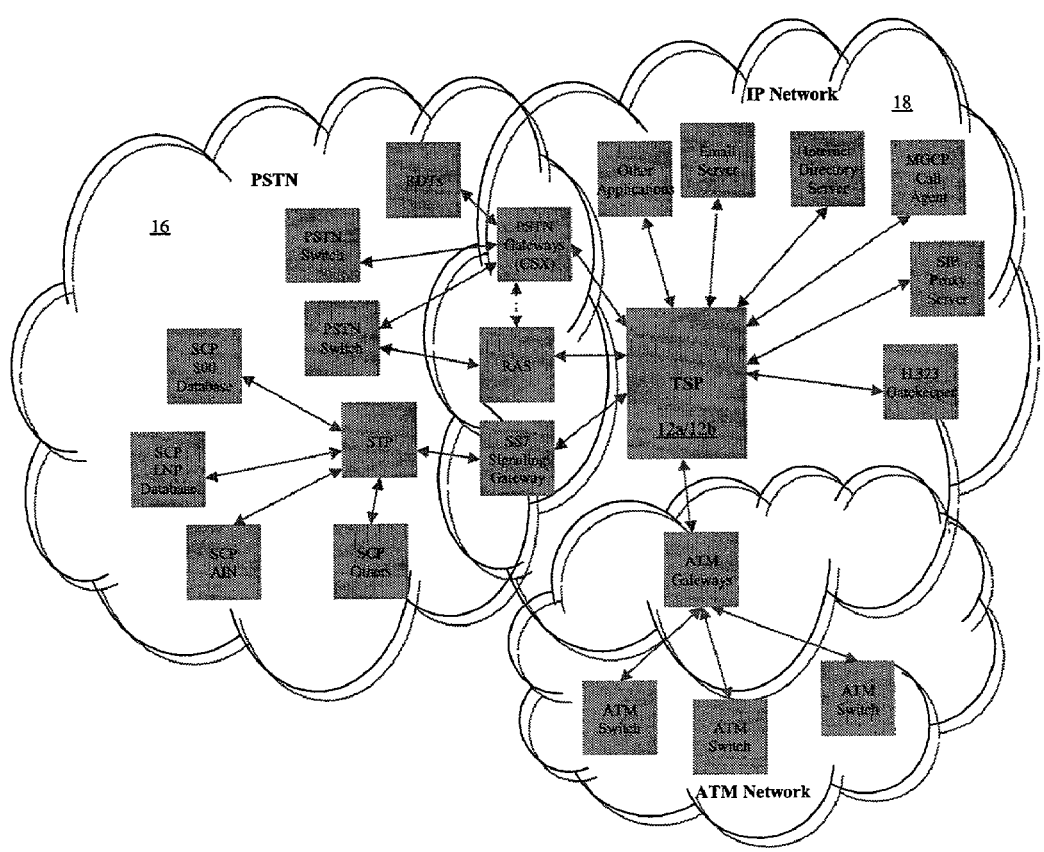

Reference to both FIGS. 1 and 3 shows that the exemplary TSP 12a/12b is on the IP network and the CSX is situated on both PSTN 16 and IP network 18. The TSP and CSX jointly provide telephony switching functionality on the PSTN network. On it own, TSP provides call control capability on the IP Telephony Network. For example, TSP can assume multiple roles in various IP telephony networks, such as call agent over MGCP network, and proxy server over SIP network. The TSP can also interface with ATM gateways over an ATM network to provide call control and feature control functions for ATM gateways.

On the PSTN side, DS1 trunks terminating at the CSX provide connections between the TSP/CSX and other network elements. These connections include traditional inter-office facilities as well as GR303 based facilities to support subscriber access.

Inter-office facilities connect TSP/CSX switches to other end offices and access tandem offices employing a variety of inter-office protocols such as FGD, ISUP, and ISDN/PRI. Each such physical connection between the CSX and another office or network element is called a 'trunk'. A set of trunks that share common characteristics and traffic load is called a 'trunk group'. Trunks and trunk groups reside on the PSTN and are managed by CSX. The concept of trunks is encapsulated within the CSX. The TSP has no representation of individual trunks. The TSP does maintain a representation of trunk groups to support call routing, network management, etc.

The TSP in conjunction with the CSX, serving as an IDT and RDTs supporting subscriber access facilities, can constitute a class 5 switch. In this configuration, the TSP/CSX system treats the endpoints on the RDTs as its endpoints. The DS0 circuits on these trunks, except the TMC and EOC circuits, are mapped to endpoints and are therefore treated as endpoints. The TSP manages the endpoints.

On the IP network, connections between the TSP and other call managers, such as call agents and proxy servers are referred to as 'IP route's. PC base phones 20 can constitute endpoints. The TSP manages both the IP routes and IP based endpoints network.

The TSP treats an IP based endpoint in the same manner as an endpoint on the PSTN. An endpoint can correspond to a subscriber and can be a representation of the subscriber in the TSP. Likewise, the TSP treats an IP route in the same fashion as a trunk group appearing on the PSTN. The TSP manages bandwidth allocation for IP routes whereas the CSX manages the circuits and trunks that constitute a trunk group.

Each trunk group and IP route can serve a number of connections. Each connection to a trunk group or IP route is terminated at a connection point A connection point inherits the attributes of the trunk group or IP route at which the connection terminates.

The TSP also includes the concept of hunt groups. A hunt group is a set of trunk groups and/or IP routes that share common characteristics and traffic load. Ultimately members of a hunt group—trunk groups or IP routes—can, but not necessarily, span between IP networks and the PSTN so that calls can be delivered over either network depending upon the network available and other driving factors.

Figure 4:
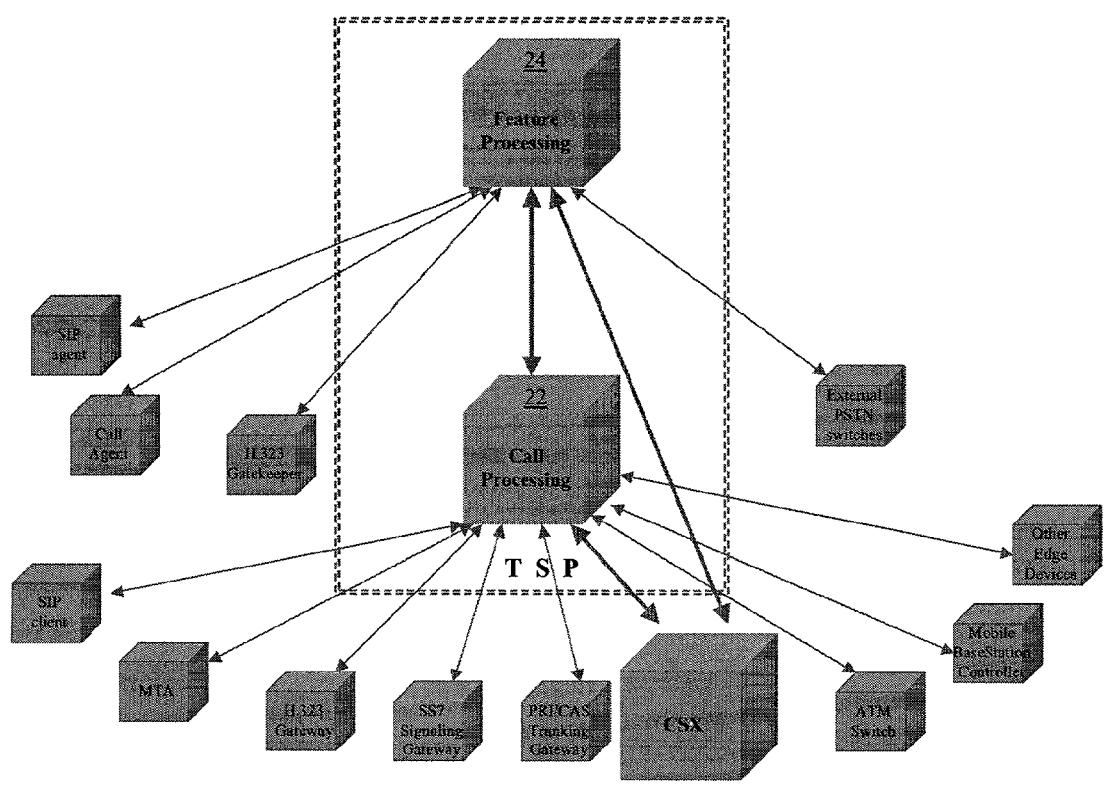
FIG. 4 illustrates that a TSP node of a system of the invention can include a call processing module and a feature processing module in communication with a CSX switch according to the teachings of the invention.

FIG. 4 illustrates that the TSP system can include a call processing subsystem 22 and a feature processing subsystem 24. It further illustrates exemplary roles that the TSP can play in various voice/data networks, and it also illustrates its external interfaces with other network entities. The call processing subsystem provides call processing and feature control functions. For example, it can provide call control by supporting a suite of industry standard protocols, such as SIP, MGCP, and MEGACO, to interface with external switching entities and/or PC phone clients over PSTN/ATM/IP networks. It can further provide the basic call processing functions. The feature control function supports existing PSTN class 4/5 features and enhanced Internet services, such as email service over the voice and packet networks.

The call processing subsystem is responsible for the call processing and switching functionality in the TSP. For example, it can supply basic call processing by providing switched, two-way transmission paths connecting endpoints and inter-switch facilities terminated on the TSP/CSX system. The inter-switch facilities can be, for example, PSTN trunks terminated on CSX and IP routes terminated on TSP. The basic call processing can also include the capability to apply tones, announcements, and alerting mechanisms to end users and inter-switch facilities.

The call processing subsystem can also provide resource management. For example, it can manage the call control resources defined in TSP. There are three types of call control resources in the system: endpoints, PSTN trunk groups, and IP routes. Different levels of control are applied to these resources. Endpoints are owned by the subsystem, and the subsystem provides busy/idle handling for them. PSTN trunk groups are owned by switching elements, i.e. CSX. The switching element defines logical circuits representing the physical circuits in the trunk groups and the logical circuits are exposed to the TSP. The call processing subsystem maintains the call states for the logical circuits and tracks the number of in-use circuits in the group, though it is not responsible for the busy/idle handling of physical circuits An IP route consists of a group of logical circuits. The number of logical circuits in an IP route is variable and determined by the bandwidth of the IP route. This subsystem owns the IP routes and provides bandwidth management for them.

Further, the call processing subsystem provides load balancing function for hunt groups. A hunt group consists of a collection of PSTN trunks and IP routes. Multiple load balancing techniques can be applied to maximize the system performance. For example, a circular hunt mechanism can be implemented. A circular hunt mechanism sequences the trunks/routes in a circular list that has a next route pointer pointing to the next trunk/route to use. When a call is extended out of a hunt group, call processing subsystem uses the circular list to determine the next trunk/route to use, initiates the call on the selected trunk/route, and advances the next route pointer.

Other functions provided by the call processing subsystem include registration and authentication. The subsystem can support dynamic registration and authentication. When an endpoint or trunk is added to the system or removed from it, a registration or de-registration request is initiated by the authority of the endpoint and trunk, which can be the endpoint itself or CSX. An authentication procedure is carried out during the registration and de-registration procedure to assure the system integrity.

Moreover, the call processing subsystem supports multiple multimedia call control protocols, such as MGCP and SIP, and media stream control protocol over heterogeneous networks.

The call processing subsystem can also provide support for real-time and post-processing billing model. Real-time Call Detail Record (CDR) is generated and is stored in a persistent data area during runtime.

The call processing subsystem also supports class 4 and class 5 basic and supplementary telephony services on POTS line over GR303 interface. The section entitled "Class 5 Feature List", infra, provides a list of class 4 and class 5 features that are supported. In addition, the subsystem supports TCAP applications. For example, it supports 800 number service, Local Number Portability (LNP), and Calling Name Delivery (CND) applications over TCAP/SS7.

The call processing subsystem of the invention can employ an Advanced Intelligent Network (AIN) architecture. It can further incorporate new three-tier call processing architecture technology to offer switching calling features and new IP services on one single platform. The call model of the invention provides a number of advantages. For example, improper feature definitions do not prevent the TSP/CSX system of the invention from meeting call processing behavior that is expected from peer level network elements. Further, call processing level response times are subjected to more stringent requirements, governed by specification, than feature level response times which are governed by human perceptions of "quality of service." The TSP supports portability by operating at the "network" level, e.g., via a SIP level interface, as well as at the "call processing" level, e.g., at the level of Parlay. In addition, feature processing and feature interaction are simplified by employing an AIN basic call model, where each call constitutes two half calls, origination and termination. The origination half call deals with the origination features and termination half call deals with the termination features.

The system of the invention allows separating feature processing from basic call processing. For example, the TSP can provide call control, feature control, and/or a combination of call control and feature control. An interface between the call processing entity and feature-processing entity can be asynchronous or synchronous. A number of standards are defined, for example, by VoIP industry, for such an interface. PARLAY and JAIN are two such commonly used standards that define extensive sets of APIs. As the VoIP technology evolves, PARLAY and JAIN continue to change. The system of the invention fully supports industry standards on this interface in order to inter-operate with equipment from various vendors. Other API, such as private proprietary API, can also be defined for providing communication between the feature processing and call processing subsystems of the system of the invention.

FIG. 4 illustrates schematically the various roles that the TSP can play in various voice/data networks and its external interfaces with other network entities.

Figure 5:
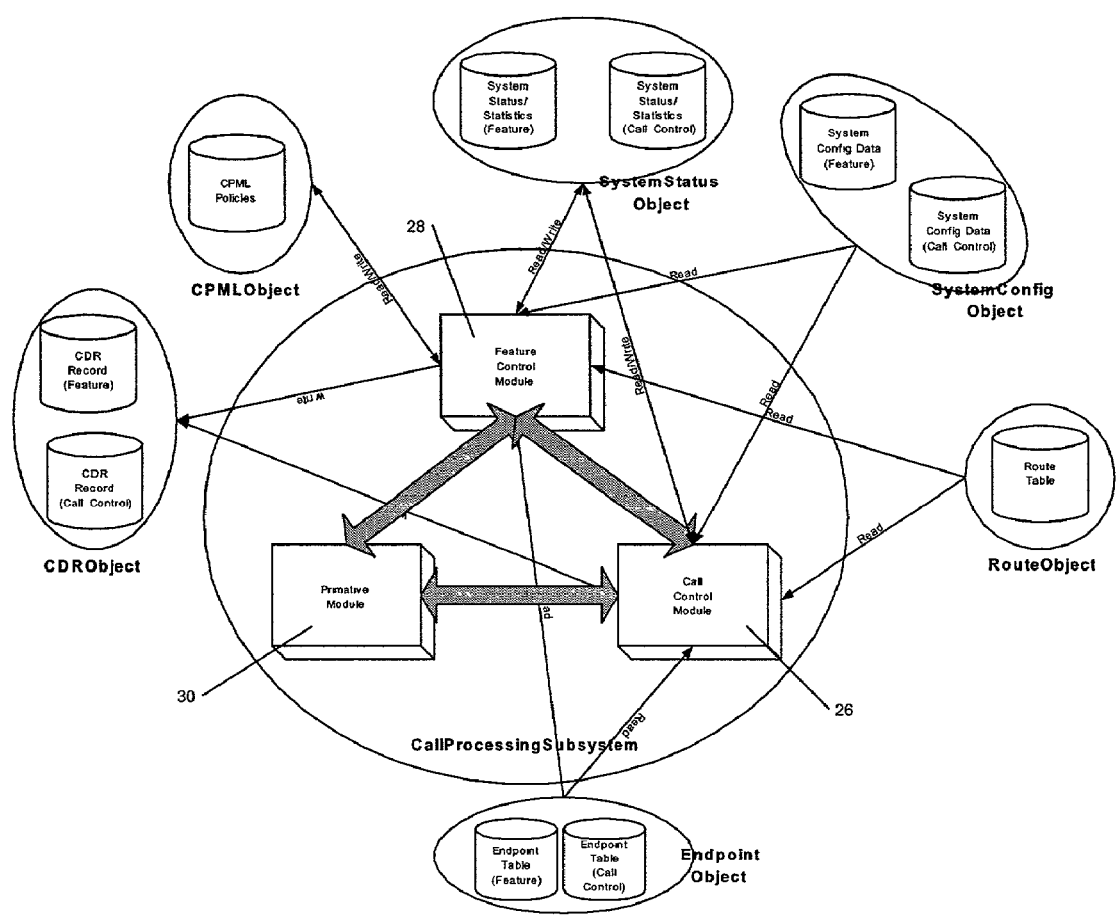
FIG. 5 illustrates that the call processing subsystem of the TSP node of FIG. 4 includes a call control module, a feature control module, and a primitive module, FIG. 6A schematically depicts a call processing model that the call processing subsystem of FIG. 5 can implement, FIG. 6B schematically depicts a second call processing model that the call processing subsystem of FIG. 5 can implement, FIG. 6C schematically depicts a third call processing model that the processing subsystem of FIG. 5 can implement.

FIG. 5 illustrates that the call processing subsystem of the TSP can include a call control module 26 for managing basic call processing, a feature control module 28 for handling feature processing, and a primitive module 30 that contains a set of call control methods, such as playTone, utilized by feature and call control modules. FIG. 5 also illustrates the data objects (databases) utilized by these modules and their collaborations.

With the separation of call control and feature control functions, the databases for supporting each module are also separated. The exception is the CPML policies and route table. The CPML policies are for the feature processing, and are accessed by the feature control module only. The routing function can be viewed as the basic call processing as well as feature control. Therefore, this table can be accessed by both call and feature control modules.

Figure 6A:
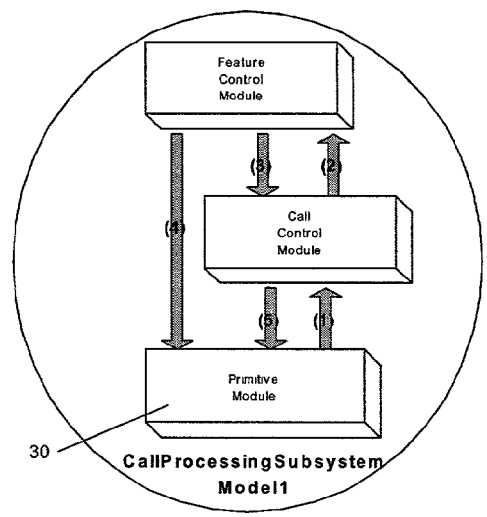

The call processing subsystem of the invention can operate in three models to provide different levels of call and feature control and/or management. FIG. 6 schematically depicts Model 1 that offers a complete call and feature control solution. In this model, the call control module receives external call control events. If the event triggers feature control, call control module generates a triggering event and sends it to the feature control module. The feature control module processes the event, and issues a command, by invoking, for example, a primitive in the primitive module. Alternatively, the command is sent down to the call control module, which in turn calls a primitive in the primitive module. In this model, all external events from the switching elements are channeled through the call control module. However, both feature control module and call control module can communicate with external switching elements through the primitive module.

Figure 6B:
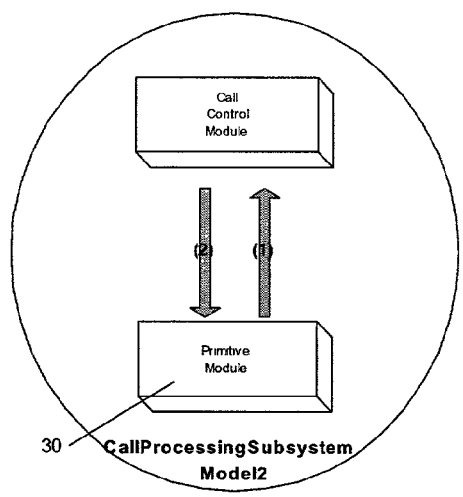
Figure 6C:
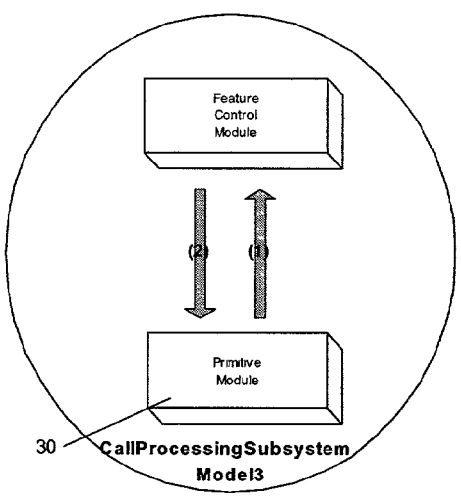

FIG. 6B schematically depicts Model 2 that offers call control capability. Further, FIG. 6C schematically depicts Model 3 that offers feature control capability and can be utilized to provide calling features/services to foreign switching elements, such as featureless call agents and gatekeepers.

The primitive module 30 provides a call control library that contains a set of APIs that the feature control and call control modules can invoke to interface with the external world. These APIs can define generic call control functions, such as makeCall, acceptCall, answerCall, releaseCall, mergeCall, etc. A frame work API set provides the supporting capabilities necessary to ensure system security and manageability. Some examples include registration, authentication, and discovery procedures.

A call control API set is utilized to control the switching elements. Although this API set is primarily invoked by the control module, it includes a subset that can be called by the feature control module as well. The methods in this API subset can be called either directly by the feature control module or indirectly through the call control module. This API set can run on multiple call control protocols simultaneously. The selection of the protocol is done at the initialization phase. Further, a subset of call control API can be exported to CPML+ to be accessed by end users in order to control the call treatments.

The primitive module further includes a set of feature control APIs, called by the feature control module, for supplying the utilities for controlling the behavior of a call, with each call having up to 2 legs. This API set provides enough functionality to allow call routing and call leg management for existing circuit and packet telephony networks. Some examples of this API set include, but are not limited to, enableCallNotification, disableCallNotification, getCallState, callEventNotification, createCallLeg, deleteCallLeg, attachCallLeg, detachCallLeg, routeCallLegToAddress, and releaseCall. A subset of the feature control APIs can be exported to CPML+ to be accessed by the end users for the creation and modification of calling features.

The primitive module also includes a set of service API's for accessing external services, e.g., 800 number service, calling name server, email server, and so forth. This API set encapsulates protocol specifics to relieve the invocation entities from dealing with that level of detail. SMTP and MIME, called by feature control module, are examples of members of this API set. A subset of the service APIs can be exported to CPML+ and accessed by the end users for the creation and modification of calling features.

The call control module provides the basic call processing functionality for TSP. Such call processing functionality can include, for example, called ID analysis and routing, intercept treatment (tone and announcement), overload handling, detection of feature triggering events and reaction to them, generation of CDR, and generation of call related traffic counts.

The call control module employs a call model, herein referred to as TSP call model, that is derived from the AIN Basic Call Model (BCM). By AIN definition, a typical call has an Originating Basic Call Model (OBCM) at the switch of the caller side, and a Terminating Basic Call Model (TBCM) at the switch of callee side. Each basic call model defines a set of points in call (PICs) that correspond to important states in a call. Associated with each PIC is a set of Detection Points (DPs). A DP is associated with a set of triggers each of which specifies the conditions under which an AIN feature can be invoked.

In the TSP call model, each call consists of one OBCM and one TBCM, where the originating features/services apply to the OBCM and terminating features/services to the TBCM. An interface between OBCM and TBCM can be asynchronous, and can utilize an industry standard call control protocol. A BCM is a state machine driven by the call progress events. Any call progress event with which a feature can be associated is a triggering event. When a triggering event occurs, a notification is sent to the feature control module. The feature control module will take appropriate actions in response to the notification. The details of interface between the call control and feature control modules will be discussed in more detail below. The BCM exists in the form of an endpoint or connection point, depending upon the nature of origination/termination point of the call.

The call processing subsystem processes the calls arriving at the TSP. As a class 5 switch, a call can be 1) originated from an endpoint, and terminated to an endpoint—intra-office call, 2) originated from an endpoint, and terminated to a trunk group or IP route—inter-office call, or 3) originated from a trunk group, and terminated to an endpoint—inter-office call. As a class 4 switch, a call is originated from a trunk group or IP route and terminated to a trunk group or IP route. These are the four types of call scenarios supported by this call model.

Figure 7A:
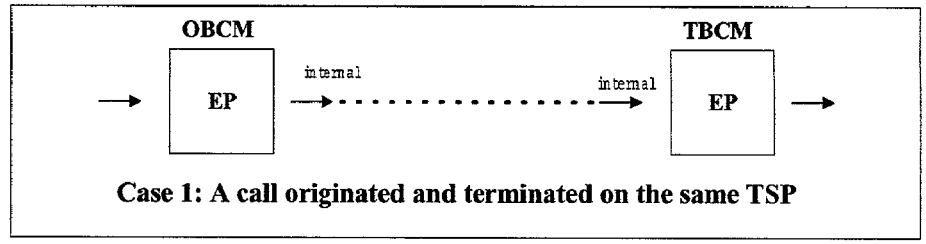
FIG. 7A illustrates that a call processed by the call processing subsystem of FIG. 5 can be originated from an end-user served by a TSP of a system of the invention and be terminated by an end-user served by the same TSP.
Figure 7B:
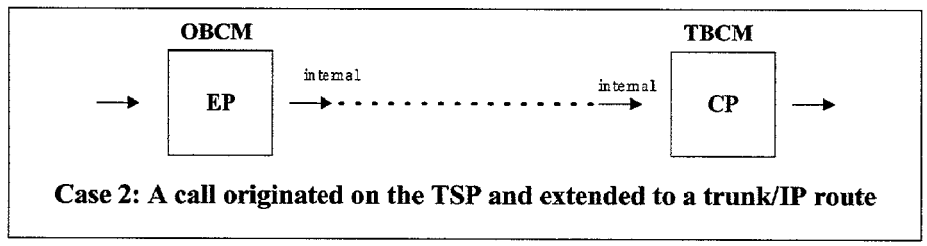
FIG. 7B illustrates that a call processed by the call processing subsystem of FIG. 5 can be originated by an end-user served by a TSP of the system of the invention and be terminated outside the TSP, FIG. 7C schematically illustrates that a call request can be extended to a TSP of the system of the invention over a PSTN trunk group or IP route, and be terminated on an endpoint on the TSP, FIG. 7D schematically illustrates that an incoming call request can be extended to a TSP of a system of the invention over a PSTN trunk group or IP route, and can be extended to the next office or TSP over a PSTN trunk or IP route.

In case 1, schematically depicted in FIG. 7A, a call is originated from an end user served by the TSP and is terminated to an end user served by the same TSP. In case 2, depicted in FIG. 7B, an end user, served by the TSP, originates a call and the call is terminated outside of the TSP. For example, the call is extended to another PSTN office or TSP through a PSTN trunk group or IP route. A connection point is allocated based on the trunk group or IP route to serve the egress leg of the call.

Figure 7C:
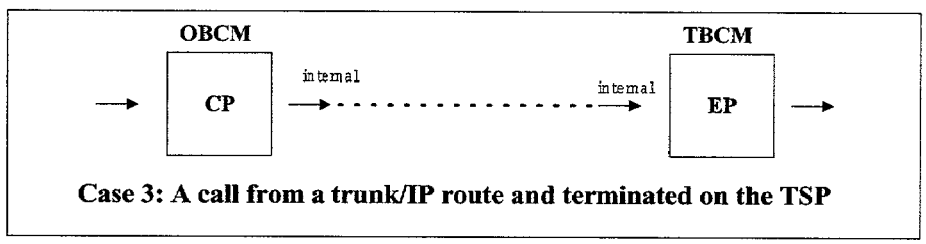

In case 3, depicted in FIG. 7C, an incoming call request is extended to the TSP over a PSTN trunk group or IP route, and the call is terminated on an end point on the TSP. In this scenario, based on the trunk or IP route a connection point is allocated to serve the ingress leg, and an end point is allocated to serve the egress leg.

Figure 7D:
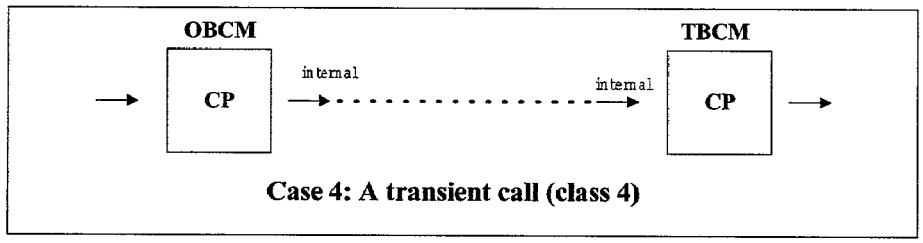

In case 4, depicted in FIG. 7D, an incoming call request is extended to the TSP over a PSTN trunk group or IP route and the call is extended to the next office or TSP over a PSTN trunk group or IP route.

The call control module maintains a set of run-time data objects to support the basic call processing operation. For example, the call control module can create an endpoint status object when a call is initiated. The endpoint status object can contain all the endpoints statically configured and dynamically registered to be managed by the TSP. Each endpoint that is dynamically registered with the TSP is created with the status set to in service upon the successful registration, and is removed when the de-registration is completed. For the endpoints statically configured to be managed by the TSP, upon creation of this data object, the call control module accesses the system configuration data object to retrieve the status of the endpoints belonging to the TSP, and creates endpoints in the endpoint status object.

Another data object is a connection point status object that is also created when the call control module is initialized. This object keeps track of the in-use connection points in a PSTN trunk, or IP route.

Further, a call object is created when a call is initiated and deleted when the call is released. Each call has 2 call objects, one for the origination (ingress leg), and the other for the termination (egress leg). An endpoint or connection point can own a call object.

The TSP infrastructure provides a set of mechanisms for the storage of the runtime data objects, discussed below, that the call control module can utilize in order to support the system performance and reliability requirements.

Referring again to FIG. 5, the call processing subsystem also includes a feature control module that provides supplementary calling features and services to the endpoints and PSTN-trunks/IP-routes served by call managers, for example, the call control module. The call feature module provides PSTN class 5 and call 4 features. In addition, new features can be created by the carriers and ISPs. In particular, TSP exports a set of functions, such as access 800 number data base on SS7 network, sending emails, callback utility, to CPML+. The carriers/ISPs can utilize these functions to create new services. These features/services are available on system level, and can be assigned to the entire system, individual groups, or end users. Charges may be expected either in usage or subscription basis. If the introduction of the new services and features changes the behaviors of the existing features, the creators of the features are responsible to specify the feature interactions.

The end users can also create new features for their own use, for example, by utilizing the capabilities of CMPL+. Typically this type of features are offered at no cost to the end users, unless the new features access the information from the system or utilize system resources, such as TCAP services.

The first three types of features described above are system-wide features, which are available to all endpoints/connection-points on the system. The last types of features are end user features that are only available to the creators of the features. The system-wide features can be assigned to the whole system, to individual groups, and to endpoints/connection-points. A group is defined as a collection of endpoints/connection-points, served by the same TSP, that share the same set of features. A group can be a business group, a residential group, a trunk group, etc. The members of a group have access to the group features. The end user features, however, can only be assigned to the endpoints/connection-points.

In the feature domain, there are system-wide features, such as a usage sensitive three-way call feature, that are available to all endpoints/connection points on the system. There are also group-level features, such as a call pickup feature, that are available to the members in a group, and endpoint/connection point level features, such as a call waiting feature, that can be subscribed by all endpoint/connection points on the system.

An endpoint/connection-point can have all levels and types of features assigned to it, thus necessitating management of interactions among various features. The feature control module can handle a number of different feature interactions. Two features can co-exist without impacting each other's behavior (no interaction). Alternatively, two features may be mutually exclusive. Two mutually exclusive features are not allowed to co-exist. For instance, call waiting and multiline hunt service cannot be assigned to the same endpoint simultaneously. A feature rule table is defined to specify if any two features in the system are mutually exclusive. When a feature is assigned, this table is utilized for validating the feature.

In some cases, a feature may be assigned to an endpoint/connection-point multiple times through different channels. In such cases, one feature would override the others. In particular, the system level, group level, and endpoint/connection-point level features have different configurable priorities. At the time of feature assignment, the feature interaction is resolved and a decision is made regarding which feature will take effect based on these priorities.

In cases in which two different features co-exist, one feature can override the other. For instance, when denied origination and call forwarding variable are assigned to the same endpoint, denied origination overrides the call forwarding variable. This interaction is also handled based on a comparison of the priorities of the features. As discussed in more detail below, each feature is associated with a feature logic object that defines the feature behavior. More particularly, a feature has one base feature logic object that defines the feature logic when the feature operates alone, and can have multiple modified feature logic objects that define the feature logic when the feature operates with other features.

A feature assignment table 30*a*, shown in FIG. 8, maps features to feature logic objects. The feature assignment table is referenced to populate feature objects for the endpoints/connection-points when features are created and assigned. The assignment table contains the feature logic objects defined in the system. Further, the assignment table is indexed by a feature mask, which is a bitmap of the features defined in the system. When a feature is present, the bit corresponding to the feature is set to 1.

Thus, the feature control module handles feature interactions by implementing at least four mechanisms, namely, assigning feature priority to each individual feature, providing a system wide feature rule table, providing a system wide assignment table, and feature logic encapsulation. This allows resolving feature interactions/conflicts when features are created and assigned, thus improving the runtime performance.

A more preferred embodiment of the invention provides feature classifications and resolves feature interactions in accord with the teachings provided below in connection with he description of an additional embodiment, for example, in a section entitled "Service Provisioning." In such an embodiment, a request handler processes features in accord with their pre-defined classifications to ensure that no conflict between various features occur.

Figure 9:
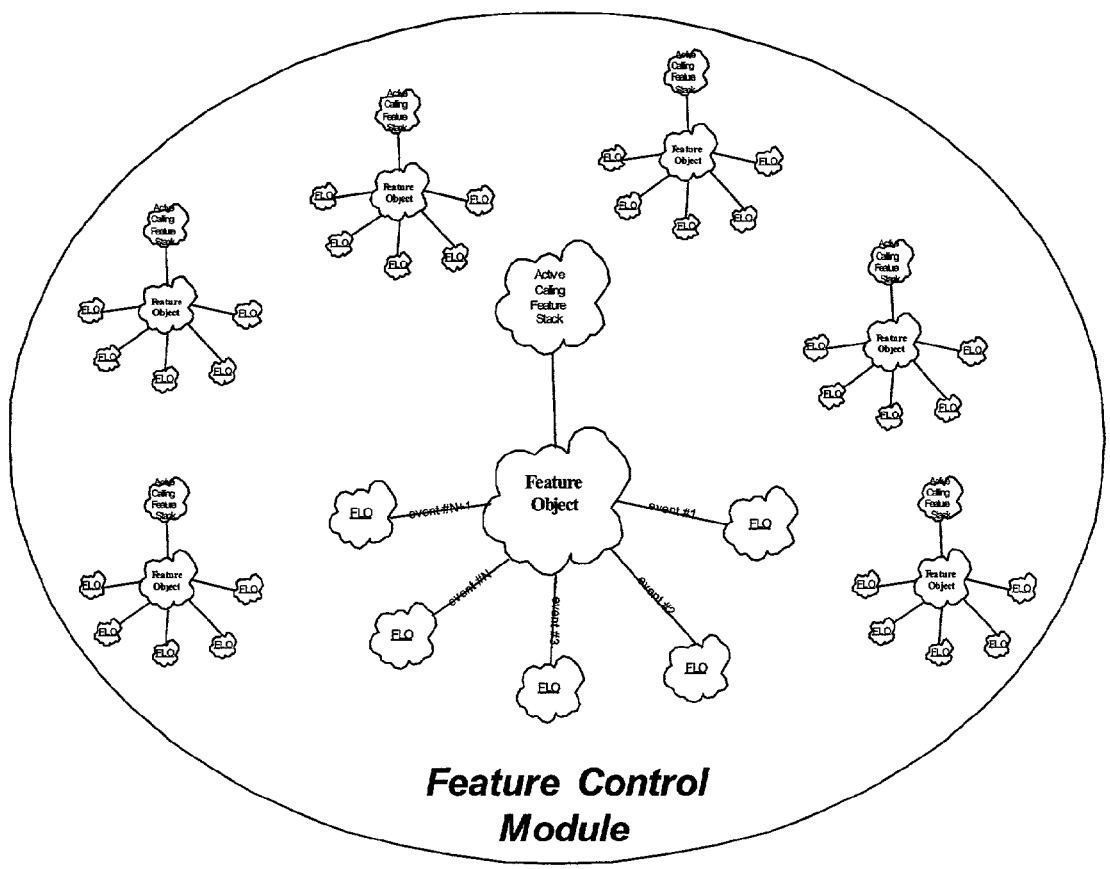

In the feature domain, a feature is defined as a (event, behavior, data) triplet; where event indicates a condition when the feature is invoked, behavior is a sequence of actions to take place when the feature is invoked, and data is the information used by the feature behavior. The triplet constitutes a Feature Logic Object (FLO). The features assigned to an endpoint/trunk/IP-route are stored in a feature object. Every endpoint/trunk/IP-route has one feature object. A feature object contains multiple FLOs and one active calling feature stack, as shown in FIG. 9.

An FLO describes the (event, behavior, data) triplet of the feature, and defines the administrative data associated with the feature. The association between a FLO and a feature object is the event. Although a feature object can have multiple FLOs, the associations are unique within a feature object. An FLO can include an identifier, which is the feature name uniquely identifying the feature within a TSP system. For system wide features, an identifier is a mandatory field that can be updated only by authorized personnel. An event specifies the condition for occurrence of a feature. There are two types of events; base events and extended events. The base events are the typical call progress events in the basic call model and the acknowledgement events. Call progress events can include, for example, origination side: offhook, dialComplete, remoteAlerting, and remoteAnswered; termination side: seizure, alerting, and answered; both: hookflash, localRelease and remoteRelease.

Acknowledgement events are returned to the feature object upon completion of a task, initiated by the feature object. For instance, the feature object can instruct a call object to start a 30-second timer. Upon the expiration of the timer, the call object returns an acknowledgement event to the feature object.

The extended events are a set of conditions associated with the base events. For instance, the 800NS extended event is defined as the detection of the dialComplete event and the dialed number that starts with 800. With the extended events, some of the feature control logic is shifted to the call control objects to reduce the traffic between feature domain and call control domain. The flexibility of this technique provides better system performance, less exchange of messages between the two modules, and the ability to introduce new events.

An Event Definition is present when the event is an extended event. The event definition specifies the construction of an extended event. For example, the event definition of 800NS is "dialComplete event + prefix of dialed number equals to 800".

As mentioned above, the features are prioritized in order to resolve two types of feature conflicts: same feature assigned multiple times to an endpoint/connection-point, and two different features assigned to an endpoint/connection point where one overrides the other. A priority attribute is divided into two fields: group level field and feature priority field. The group level field resolves the first feature conflict, namely, the multiple assignment of the same feature. It specifies the feature priority based on the ownership of the feature. A feature can be a system level feature, group level feature, or endpoint/connection-point level feature. Each of them can have different priorities and different groups can have different feature priorities. The group level field is configurable and can be controlled by the system operator.

The feature priority field settles the second feature conflict, e.g., one feature overriding another when two features co-exist. New feature interactions are controlled and specified by the feature creators.

A feature object can include an ownership attribute that identifies the owner of the feature. This field is used to propagate the updates on the features, and to remove the FLOs from feature objects when features are deleted.

A method of a feature object refers to a sequence of actions to take place when a feature occurs. It can be a simple command, such as route the call, a complete state machine, or another FLO.

Feature specific data is saved only when a feature is subscribed or activated. For example, the last incoming caller number is only saved when an end user subscribes to the Automatic Recall feature.

The stack is utilized when more than one feature can be invoked at the occurrence of an event, and/or same feature is assigned to an endpoint/connection-point multiple times. The FLOs of the features that should be invoked when an event occurs are put in the stack. When an event is detected, the associated FLO is retrieved. If the activated feature stack of the retrieved FLO is not empty, the FLOs in the stack will all be executed. The following examples better illustrate this mechanism.

Figure 10A:
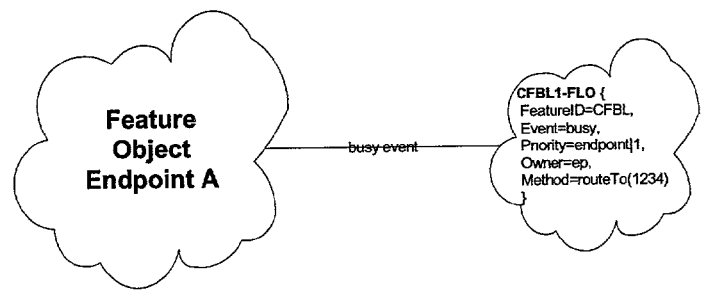
FIG. 10A illustrates a feature logic object corresponding to a call forwarding busy line call feature assigned to an endpoint.

In Example #1, schematically depicted in FIG. 10A, an endpoint A subscribes to Call Forwarding Busy Line feature (CFBL). The feature is activated with the forwarded number set to 1234. The feature object for endpoint A will have an association to the CFBL1-FLO.

Figure 10B:
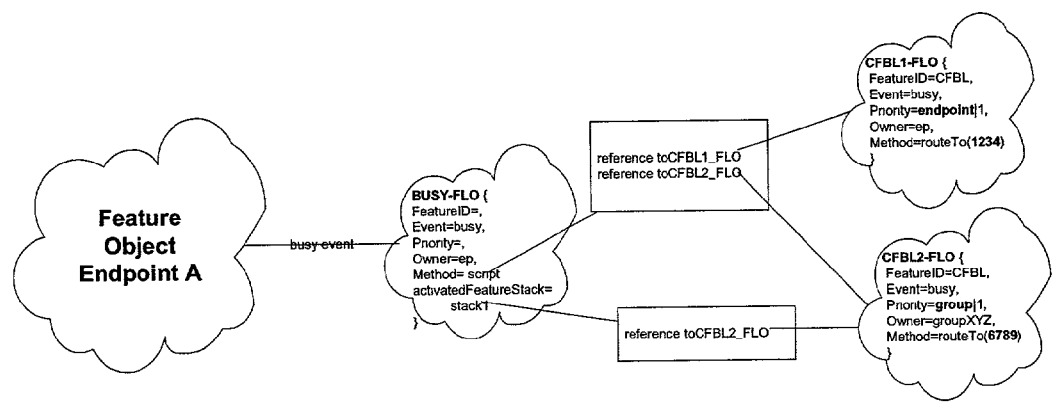
FIG. 10B illustrates another feature logic object corresponding to a second call forwarding line busy call feature assigned to the endpoint of FIG. 10A as a result of the membership of the endpoint in a group having the second call forwarding feature.

With reference to FIG. 10B, the endpoint A may be a member of a group XYZ to which the system administrator may also assign the CFBL feature in order to forward all incoming calls to 6789 when the rung station is busy. Thus, a new CFBL FLO, CFBL2-FLO, will be associated with the endpoint A. If a group feature has a higher priority than an endpoint feature, CFBL2_FLO overrides CFBL1-FLO. Hence, CFBL2-FLO will be put in the activated feature stack and will be executed when an incoming call terminates on endpoint A, and endpoint A is busy.

Figure 10C:
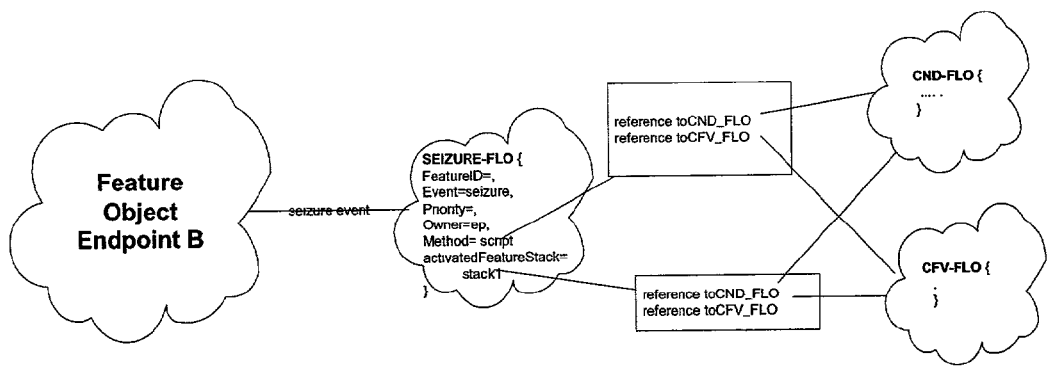
FIG. 10C illustrates a call feature object assigned to an endpoint that subscribes to call name delivery and call forwarding variable.
Figure 10D:
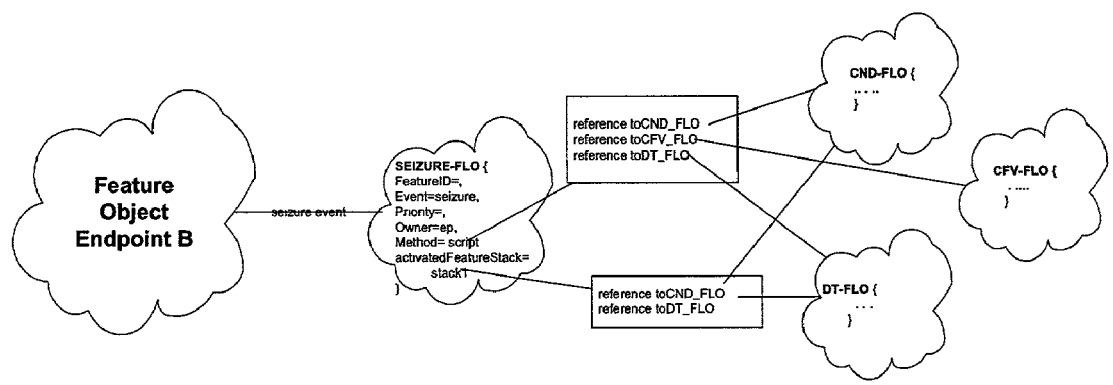
FIG. 10D illustrates a call feature object assigned to an endpoint that subscribes to call name delivery, call forwarding variable, and denied termination features.

In Example #2, depicted in FIG. 10C, an endpoint B subscribes to calling name delivery and call forwarding variable (CFV), and call forwarding variable is activated. If the endpoint B also adds the Denied Termination feature to its feature profile, it will have three features that co-exist at the seizure event, as shown in FIG. 10D. According to LSSGR /01-02-0500/; when CFV and denied termination co-exist, the latter should take precedence.

Figure 11A:
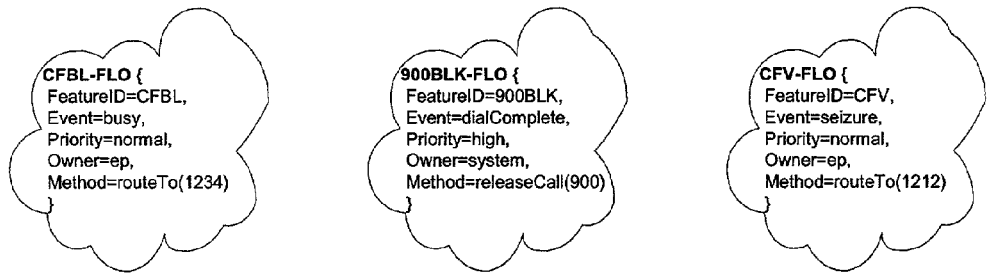
FIG. 11A illustrates a few examples of Type I feature logic objects that map triggering events to primitives defined in a primitive module of the call processing subsystem of the invention.

The system of the invention provides at least five types of FLOs. The categorization is based on the functions that the FLOs provide. An FLO belonging to type I maps a triggering event to a primitive defined in the primitive object. That is, the method of the FLO is a primitive from the primitive object. The feature data, when present, is the input to the method. Upon completion of the primitive execution, the FLO is completed. FIG. 11A depicts a few examples of Type 1 FLOs.

Figure 11B:
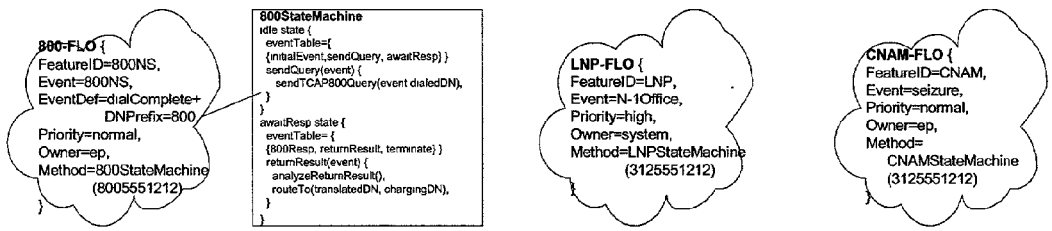
FIG. 11B illustrates a few examples of Type II feature logic objects that perform one or more transactions, and return the results of the transactions to the event triggering parties.

Another set of FLOs, herein referred to as type II, are transaction oriented. These features perform one or more transactions, and return the results of the transactions to the event reporting parties, e.g., the call control module. The transactions can be, for example, TCAP database queries, sending an email, sending a fax, etc. The transaction results are the results of the database queries, or the acknowledgements of the completion of the transactions. This type of FLO requires a transaction state. FIG. 11B illustrates some example of type II features.

Figure 11C:
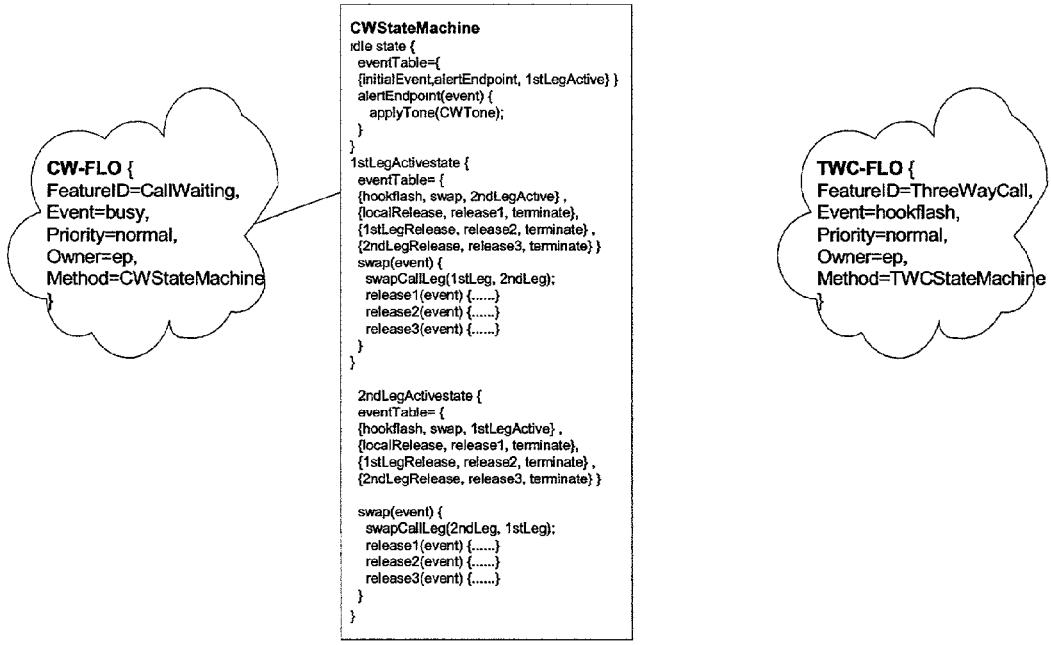
FIG. 11C illustrates a few examples of Type III feature logic objects that maintain feature states.

Another type of FLOs, herein referred to as type III, maintain feature states. State machines are utilized to implement the complicated behaviors of these features. That is, sets of dynamic events are typically defined as part of a calling feature that is enabled when the feature is activated. These dynamic events are the driving events of the feature state machine. They are disabled once the feature is deactivated or terminated. For example, when three-way feature is activated, the dynamic events hookflash, remoteRelease, and localRelease are enabled. Once the three-way call feature is terminated, these events are disabled. FIG. 11C depicts some examples of type II features.

Figure 11D:
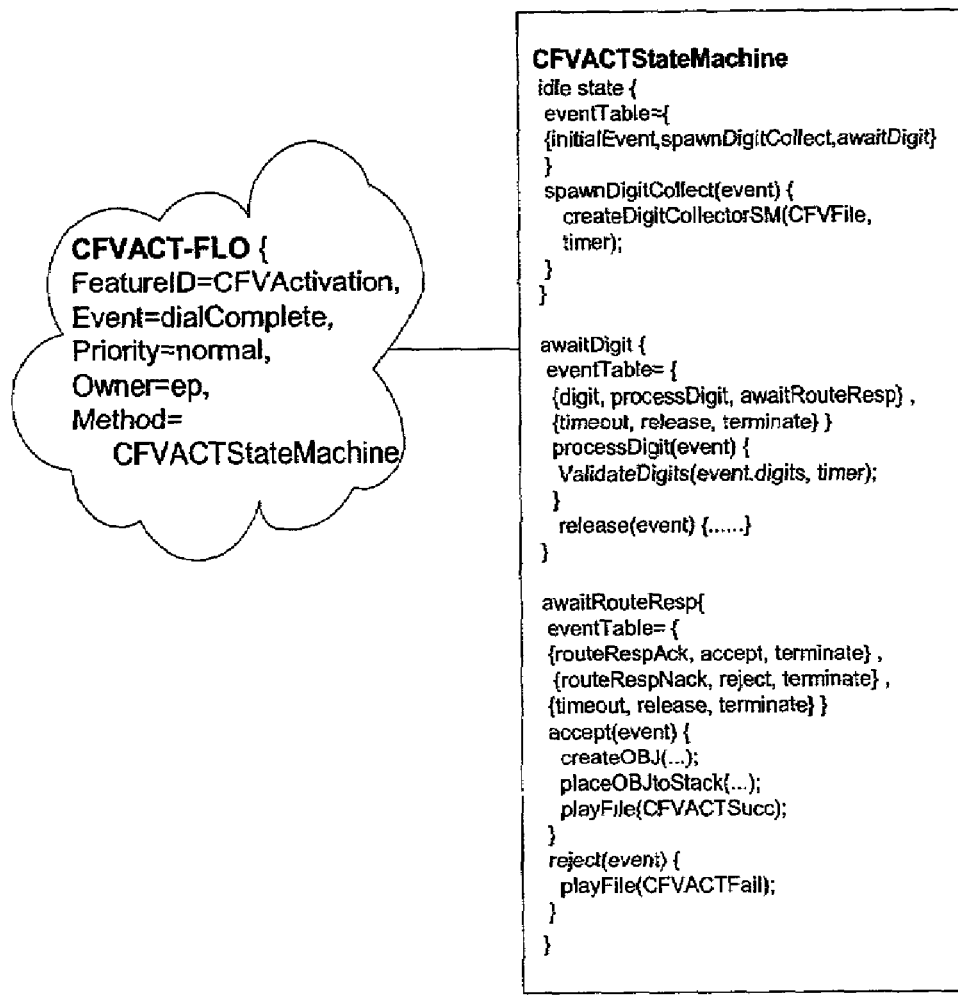
FIG. 11D illustrates an example of Type IV feature logic object that can create and/or start another feature logic object.

An FLO, herein referred to as type IV, can create and/or start another FLO. The activations and deactivations of features are of this type. There are two sub-types in this category. One sub-type relates to creating an FLO and associating the FLO with the feature object. For instance, Call Forwarding Variable (CFV) is defined as (seizure, routeCall, forwarded number). When an end user activates the CFV feature, the result of the feature is the creation of the CFV-FLO and its assignment to the end user's feature object with the seizure event. The other sub-type relates to starting the FLO. For instance, when an end user activates the Automatic Recall (AR), the AR-FLO state machine is started. FIG. 11D illustrates an example of a type IV FLO.

Another type of FLOs, herein referred to as type V, are a combination of above types I–IV FLOs. The FLOs of type I through type IV encapsulate feature behaviors of a single feature, or multiple features behaving as one feature when running together. There are situations that multiple features are defined at the occurrence of one event A determination of which features to invoke can depend on the data accompanied with the event and/or the feature priority and interaction. The user data associated with events can be utilized to determine the feature invocations. This can be implemented, for example, by (1) associating a condition with an event (i.e., defining an extended event) or (2) with an executable script. The script uses the user data to navigate the feature invocation process. The method in a type V FLO can be a reference to an executable script. For example, if there are no extended events defined in the TSP, the FLO of dialComplete event will have to use the dialed digit to determine if 800 services, 900 blocks, or other features should take place.

When multiple features exist at one event, they can all be invoked as long as they do not interact with one another. These features should have the same feature priority. For example, the calling name delivery and distinctive ringing features, defined at the seizure event, can be invoked when seizure event occurs. If the features do interact with one another, and one overrides the other, they will be assigned different priorities.

If a feature is invoked and it does not terminate at the end of the invocation, the FLO of the feature is put in the stack waiting for the occurrence of further events to complete the feature. There can be multiple FLOs on the stack for an endpoint/connection-point. When the feature is completed, the FLO is removed from the stack.

As a consequence of the invocation of a feature, the call control object may need to monitor new sets of events. These new events are herein referred to as dynamic events. The dynamic events are to be enabled only after a feature is invoked, and are disabled once the feature is terminated. A dynamic event is not associated with the endpoint's feature object. It is rather an event in the feature state machine.

Call and Feature Definition Language

The present invention employs a mark-up language, such as CPML (a derivative of XML), to define a variety of logic elements, e.g., finite state machines, such as, call processing models, calling features, re-usable calling feature elements, etc. A preferred embodiment of the invention employs CPML call and feature definition language and its supporting environment.

A call and feature definition language utilized in the system of the invention should provide an effective and efficient means of developing and deploying network based multimedia services, for example, class 5 and class 4 call services in conjunction with a circuit switch. Multimedia features within the scope of the language must include the entire spectrum of standard subscriber services[1], e.g., call waiting, call forward when busy, etc., as well as so-called next generation or convergent services, e.g., packet based voice service with common subscriber voice services. The language should also allow concise and efficient expression of simple services, such as call forwarding, while providing sufficient expressive complexity to define complex services, such as call waiting and three-way calling.

[1] This is the collection of calling services commonly referred to as "class 5" and "class 4" services.

Secondarily, the language must facilitate the leveraging of web-based technologies in support of a variety of peripheral applications such as subscriber provisioning and maintenance, "data browsers", feature editors/generators, feature validation and testing tools, etc. The language should also support feature definition and deployment within a matter of days, and should simplify overall application development by reducing dependence upon compiled code.

The call and feature definition language should make it possible to define sophisticated media services, e.g., voice calling features, without traditional software requirements: analysis, development, testing, and deployment cycle. In this regard, the language must provide the ability to define features without a "software compile." The run-time environment supporting the language defined calling features must also be sufficiently efficient to meet performance, reliability, and quality of service requirements for a reasonably large subscriber base.

The call and feature definition language must be able to define a variety of logic elements including call-processing models, calling features, re-usable calling feature elements, etc. A run-time core, consisting of a compiled object model supported by an object-oriented database, provides the fundamental capabilities (primitives) from which media services, e.g., call feature, are de fined. These primitive capabilities are exported, i.e., made accessible, to externally defined logics that comprise call models and call features. Each logic element is therefore defined in terms of well-known behaviors and attributes exported by the run-time core.

In the system of the invention, the call and feature definition language is used, in effect, to define finite state machines. The mark-up languages CPML/CPML+, derivatives of XML, are well suited to this approach. In one aspect, the language provides a standardized interface between feature definition applications (GUI desktop applications) and the service delivery systems. The XML-based languages, such as CPML, have the additional advantage that they are human readable as well as machine readable.

As discussed previously, the simplest call features are stateless. That is, the behavior of such features may be described as a simple reaction to an event because the event is closely bound to a specific state, i.e., that there is a unique set of circumstances that yields the particular event. Tight coupling between an event and a specific state eliminates the need to represent the state explicitly in the feature logic of such call features. However, certain features are sufficiently complex to require explicit representation of the state. This is particularly true when an event may be coupled with several states, i.e., when the circumstances that yield a particular event are non-unique. Under these circumstances, the state must be represented explicitly.

The logic elements defined by the call and feature definition language of the invention can include embedded parameter values. Such parameter values are accessible directly because they are embedded in line with the logic elements. This alleviates the need to navigate through the run-time object model in order to access the appropriate values. Further, embedding values within logic elements provides a more efficient expression of the feature logic. Embedding the values of attributes associated with a carrier within a logic element adds no additional storage overhead to the system because attributes associated with the carrier are in effect global values. However, embedding values within a logic element for attributes associated with a subscriber introduces additional storage overhead since there must be a distinct instance of the logic element for each subscriber that utilizes the feature. This affects both persistent store and processor memory resource consumption. Embedding attribute values within logic elements may also lead to data duplication, if two or more logic elements use the same attribute, thus complicating maintenance of the run-time data store.

In an alternative model, the embedded values of attributes constitute default values, assigned by the feature definer, that apply when there is no other specific value available within the processing context. In this model, an individual subscriber has the opportunity to define values for these attributes, but is not required to do so. When the subscriber does not provide an explicit value for one or more of these attributes, the embedded, i.e., default, values apply. This offers additional flexibility to the subscriber.

The call and feature definition language allows defining associations between logic elements. This capability supports higher order capabilities such as defining re-usable logic elements and parameterized meta-features. For instance, conducting a dialog between a feature and a subscriber using voice prompts and DTMF responses is a feature generic capability. That is, the logic for such a dialog can be defined without regard to the specific prompts to be used or the subscriber's responses. The fundamental concept of a "prompt and response" dialog is common to and therefore re-usable by a variety of calling features.
1. Specify invocation of associated logic elements including the passing of parameters from calling logic to called logic.
2. The ability to specify the circumstances wherein one logic element activates, or calls, an associated logic element is fundamental to re-using feature generic logic elements.

The language also allows defining extensions to the core object model. In particular, the language, along with appropriate run-time support, includes some capability for extending the core object model by introducing new data objects. These extensions are referred to as data object because they hold values required by the associated feature logic. This advantageously alleviates the possibility that the core object model may not completely anticipate the specific needs of all features to be offered.

Call models and calling features are essentially event driven. Thus, the language provides the ability to associate behavioral responses with events. This includes specifying the source or sources of a particular event and whether or not the event is synchronous or asynchronous.

The language can define features based upon the attributes and behaviors that comprise the core object model as well as extensions to the model, based upon available attribute types, defined by the language itself. The feature definition environment preferably includes a representation of the core object model in order to provide the most complete expressive capability. Further, the language allows identifying associations between run-time objects. Utilizing associations between core objects allows exploiting the core model efficiently.

The language also Identifies means of navigation of associations between run time objects. In order to access behavior and attributes through associations, the language includes means for specifying navigation from object to object using known associations.

A logic element must be able to express interest in a particular event in order to respond to the event. The underlying core objects can propagate events along these lines of interest in order to ensure correct behavior.

The language can also identify whether a logic element is dependent or independent of a particular run-time processing context. Each feature or call model logic executes with respect to a processing context. Processing contexts, which are part of the core object model, are the basis for routing and dispatching events and messages as well as gaining access to processing threads. There are two fundamental processing contexts within the core object model—the call and feature classes. The call class provides the processing context for call models. Call model logic elements are always subordinate to a specific call context since the life span of a call and a call context are always coincident. However, feature logics may be dependent upon or independent of a call context.

Figure 12:
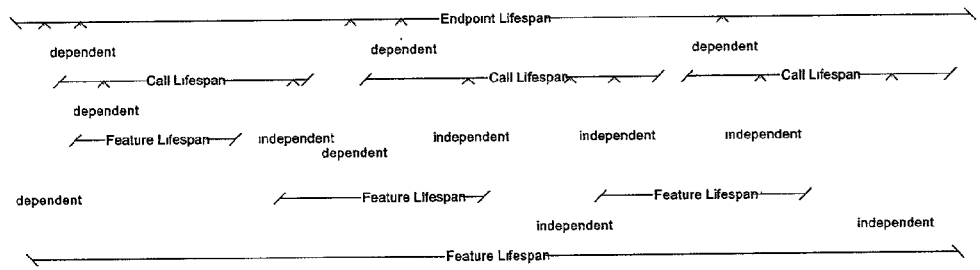
FIG. 12 illustrates that dependent feature logics have life spans equal or less than the life span of the associated call context.

As depicted in FIG. 12, dependent feature logics have life spans no greater than the associated call context. Therefore, a dependent feature logic element may be integrated into the associated call context or it may execute independently using a dedicated feature context. Independent feature logics may have life spans that exceed the associated call. Indeed, certain features may span several calls. Independent feature logics must therefore use dedicated contexts in order to facilitate the appropriate life span regardless of the life spans of the associated call or calls.

The use of a markup language as a call and feature definition language in the system of the invention provides a number advantages. For example, markup document parsers are typically dependent only upon the structure of a document as specified by the document type definition. In particular, parsers are independent of the contents of the documents. Hence, introducing the appropriate document type definition and related applications effectively introduces a new document type into the system. That is, it is not necessary to define, implement, and test a new parser. The parser can therefore be re-used by a variety of different applications.

A validating parser may assist with context validation by insuring that a markup-based document adheres to the specified structure. It may also assist with certain types of data element validation, e.g., it may support validation of enumerated or other constrained data types.

Further, markup languages tend to support schema flexibility. A markup-based language can specify a variety of data structures including hierarchical structures that are difficult to implement via traditional line oriented ASCII files. Using the capabilities inherent in the call and feature definition language, it is possible to define a variety of log file formats, such as CDRs, system logs, and so forth, so long as the requisite attributes exist in the core object model or in an extension to the core model, or can be derived from existing attributes, and further, accessor methods are available. Furthermore, given that one logic element can reference and invoke another, using the language to define and produce log files provides substantial flexibility.

In addition, markup languages provide a standard and flexible way of capturing and representing data entities that are shared among heterogeneous execution environments. Different implementation languages may be used for different applications. While the core run-time system calls for a compiled object model, peripheral and front end applications may be implemented by utilizing a more convenient language such as Java.

The control and feature definition language and its supporting environment can facilitate and accelerate development of peripheral applications, such as a subscriber provisioning and maintenance application by supporting languages and development tools optimized for this purpose. Furthermore, maintaining data repositories, such as the subscriber database, in markup form may simplify development and maintenance of peripheral "back office" applications, as well as interfaces to external systems.

Figure 13:
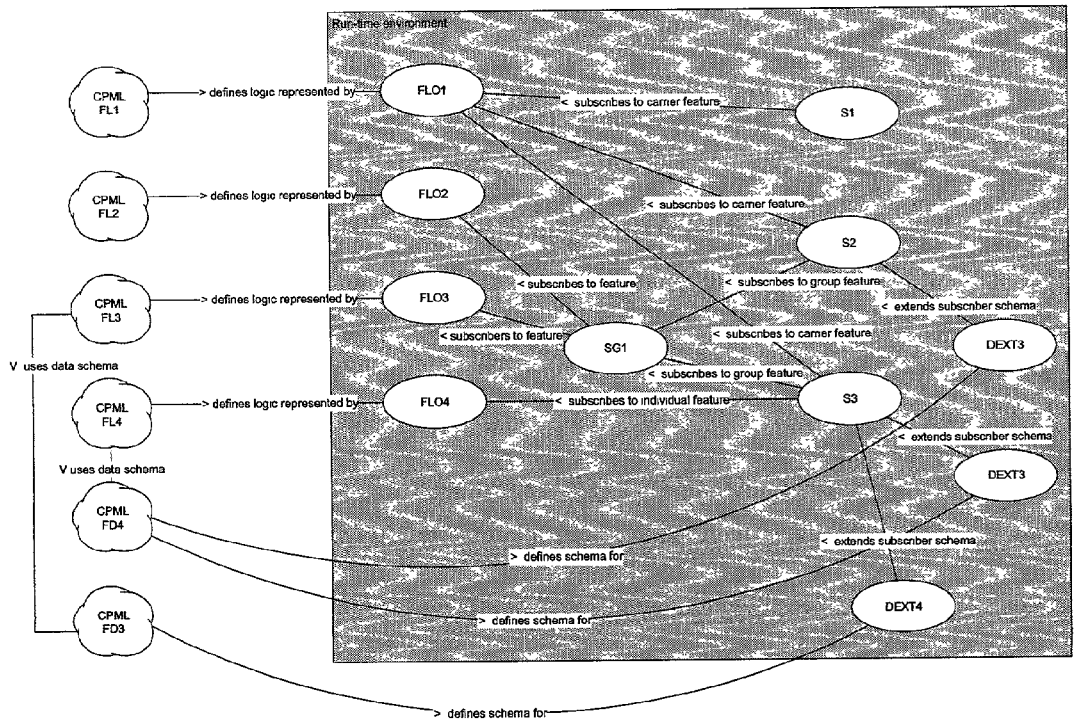
FIG. 13 is a diagram depicting a logical view of selected aspects of a subscriber's associations with features.

FIG. 13 is a diagram depicting a logical view of selected aspects of subscriber associations with features. In this diagram, a cloud labeled CPML FLN represents a call feature defined by the language, and a cloud labeled CPML FDN represents a feature data object defined by the language. Ovals represent object instances within the run-time system. Objects labeled FLON represent feature logic objects; objects labeled FDON represent feature data objects. Further, objects labeled SGN represent subscriber group objects; and objects labeled SN represent individual subscribers. Lines and arcs represent associations or relationships between the entities connected to the ends.

Feature logic objects correspond to feature logic definitions. They are in effect "compiled" representations of the logic constructed from object instances that correspond to the logic elements used by the definition language. These objects are used by the rum time system to direct and control the core object model in order to deliver the desired feature behavior.

Feature data objects, as shown in FIG. 13, represent instances of the "schema" defined by the feature definition elements. These objects, labeled DEXTN, extend the core object model "schema" (the S and SG ovals represent the core object model). Although there is an association between the language-based feature logic and feature data specifications, which indicates the feature logic's dependence upon the specified data, this association is not implemented directly within the runtime system. Instead, this association is implemented indirectly through the subscriber objects. This allows feature logic objects, as shown here, to remain context free. Feature logics can be instantiated as singletons, thus reducing storage overhead so long as they remain context free.

This model also depicts the three mechanisms for associating features with subscribers. Each subscriber is associated with the carrier features provided to all subscribers, e.g., FLO1. Two of the subscribers, S2 and S3 are members of group SG1 and therefore are associated, indirectly, with features FLO2 and FLO3. Because these subscribers are associated with a feature (FLO3) for which there is a feature data extension to the core object model, these subscribers have been provisioned with instances of the appropriate feature data object, namely, DEXT3. Subscriber S3 has an individual level subscription to feature FLO4. Accordingly, this subscriber has also been provisioned with an instance of DEXT4.

Figure 14:
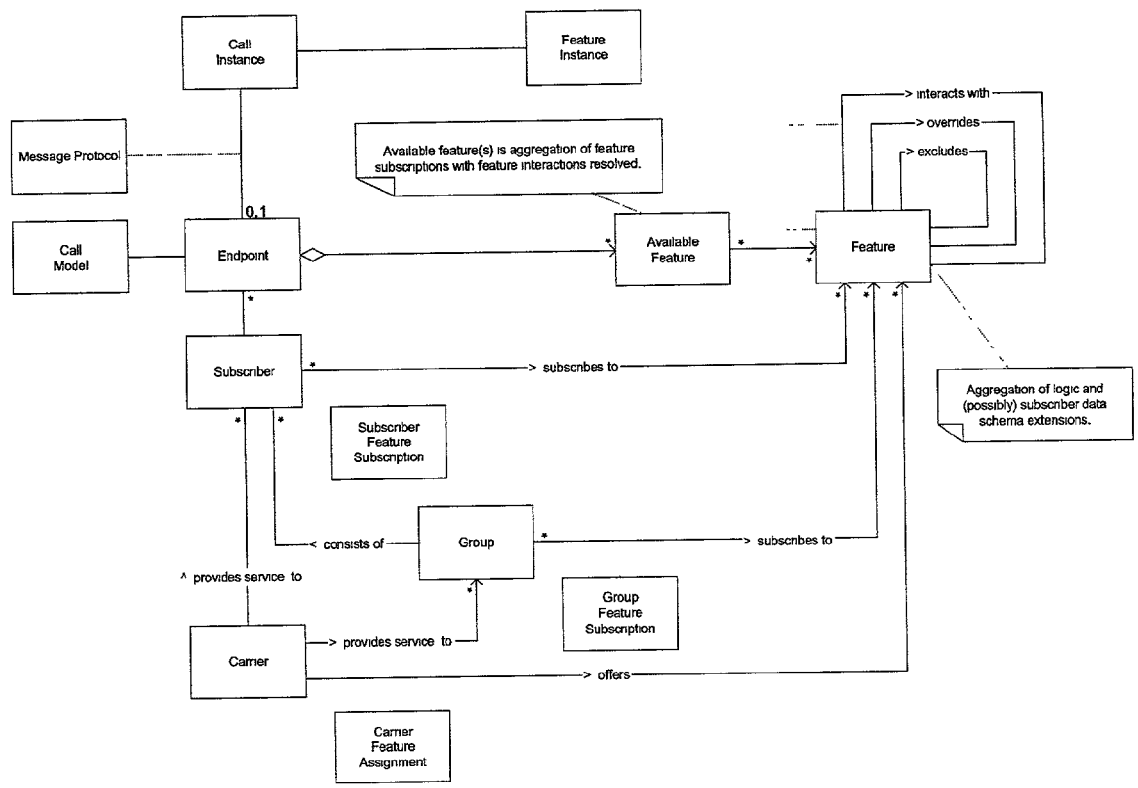
FIG. 14 is a diagram providing a detailed representation of selected portions of a core object model representing subscriber associations with features and the resolution of feature interactions.

FIG. 14 provides a detailed representation of selected portions of the core object model. This model represents subscriber associations with features and the resolution of feature interactions. A subscriber, which uses 0 to many endpoints (media devices), may subscribe individually to 0 or more features. A group, consisting of 0 to many subscribers, may subscribe to 0 or more features. A carrier, which provides service to 0 to many subscribers and provides service to 0 to many subscriber groups, may offer 0 or more features.

A feature may exclude another feature, may override another feature, or may interact with another feature. When an exclusion relationship exists between two features, feature provisioning must resolve this conflict so that one and only one of the two features is available to the subscriber's endpoint (at run-time). When one feature overrides the other, the run-time system must ensure that the two features are not executed coincidentally and that the higher priority feature is preferred. When two features interact, a third feature, which resolves the interaction, must be defined to substitute for the conflicting individual features. The available features association between a subscriber's endpoint(s) and features represents the resolution of these interactions.

Figure 15:
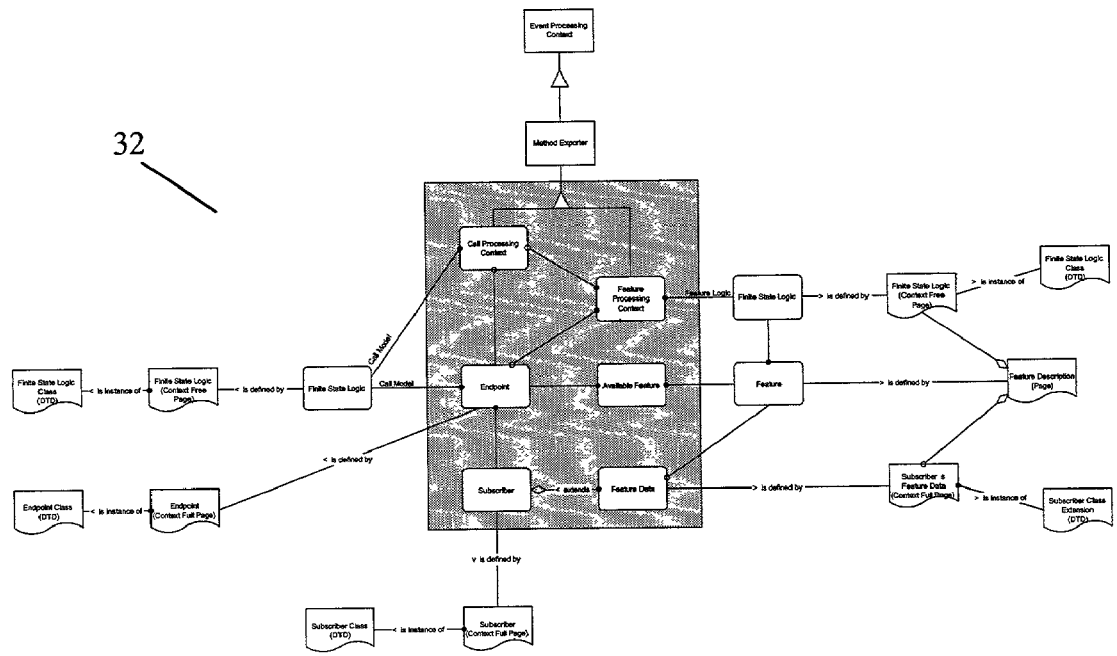
FIG. 15 is a diagram illustrating a model that depicts the correlation between instances of a core object model utilized in a system of the invention and the elements of the call and feature definition language of the invention.

FIG. 15 illustrates a model 32 depicting the correlation between core object model instances and the elements of the call and feature definition language. One or more endpoint objects are associated with the subscriber object. A finite state logic instance, representing the call model, is associated with each endpoint and is consistent with the endpoint type. This object controls each call-processing context that becomes associated with the endpoint. Further, a set of references to available features is also associated with each endpoint. Each feature is associated with a finite state logic object and may be associated with a feature data object. The finite state logic object controls each feature instance (the feature data instance). A component of the subscriber object, when present, contains the necessary subscriber specific attribute values.

A call processing context is always associated with an endpoint. A feature-processing context may be associated with a call processing context and/or may be associated directly with an endpoint. A feature-processing context representing a dependent feature may be associated with a call-processing context without being associated with an endpoint. An independent feature must be associated with an endpoint.

FIG. 15 also depicts the correlation between objects within the runtime environment and external call and feature definition components. A subscriber page describes a subscriber instance (object). In turn a subscriber page is an instance of the subscriber class, i.e., an instance of the subscriber document type. The subscriber class (document type definition) defines the name and type of each attribute as well as the name, type, and parameters of each behavior exported by the subscriber object class. The document type definition is used to capture and validate subscriber attributes and to validate logic instances that reference, i.e., depend upon, subscriber behavior and attributes. Similar relationships exist between other objects and external documents (pages).

Call and Feature Definition Environment

Figure 16:
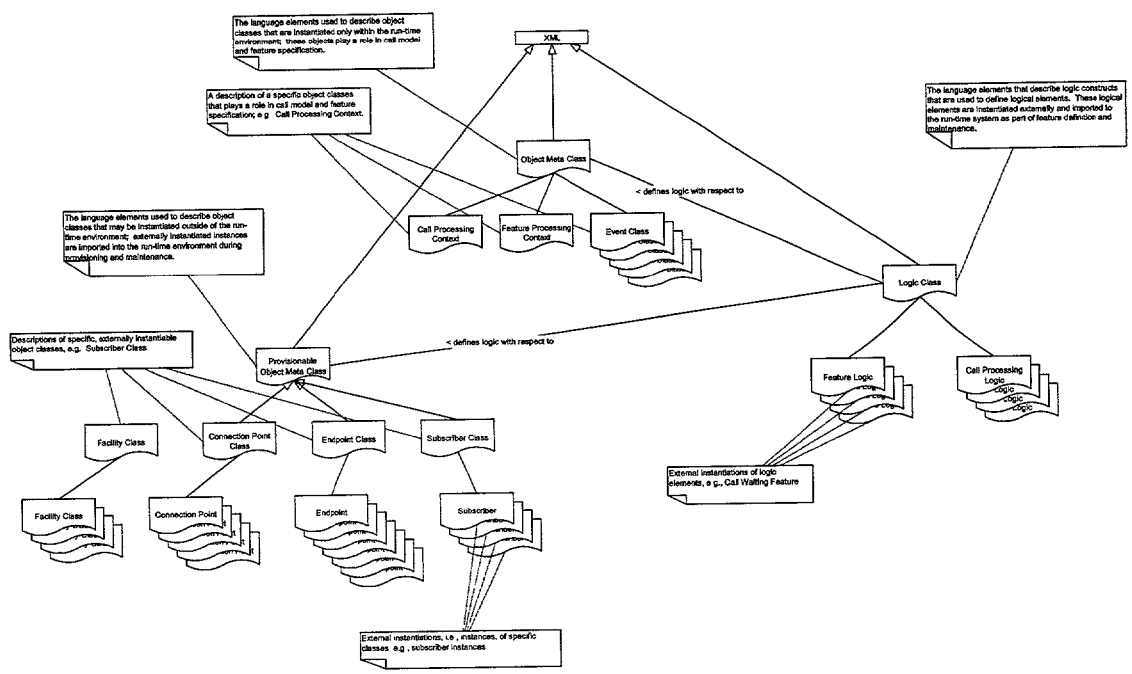
FIG. 16 is a diagram depicting some fundamental elements of a call and feature definition environment of an embodiment of the system of the invention.

FIG. 16 depicts some fundamental elements of a call and feature definition environment of an embodiment of the system of the invention. Three fundamental document types, based on XML, for example, are present, namely, an object meta-class, a provisionable object meta-class, a logic class.

The object meta-class is the document type definition for describing non provisionable core object classes. A non-provision able class is one whose instances may be instantiated only during run-time call and/or feature processing. Examples of non provisionable classes include call-processing context, feature processing context, event classes, and so forth. These class definitions specify attributes and behaviors exported by the core object model that may be used to define call processing and feature logics.

The provisionable object meta-class is the document type definition for descriptions of provisionable core object classes. A provisionable object class is one whose instances are provisioned, i.e., a class whose instances are defined and maintained by a peripheral application, and then imported into the core object model. Examples of provisionable object classes include, for example, subscriber and endpoint. These class definitions support the provisioning and maintenance applications as well as define the attributes and behaviors exported by the core object model for call and feature processing logic definition. In one embodiment of the invention, provisioned instances are maintained in markup form to support various peripheral applications such as subscriber maintenance, bill processing, and so forth. Maintaining a repository of markup-based data eliminates the need to extract data from the run-time data store to support these applications.

The logic class is the document type definition for descriptions of call and feature processing logic elements. As shown, logic descriptions are described with respect to object meta-classes and provisionable object meta-classes. In other words, class descriptions derived from the object meta-class and provisionable object meta-class are referenced by logic elements derived from the logic class. These relationships support definition, through specification of attributes and behaviors, and validation, by prohibiting the use of non-existent attributes and/or behaviors in the definition of a logic element. This capability also provides a certain degree of flexibility. For example, new attributes and behaviors can be introduced by updating class definitions. That is, there is no need for modifying the "language" used to define call and feature processing logic.

The basis for call and feature implementation in the system of the invention is a runtime object model that exports access to its attributes and behaviors to an external logic definition environment. The run-time object model can include, for example, compiled C++ objects that export their attributes and behaviors to such an environment.

Figure 17:
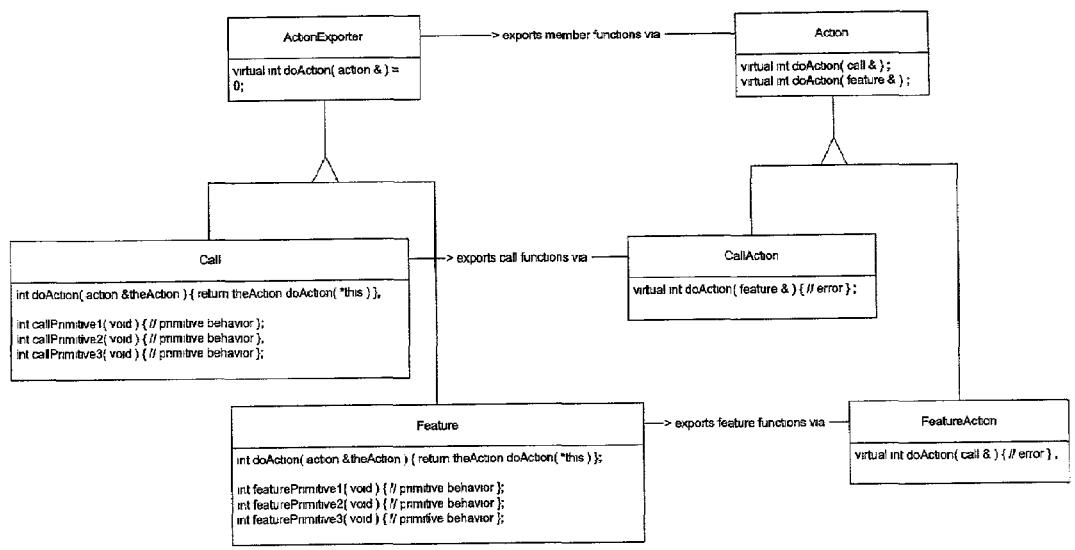
FIG. 17 is a diagram depicting an exemplary technique by which a compiled C++ object can export its attributes and behaviors to the logic definition environment of the invention.

FIG. 17 is a diagram that depicts an exemplary technique, presented for illustrative purposes, by which a compiled C++ object may export its attributes and behaviors to the logic definition environment. This technique is presented for illustrative purposes.

In C++ typing system, a caller must know an object type in order to call a member function of the object. Therefore, a mechanism is needed for resolving type linkages at run-time given a logic structure defined in a text-based document.

The technique illustrated in the diagram utilizes two abstract classes, namely, ActionExporter and Action. An ActionExporter is a class that exports access to one or more of its member functions. An Action is the mechanism for exporting access in a type specific and type safe manner. ActionExporter defines a single, pure virtual member function doAction (Action &). The sole parameter to this function is a reference to an Action instance. Since the method is pure virtual, each derived class must provide its own implementation of doAction.

Action defines two, pure virtual member functions doAction (Call &) and doAction (Feature &). The function name is overloaded on parameter type; doAction may be called with a reference to a Call instance or a reference to a Feature instance. This establishes Call and Feature class instances as the only recognized exporters of behavior via Action instances.

Two classes are derived from ActionExporter: Call and Feature. Each has three primitive member functions and each provides a similar implementation for doAction. A call to doAction results in a call to the specified Action's doAction function passing a reference to this. Conceptually, when a Call or Feature is instructed to "do an action", the result is "do the specified action using myself." Call and Feature each have a corresponding derivative of Action: CallAction and FeatureAction. These classes provide a mechanism for catching certain type mismatches that may result from improperly defined logics, for example, a CallAction passed to a Feature instance and a FeatureAction passed to a Call instance.

Figure 18:
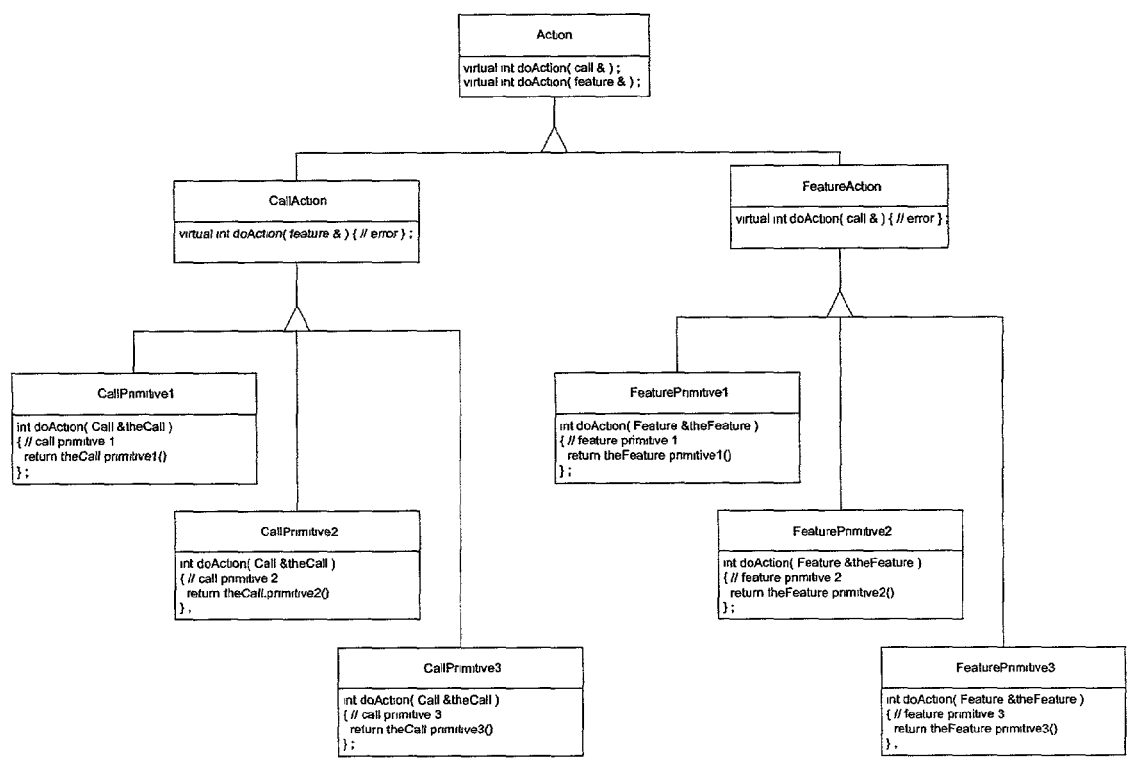
FIG. 18 is a diagram illustrating an example of the class hierarchy derived from an Action abstract class defined in a C++ environment in accord with the teachings of the invention.

FIG. 18 is a diagram illustrating an example of the class hierarchy derived from Action. Classes derived from CallAction and FeatureAction correlate to the primitive functions to be exported by the Call and Feature classes. A leaf class in the Action hierarchy corresponds to each primitive function exported by the corresponding Call or Feature class. Each leaf class instance defines doAction function to call the corresponding Call or Feature primitive method. The calling cycle is thus completed. When a leaf class instance is called with a reference to a Call or Feature instance, it in turns calls the appropriate member function.

The above example demonstrates a technique for exporting access to functions in a compiled object model. A further appreciation of the technique may be attained by reference to FIG. 36B.

As stated previously, the call and feature definition language can represent finite state machines. FIG. 19 illustrates an exemplary state machine that can determine the parity of a string of 0s and 1s. This machine has three states, Initial, Running, and Done. The machine recognizes only three events; a 1, a 0, and last; last indicates the last data value has been seen.

Two logic definitions, one defining an even parity machine and the other defining an odd parity machine, are presented. Although the logic texts were not defined using a markup language, their structure is hierarchical and could easily correlate to a markup structure. The process for converting these logic descriptions to an executable form includes the following steps:

(a) parsing the text file as specified by the document type definition,
(b) verifying that each element corresponds to an appropriate logic element defined by the state machine's object class specification, and
(c) constructing a finite state machine consisting of Action instances corresponding to the behaviors referenced in the logic specification structured according to the specified state and event relationships.

A generalized parser, for example, can perform step (a). A "compiler" can perform steps (b) and (c). The result is an object based finite state machine logic that can be executed by a generalized engine. The execution engine operates at the abstract level, i.e., the execution engine operates with ActionExporterS, ActionS, and object based finite state machines. Type resolution at run-time is handled, for example, by the virtual method calling capabilities of C++.

FIG. 20 illustrates a diagram containing an approximate schema for the logics defined previously. The logic consists of a set of states. Each state responds to one or more events.

Each event has one ore more action sequences. Each action sequence consists of an optional predicate, one or more actions, and a corresponding next state. Each action may have one or more corresponding parameters. Predicates, actions, and parameters each correspond to an action exported by the run-time object model. A predicate yields true or false, an action is a simple function, and a parameter yields an attribute value.

When an event occurs, the corresponding action sequences are identified and processed as follows:

```
for each sequence
do
    if predicate is nil or do predicate is true
    then
        for each action in sequence
        do
            for each parameter with action
            do
                save value of do parameter
            done
            do action passing saved values (if present)
        done
        set state to next state
        exit for loop
    endif
done
```

Figure 21:
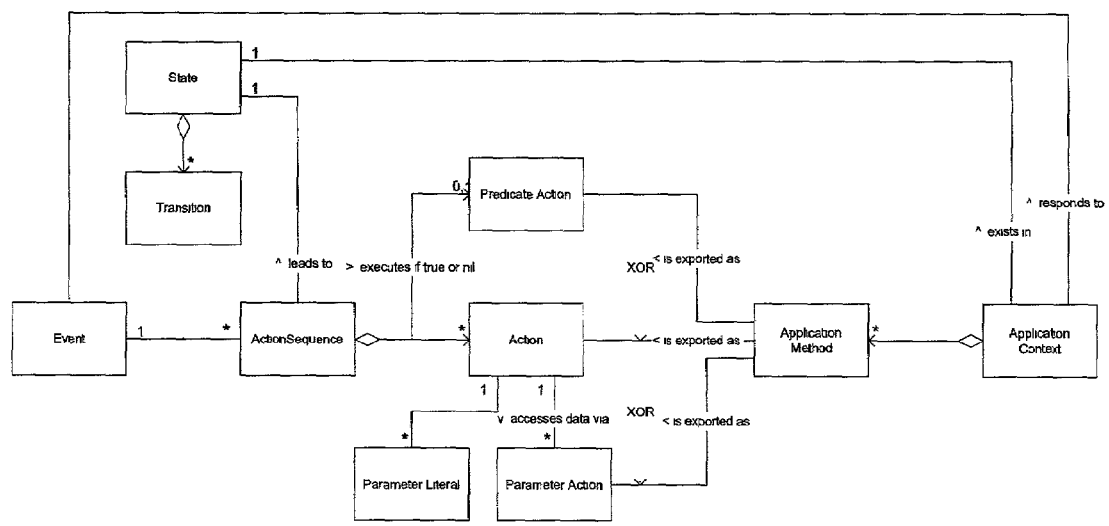
FIG. 21 illustrates an object model for a finite state machine, FIG. 22 schematically illustrates exemplary TSP/CSX class 4 and class 5 switches according to the teachings of the invention.

FIG. 21 illustrates an object model for a finite state machine consistent with the previous description. A state consists of one or more transitions. Each transition consists of one or more associations, called transitions, between an event and one or more action sequences. An action sequence consists of no more than one predicate action and one or more actions. An action may be associated with one or more parameter literals and/or one or more parameter actions. Each action sequence is associated with one state.

An application context controlled by a finite state machine exists in a single state and responds to specified events. An application context consists of one or more application methods (functions). Each such method is exported as a predicate action, an action, or a parameter action. A method is generally exported as a single action type. Predicate actions yield true or false. Actions are simple functions, and parameter actions yield generic value wrappers. A value wrapper is a generic holder for attribute values. Parameter literals represent values embedded within the logic definition.

System Components

Figure 22:
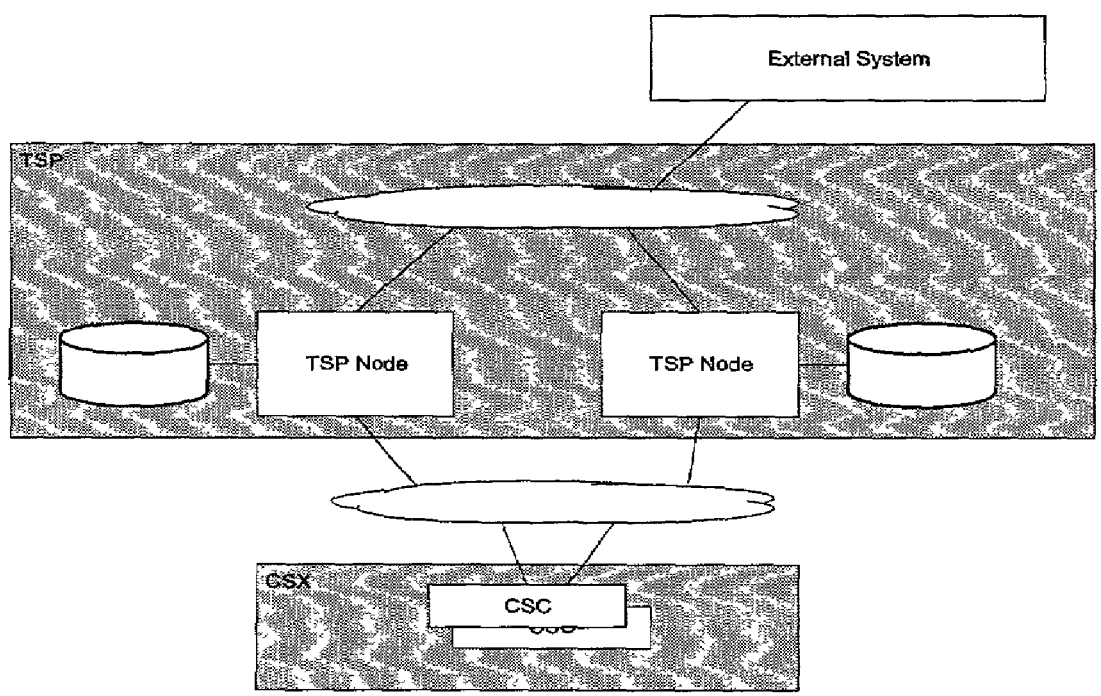

FIG. 22 schematically illustrates exemplary TSP/CSX class 4 and class 5 switches according to the invention having several TSP processor nodes and several CSX switch nodes. The aggregated TSP nodes and associated peripherals together constitute the TSP. Each CSX switch element can be considered individually due to its unique arrangement of network and subscriber access facilities. Together, the TSP and CSX nodes are considered a single consolidated system.

A exemplary embodiment of the TSP/CSX system of the invention includes at least two TSP processor nodes, redundant or fault resilient persistent storage devices, and an isolated LAN dedicated to communication between TSP processor nodes and the CSX central shelf controllers. The TSP/CSX system can further include an IP based LAN, independent of the TSP/CSX communications LAN, that supports distributed TSP application and third party software components. The IP based LAN also provides access to external systems as necessary to support operation of the TSP/CSX within a carrier's environment.

Each processor node is capable of operating in an independent fashion. Each processor node can include its own independent CPUs, RAM, etc. Power supplies can be independent unless the supply itself is fault resilient. The processor nodes may be housed separately or together depending upon the most desirable configuration consistent with the target footprint, unit cost, and so forth.

Each processor may have a dedicated persistent storage device so long as the TSP application software, possibly in conjunction with third party software components (such as data management software), provides an acceptable level of protection against loss or destruction of vital system and/or carrier data.

Further, the two processor nodes may share a single storage device so long as the device is inherently fault resilient or, in conjunction with other third party software, can otherwise provide an acceptable level of protection against loss or destruction of vital system or carrier data.

Each consolidated system provides connectivity between the TSP and at least two central shelf controllers for each CSX node. The LAN is selected to be fault resilient and/or provide redundant pathways between at least two TSP nodes and each central shelf controller pair.

The IP based LAN is selected to provide sufficient bandwidth to support distributed software components and communications traffic between the TSP processor nodes and external systems. In addition, additional communications pathways can be added as may be required.

TSP/CSX Communications

Figure 23:
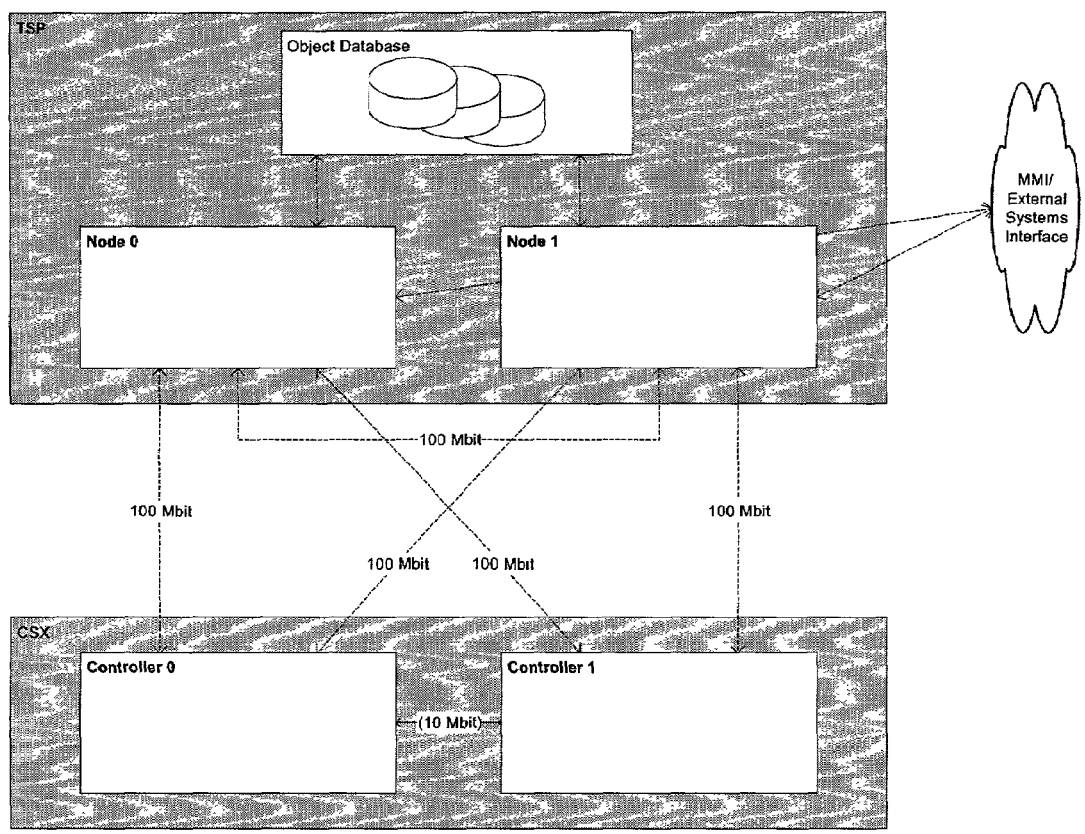
FIG. 23 illustrates exemplary communications paths within an embodiment of a consolidated TSP/CSX system of the invention.

FIG. 23 illustrates exemplary communications paths within an embodiment of a consolidated TSP/CSX system of the invention. Each TSP processor node has access to a shared persistent data store. Each node also supports man-machine interfaces and interfaces to authorized external systems such as billing systems, and subscriber provisioning systems. Database access and external interfaces may be supported by a single LAN. Alternatively, separate LANs may be utilized to provide the desired system performance.

A dedicated LAN having a bandwidth, for example, of 100 mbps, interconnects each TSP processor node and CSX central shelf controllers. This LAN provides the communications backbone of the consolidated system, and is the primary means for accessing the CSX switches. The LAN configuration provides a single communications path between each TSP node and each central shelf controller. The LAN hub is fault resilient. The LAN also supports TSP node-to-node communications for call and feature processing and system and network management. In addition, there is a 10-megabit communications channel between the CSX central shelf controllers. This channel supports CSX internal functions.

Figure 24:
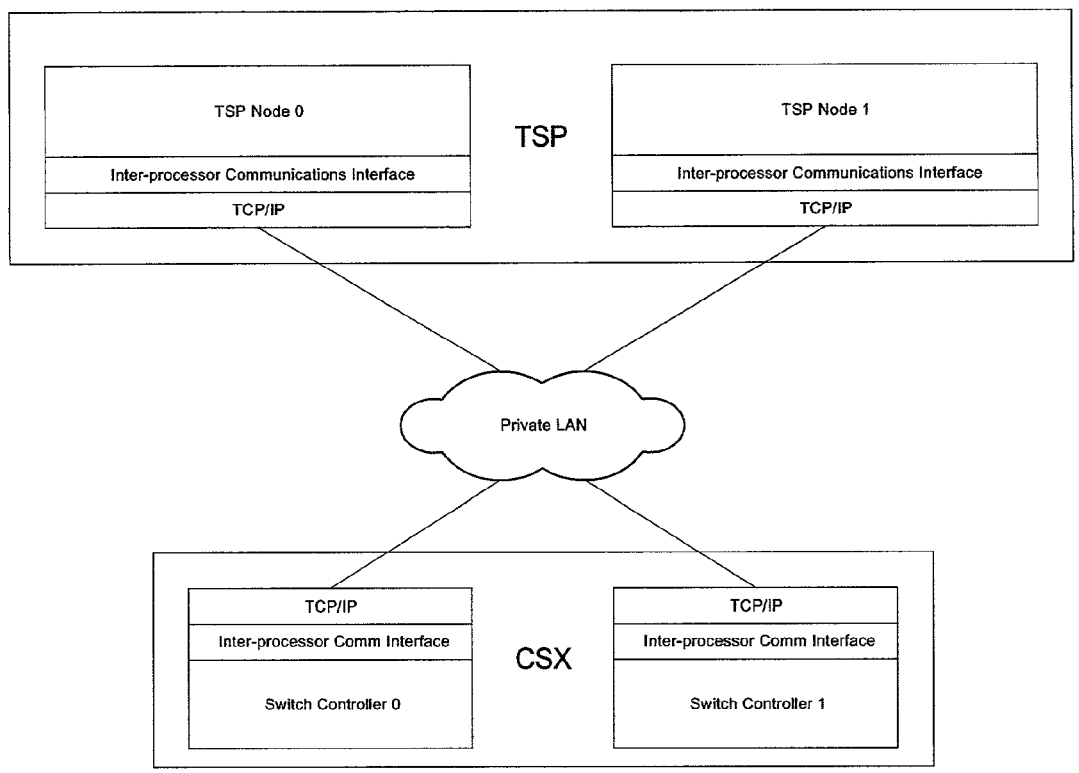
FIG. 24 illustrates a message distribution and transport (software) layer according to the invention interposed between the TSP/CSX application software and underlying network interfaces of a system of the invention, FIG. 25 schematically illustrates a redundant N+1 configuration of a system of the invention having four TSP nodes and three CSX switch elements, FIG. 26 schematically depicts another configuration of a system according to the teachings of the invention in which the traffic load for each CSX switch has been partitioned into thirds and distributed equally among three primary TSP nodes.

As depicted in FIG. 24, a message distribution and transport (software) layer is interposed between the TSP/CSX application software and the underlying network interfaces. The purposes of this layer include, for example, presenting the TSP as a single logical entity to the CSX application software, and establishing and maintaining reliable point-to-point connections between TSP nodes and CSX central shelf controllers. This layer is statically configured to include provisions for alternate routing in support of fault tolerance.

The distribution and transport layer hides details regarding the configuration of TSP nodes from the CSX software, and provides deterministic inter-processor routing of messages associated with specific physical locations. Messages related to specific physical entities, such as endpoints, trunks, are routed to the TSP/CSX elements having those entities within their scope. The distribution and transport layer has access to necessary physical configuration data needed to ensure consistent and reliable message routing between processing elements.

Fault Tolerance

Fault tolerance refers to the ability of a system to provide continuous application services in spite of faults and processing interruptions that may occur within the system. These include the ability to continuously satisfy service requests on demand as well as the ability to complete processing of all service requests. For example, with respect to the TSP/CSX of the invention, fault tolerance refers to the ability to complete calls, call features, and call services as well as the ability to complete calls, call features, and call services once such services have been initiated. These capabilities further include reliable capture and preservation of information utilized for billing, service management, etc.

A system that is fault tolerant typically has the following characteristics. It includes, for example, redundant processing elements, and has the ability to dynamically substitute one processor for another. Such a system also provides redundant communications paths between processing elements and the ability to dynamically substitute one communications path for another. Further, a fault tolerant system typically provides redundant system access paths between the system and its client community, and the ability to utilize any available path to provide service. In addition, the system can have redundant or multiple persistent storage elements that provide continuous access to information used by application services, and that provide reliable persistent storage of information produced by application services. Redundant data access paths including the ability to substitute one data access path for another are also provided.

In a fault tolerance system, one processing element may be called upon to substitute for another under the following exemplary circumstances:

(a) a processing element experiences a processing fault or failure that prevents it from handling new service requests and/or prevents it from completing one or more services already in progress, (b) a processing element is administratively prohibited from handling new service requests and completing services already in progress, (c) a processor is administratively prohibited from handling new service requests but is permitted to complete services already in progress.

In case (a), the system recognizes that a fault or failure has occurred, determines that the affected processing element cannot or should not continue processing, and shifts responsibility to one or more alternate processing elements. In cases (b) and (c), an external authority has issued a command to shift processing responsibility from one processing element to one or more alternative processing elements. The above case (b), sometimes called a forced switchover, is typically a response to an event or set of events within the system that call for urgent re-action to prevent loss of service. The above case (c), sometimes called a graceful switchover, is typically a pro-active measure to prevent service degradation or to initiate some system maintenance activity.

The decision making and failover execution mechanisms need not be integrated. A single switchover capability that can serve in forced and graceful situations can be activated by any number of decision making capabilities including internal and external decision sources.

One communications path may be substituted for another under the following exemplary circumstances:

(a) a communications path has failed or become unreliable, and/or (b) a communications path is administratively removed from service.

The determination that a communications path has become unreliable is generally carried out by a processing element within the system. However, the decision to substitute one communications path for another due to poor reliability can be made by an external entity.

Selection and control of data access paths is normally confined within the system itself. In particular, decisions regarding the viability and selection of a data access path are usually handled exclusively by the system. Redundancy of storage elements is usually controlled by the data management system. The data management system may offer the ability to configure storage elements but usually does not provide run time control.

A system that can continue and complete at least some services in progress and/or satisfy at least some new service requests is referred to herein as being partially fault tolerant. A system that can continue and complete all outstanding service requests and satisfy all new service requests is herein referred to an being completely fault tolerant.

The system of the invention provides at least partial fault tolerance of single points of failure. That is, the system can continue operation even if the failure of a single system component occurs. For example, the system of the invention provides continuous support for the initiation of calls, call features, and call services. It further provides continuous support for stable calls, call features, and call services. For telephony services, calls wherein both parties have engaged in two-way conversation are traditionally considered stable. In the system of the invention, a call, call feature, or call service that is in a stable state, is not adversely affected by the failure of a single system component. In addition, the system of the invention prevents the loss of billing data related to completed calls, call features, and call services. It further reduces the loss of system data such as logs, performance statistics, usage statistics, etc. Those skilled in the art will appreciate that the system of the invention can also be configured to provide complete fault tolerance.

The system of the invention can declare processor faults upon various conditions that include, but are not limited to, loss of communications between TSP and CSX, loss of access to database, system (internal) resource exhaustion, program exceptions, and audit exceptions. A processor may declare its own failure or be declared failed by an external entity. In some embodiments that do not provide communications path redundancy, a variety of problems including loss of a physical connection, system level software errors, and a non-responsive far end processor (either TSP node or CSX switch controller) appear as loss of communications between two elements. Loss of a single physical connection or a software exception associated with a single connection appears as isolation of the connected processor, e.g., loss of connection between a TSP node and the LAN hub results in CSX switch controllers talking to, for example, one TSP node. Apparent isolation of a TSP node mandates a TSP failover, and apparent isolation of a CSX switch controller mandates a controller failover.

In some embodiments, a variety of problems including disk controller failures and system level software errors appear as loss of communications between a TSP and the database. Loss of database access mandates a TSP failover.

Further, to the extent that system level resources can be identified and quantified, the system can monitor resource availability and declare faults upon resource shortages. In addition, to the extent that program exceptions can be identified and "caugh", the system can recover and declare a software fault. Audit procedures may also be defined to examine various system characteristics and declare faults when acceptable limits are exceeded and the problem can not be corrected.

In some cases, for example, in cases of non-responsiveness or unacceptable performance, one processor may declare that another has failed. In one model, referred to an "bee watcher" approach, one processor can monitor another and declare the failure of the monitored processor if it fails to respond to a query, or fails to meet a pre-arranged schedule commitment. In another model, referred to as "breach of service contract" model, a client processor may declare that a server processor has failed when it no longer receives acceptable service (the server may be non-responsive or may respond too slowly). Upon failover, the designated standby or alternate processor must assume the failed processor's role. That is, it must load the applicable context information from the persistent store, prepare to continue viable calls, call services, and call features, or terminate unviable calls, call features, and call services. Loading contexts is necessary because there may be recoverable contexts in states that require termination and for which no external events may be expected.

The process of recovering contexts is preferably governed by a policy that recovers the most useful contexts first, and prioritizes response to external events, representing immediate service need, over recovery. The policy should also prevent a load spike that would degrade the processor's performance (recovery process should spread processor demand over time to prevent the recovery process from degrading system response to external events). The system has also the ability to recover a context from the persistent store upon an external event. The failover and recovery procedure also ensure that the failed processor does not inhibit service as it is restored to service.

In the system of the invention, one processor can substitute for another to continue a stable call, call feature, or call service. In particular, the system of the invention provides descriptions of calls, call features, and call services, which include the notion of condition or state, that are transportable from one processor to another. As the detail and accuracy of these descriptions increase, the system's level of fault tolerance also increases. For example, if a call is waiting for the result of a database transaction, that information will be lost following a processor substitution unless the pending transaction is represented in the call's description. If the call description includes a description of the pending transaction, the transaction request could be re-issued as a recovery measure upon failover.

Redundancy Configurations

The architecture of the system of the invention offers a variety of redundancy configurations. The TSP/CSX system of the invention can include (a) redundant processing nodes within the TSP, (b) redundant switch controllers within the CSX, (c) fault tolerant object database shared by the TSP nodes, (d) fault resilient 100 Mbit LAN hub interconnecting the TSP processing nodes with the CSX switch controllers, and (e) separate man machine and external system interfaces for each TSP processing node.

Redundant TSP processing nodes provide the basis for implementing fault tolerant application software. The processing nodes are independent, and fault tolerance features are provided by the application software. In one embodiment, two TSP processing nodes share a fault resilient object database. This database provides persistent storage for all system data and is the mechanism for sharing run time state information between the two TSP nodes. Further, a fault resilient LAN Hub provides communications paths between the TSP nodes and the switch controllers. One embodiment includes the following four distinct communications paths:

(1) Node 0 to controller 0, (2) Node 0 to controller 1, (3) Node 1 to controller 0, a Node 1 to controller 1. Each path consists of two connections, namely, (1) Node to Hub, and (2) Controller to Hub. This configuration can tolerate loss of a single node to hub connection, of a single controller to hub connection, or loss of one node to hub connection and one controller to hub connection. Loss of a TSP node to hub connection prohibits load sharing between the TSPs and may or may not mandate a TSP node failover (a switch controller failover would not be necessary). Loss of a switch controller to hub connection does not prohibit TSP load sharing and does not require a TSP node failover, but it may require a switch controller failover. Loss of two connections prohibits load sharing and may require either a node failover or a switch controller failover. Each TSP can support one or more connections to external systems and/or machine interfaces. A TSP node may or may not have redundant communications paths to these external entities.

Figure 25:
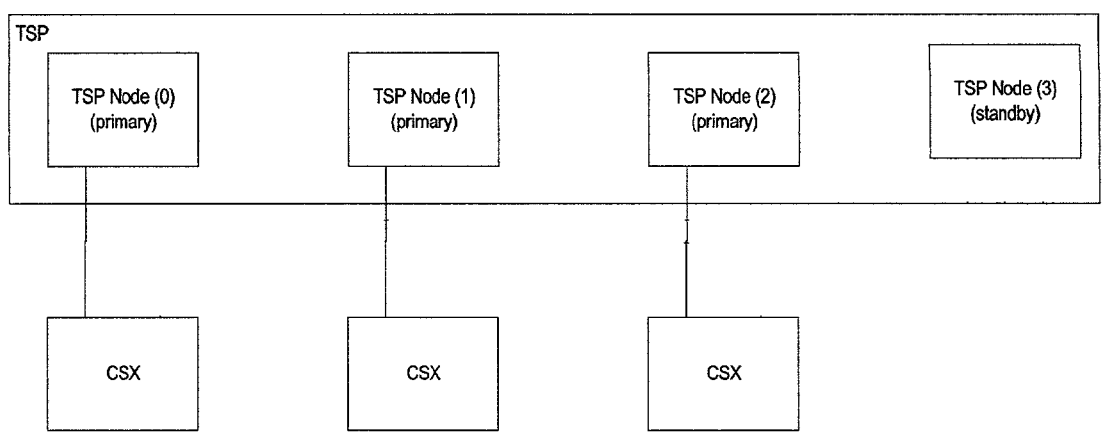

FIG. 25 depicts an N+1 configuration consisting of four TSP Nodes and three CSX switch elements. Each of the three primary TSP nodes is dedicated to a separate CSX switch element. The standby TSP node is configured to support any of the three CSX elements. Hence, the standby node may substitute for any of the primary nodes. However, the standby may substitute for only a single primary node at any given time. The system can compensate for the loss of a single primary TSP node by substituting the standby processor in its place. Further, a 1+1 redundancy can be achieved by providing one standby TSP node for each primary node and configuring the communications interfaces accordingly.

Figure 26:
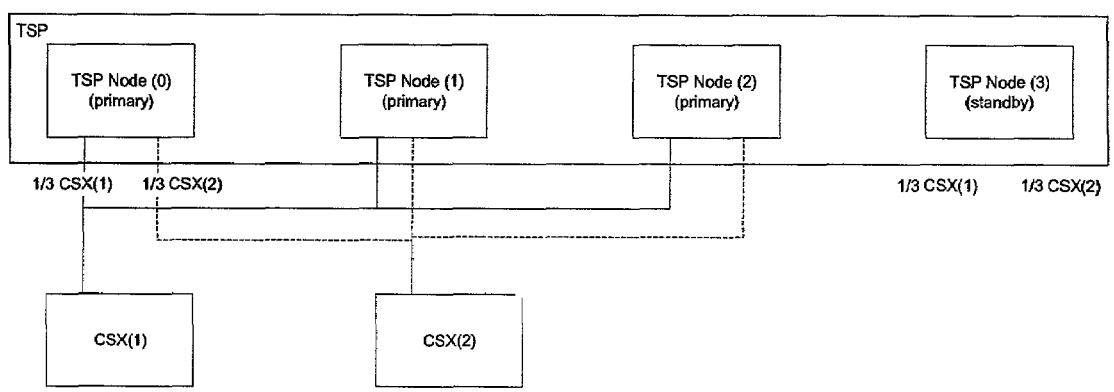

FIG. 26 shows another configuration in which the traffic load for each CSX has been partitioned into thirds and distributed equally among three primary TSP nodes. If one of the primary TSP nodes fails, each CSX utilizes the communication layer to map the failed node's partition to the standby node. Similar to the previous configuration, the system can substitute the standby node for any one of the primary nodes if a primary node fail.

In the configurations shown in FIG. 25 and FIG. 26, each TSP node is supported by a shared object database. This database provides the standby with access to the objects needed to continue processing including access to transient call objects. In effect, the shared transient data store is the mechanism for "copying" objects from one processor to another.

Application Software Redundancy

Application software can employ transportable context objects to capture and maintain the state of application services. A context object represents or describes the state of an application service such that an arbitrary processor can continue and complete the service based on the context object. Context objects may be aggregated in order to represent the state of a complex application service.

A processor needs to have, or to have access to, context information, describing the state of each application service that is in progress, in order to substitute for another processor. Hence, the system provides some trasportable mechanism of describing the state of application services.

A task (thread or process) is a mechanism that encapsulates processing. A task carries with it the ability to "run" an application. Assuming that application contexts can be transported from one processor to another, it must also be possible to associate a task with each context to facilitate execution. The ability to dynamically bind tasks with application contexts is therefore important to fault tolerance. Dynamic task-context bindings also discourage the capture of essential context information within the execution call stack.

The application software provides some mechanism for rendering contexts present on or accessible by the alternate processor when a processor substitution occurs. For example, replicating contexts in an alternate processor, storing contexts on a sharable disk, will ensure that a substitute processor can continue application services in progress following a processor substitution. Further, event-context binding is rendered deterministic and consistent across all processors. For a particular event, each processor must be able to bind the event to a unique (and correct) context, and to deliver the event to the appropriate task-context association for execution. This includes consistent recognition of events that call for the creation of new contexts.

Event-processing mechanisms are also defined that produce consistent behavior across multiple processors. This is often inherent in distributed software—each processor runs the same application software. However, to the extent that applications incorporate dynamic elements, mechanisms are provided that ensure consistent application behavior across multiple processors. For example, a processor that substitutes for another processor must have access to all applicable CPML pages in order to ensure consistent behavior.

Further, blocking system and infrastructure services (functions, method calls, etc.) can be converted into asynchronous client-server services. System and infrastructure services may be synchronous if and only if they are guaranteed to be non-blocking. For instance, reading the system clock is typically non-blocking and can be implemented and accessed synchronously. However, reading an object from a database is typically blocking and hence is modeled as an asynchronous client-server service. This prevents the capture of context information within the execution stack—a form of context information that cannot be transported from one processor to another. For example, the fact that an application service has a database transaction pending is context information that should be represented explicitly in a context object rather than implicitly by a task that is blocked on a function call. It further prevents a temporary static binding between a task and a context object. Static task-context bindings should be limited to infrastructure level services because this context information would be lost in a processor switch. Database requests should be represented within application contexts if such requests are to be preserved across processor failovers.

The ability to vary task to context ratios, dynamically if possible, can improve overall performance with fewer tasks. This means that the ratio of tasks to context objects may exceed one to one. If a task becomes statically bound to a context, even temporarily, it can impede overall throughput across its associated contexts.

Synchronous interfaces are permitted between objects only under the following conditions:

(a) Guarantee of locality—a client object must be guaranteed the server object is local and can be referenced directly, (b) Guarantee the service is non-blocking—an application level service that is blocking must be modeled as an asynchronous client-server interaction for the reasons cited previously, (c) Guarantee the service is constant with respect to the server or that suitable contention management mechanisms are in place, (d) Guarantee the service is public or that the client has the privileges needed to access the service.

Fault and failure recognition and response mechanisms are defined such that processor substitutions occur, as needed. The system of the invention is capable of identifying conditions that represent or may represent an operational interruption. It is also be capable of responding in a way that prevents or minimizes loss of service, consistent with the system's requirements.

In addition, a system management capability is defined such that processor substitutions can be commanded by an external entity. Loss of external events, messages, and commands are prevented. Moreover, mechanisms are defined for altering external event, message, and command routing schemes when processor substitutions occur.

Application and certain infrastructure components are implemented using finite state machines (FSM) to control behavior. This is a natural fit to the application, a commonly understood implementation model, and lends itself to clear definition of state and context and separation of state/context from processing.

Well-defined FSMs are context dependent but also context free—a FSM instance contains no context data. It describes or defines behavior in terms of a context (object or set of objects) and the state of the context. This encourages well-defined contexts that provide a high fidelity representation of application state that can be transported from one processor to another. Moreover, FSMs can be implemented as singletons (single instance within a processor) and placed in the global scope with minimal consumption of memory. Alternatively, FSMs can be defined by data structures (e.g., XML document), placed in persistent storage, and loaded into memory on demand. In this case, object caching may be used to reduce the impacts of persistent storage I/O.

It is also possible to define a stack execution model based on FSMs. According to this model, one FSM can invoke another using a stack mechanism and a standardized data-passing interface. This model supports the dynamic integration of FSMs defined by different domains within a common application context. It extends the expressive capability server object interfaces and provides a useful layer of encapsulation for the client object designer. For example, an application or infrastructure server object could extend its interface definition to include a FSM that is "invoked" at runtime. This approach can simplify the interface between objects and can hide the underlying details of the interaction between client and server.

An interface designed and implemented as an FSM can encapsulate many object interaction details including the locations of client and server, the message objects exchanged between client and server, the message exchange mechanism, the service's mode of execution (synchronous or asynchronous), error detection and handling (including potential recovery options), etc. This approach can simplify application development.

The infrastructure of the system of the invention provides an object class, e.g., Task, to encapsulate OS threads. Application objects that require processing support request it from the infrastructure instead of creating new threads at will. This relieves the application from dealing with the intricacies of thread invocation and control, and it provides a consistent approach to multi-threading throughout the application. Furthermore, it provides a point of control that may be used to manage the number of threads and the way the threads are aligned to various task categories within the system. Adjusting the ratio of tasks to task categories can allow controlling priorities without manipulating OS visible thread priorities. For example, adjusting the ratio of call processing related tasks to the number of maintenance related tasks can effectively raise or lower the priority of call processing.

The infrastructure also provides support for creation and destruction of task objects, associating and disassociating tasks and application objects on demand, and publicizing these associations to facilitate message (event) delivery. This support may also include features such as task categorization in support of priority management, task to application object ratio control for load balancing, etc.

The mechanism for exchanging data between objects can be integrated with the overall execution model. An object class, e.g., Event, provides the basic vehicle for exchanging information between objects. This class is specialized (sub classed) to provide application and infrastructure specific event classes.

The Event class defines two points of interaction between the infrastructure and application domains:

(a) Event routing—this is the process of determining which processor should handle a particular event. This behavior is application defined and is therefore represented as an abstract method.

(b) Event dispatching—this is the process of determining which object, within a processor's scope, should handle a particular event. This behavior is also application defined and is represented as an abstract method. Event dispatching is preferably non-blocking Assuming that the dispatching behavior is non-blocking, the event can be immediately dispatched to the appropriate application object. If the dispatching behavior is blocking, this behavior must identify an application domain object to carry out that behavior and finish dispatching the event.

The infrastructure can invoke each of these methods as needed when transporting events between objects. Application class events are routed to a processor and then dispatched to an object—this removes assumptions about where an event can or will be processed. Infrastructure class events may not require routing because infrastructure services are available globally. Infrastructure support shall be provided for the exchange of events with external systems, routing of events received from external systems, and event dispatching.

Delegating event dispatching to the application provides flexibility and a mechanism for solving boundary conditions, e.g., context object creation. If a particular event requires a new context object, the application can define a dispatching algorithm that targets these events to an object factory, or it can construct a context object that it then specifies as the destination. Object factory is a pattern wherein an object is responsible for constructing instances of an associated class.

A secondary goal of the overall task-processing model is to reduce contention across highly dynamic objects. Call processing objects are expected to frequently dynamically change state and context. To simplify contention management, each such object is supported by a single task. All events related to a particular call-processing object are routed to its associated task. This reduces the possibility of contention for a single object by multiple execution threads. This also yields an event model in which events always appear in a serialized fashion—even if two or more events actually occur simultaneously.

A shared, fault tolerant persistent storage device houses context objects, i.e., event-processing objects, data objects used to route events to context objects, and system data objects.

Further, data access mechanisms and processes are designed to access the shared data store dynamically as needed to fulfill an application's request for data. That is, if a target object cannot be located in memory, it will be accessed on the shared store. Only upon failure to locate a target object on the shared store does the application determine that the target object does not exist and/or declare a fault.

Caching, i.e., application level caching, is employed to optimize access to data structures and objects that are used frequently. Initial attempts to search or retrieve any data object is applied to cache. However, all access mechanisms are designed to access the persistent store in the event of a cache miss.

Data organization structures, e.g., hash tables and indices, are also subject to dynamic access mechanisms. Accessing an object does not fail unless the associated organizational structures have been destroyed or have become corrupt.

Dynamic access mechanisms simplify certain aspects of failure recovery since there is no fixed expectation that a particular object will be in memory when it is accessed. However, care is taken to ensure that nominal access modes are not severely impacted by dynamic access mechanisms (some balance between dynamic access and static data loading may be needed). However, providing a dynamic access mechanism for all data objects offers the maximum flexibility for defining data storage policies.

The infrastructure also defines a framework for routing and dispatching events. For certain event classes, e.g., event classes related to call processing and other services related event, these decision-making algorithms are defined by the application. For other event classes, e.g., event classes related to infrastructure services, these decisions are defined in accordance with architecture/infrastructure policy.

The infrastructure accesses routing and dispatching behavior at appropriate points in an event's transmission cycle. Ensuring appropriate and consistent results are the applicable domain's responsibility—application or infrastructure.

For static data and program elements, i.e., data and program elements that are static for the life of the application, ordinary distributed software practice will suffice. For dynamic elements, including program and data elements as well as sharable contexts, the architecture provides mechanisms for maintaining consistency across multiple processors.

Dynamic data and program elements can be categorized as follows:

(a) elements for which the persistent store is the database of record and whose copies may be contained in volatile memory stores across multiple processors. An external business or operations process generally controls these entities (the authority to establish and modify the state of these entities is outside the scope of call, call feature, and call service processing), (b) elements for which a volatile memory store is the database of record and whose copies are placed on the persistent store in support of application features such as fault tolerance. Call, call feature, and call service processes generally control the state of these entities.

The integrity of the entities having persistent store as database of record is ensured by propagating state changes from the persistent image to memory resident copies. Memory resident copies of these entities are discarded once they are no longer in use.

Each time an entity is loaded into a volatile memory store, a dependency is established between the source entity and the copy of that entity. Modifications to the state of a source entity are ultimately reflected by each of its memory resident copies, or dependents. Explicit representation of a source entity's dependencies provides a mechanism for identifying and locating its dependents.

The nature of a source entity can suggest a priority for updating its dependents. Certain entities may require immediate update of each dependent. For instance, changes in operational policy may require immediate update of all memory resident copies of that policy. Other entities may tolerate some delay in updates to dependents. For example, modification of a group level feature may require immediate application to all new instances of that feature while permitting instances in progress to conclude under the previous policy. In essence, updates to the feature's dependents are not required until a new feature instance is initiated.

Immediate update of a memory resident entity introduces contention—one or more application objects may hold a reference to and be accessing the entity in question at the time the update must occur. To ensure integrity, some form of mutual exclusion lock must guard access to each entity requiring immediate propagation of updates across all copies.

Delayed update of memory resident entities can be handled more simply. Upon a source entity's modification, its dependents are located and "privatized." Application objects possessing references to an outdated dependent entity may continue to use that entity as long as the reference is held. Once all references to the outdated dependent are released, it is discarded. However, establishing a new reference to the modified entity will cause a new copy to be loaded from the persistent store.

Integrity for entities having volatile store as database of record is ensured by propagating state changes from the volatile memory image to the persistent image. Persistent copies of these entities are discarded once they are no longer in use. The application controls these entities and determines the circumstances for updating the persistent image.

The infrastructure defines an asynchronous, message-based capability for communications between objects. This is a natural basis for a message-based, client-server model for system and infrastructure services. The model is already required for the application domain. Hence, it is logical to extend it to the infrastructure domain. This also presents one consistent activation mechanism whether a service provider exists in the application domain or the infrastructure domain.

It is useful to provide a consistent activation mechanism for both synchronous and asynchronous services, i.e., it is useful to encapsulate whether or not an infrastructure service operates in a synchronous or asynchronous fashion. This further simplifies the application developer's role and provides additional flexibility. It is also useful to define infrastructure services that dynamically choose an asynchronous or synchronous mode depending upon the circumstances.

For example, a data access service could operate synchronously if the requested object is contained in the memory cache or asynchronously if a transaction must be issued to retrieve the requested object—either way the presentation to the application is identical and the only variance is performance. However, it may be useful to define synchronous interfaces for infrastructure services that are guaranteed to be locally available and non-blocking.

Class 4/5 Configuration

Figure 27:
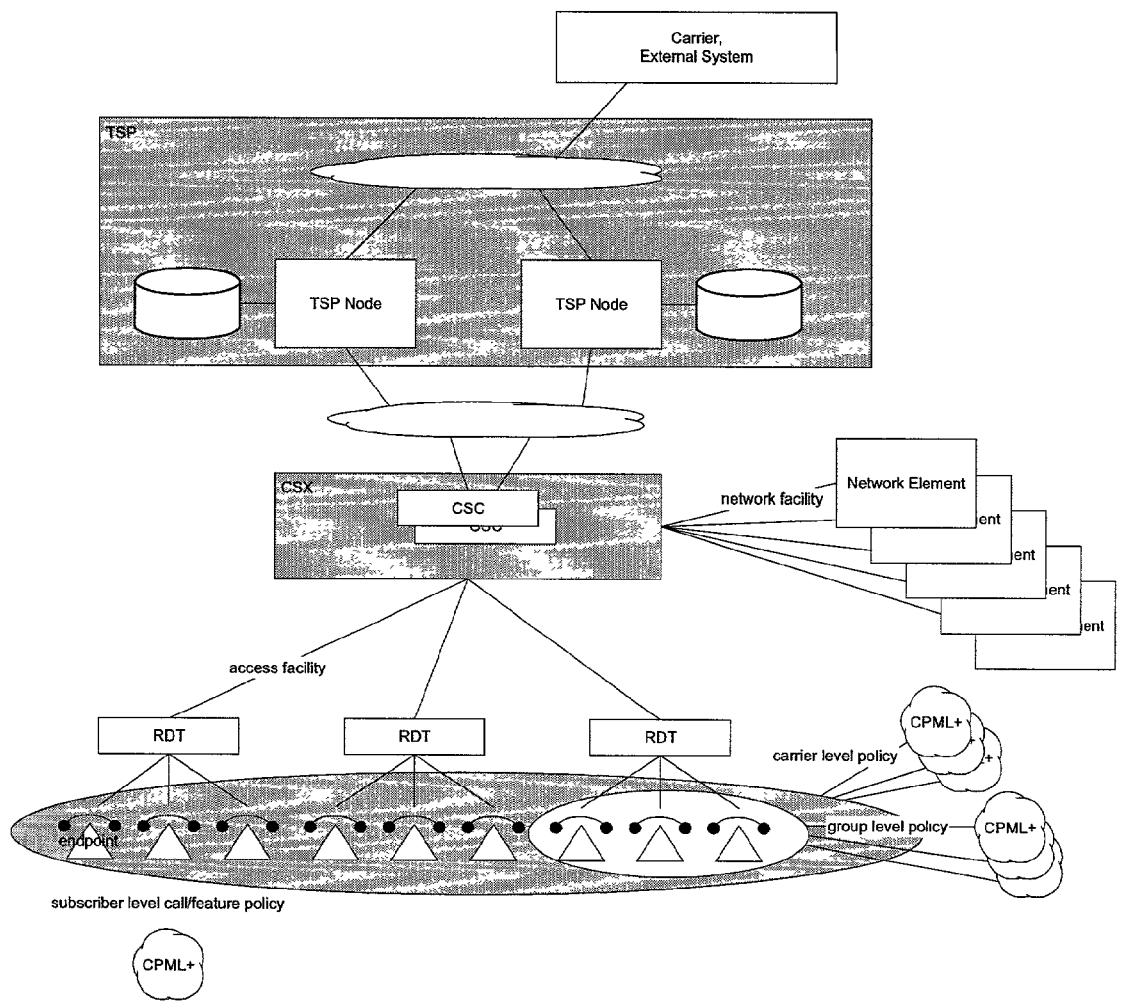
FIG. 27 is an overview of an exemplary installation of a TSP/CSX consolidated system of the invention.

FIG. 27 provides an overview of an exemplary installation of a TSP/CSX consolidated system of the invention. The system includes two TSP nodes with appropriate interfaces to the carrier's external systems such as the operational support system (OSS), the subscriber provisioning and maintenance system, the billing system, etc. As shown, a single LAN supports these interfaces. Additional interfaces may be used if needed to provide sufficient throughput on these external interfaces.

The TSP is supporting a single CSX, and the CSX has two central shelf controllers appearing on the communications LAN between the TSP nodes and the CSX. Digital subscriber loops and DS1 access facilities provide subscriber access. The DS1 access facilities are presented to the CSX by remote data terminals using the GR303 protocol. The CSX also provides access to the PSTN via DS1 network access facilities. The network access facilities may support a variety of protocols including, for example, FGD, ISDN/PRI, and SS7/ISUP.

The carrier offers features through three levels of service subscription. In one level of service, a subscriber has access to features to which the subscriber directly subscribes at an individual level. In a second level of service, a subscriber is a member of a subscriber group that has subscribed to a set of features. Each member of the group has access to the group's associated features. In a third level of service, a subscriber has access to feature offered, by default, to all subscribers by the carrier.

Application Framework

Figure 28A:
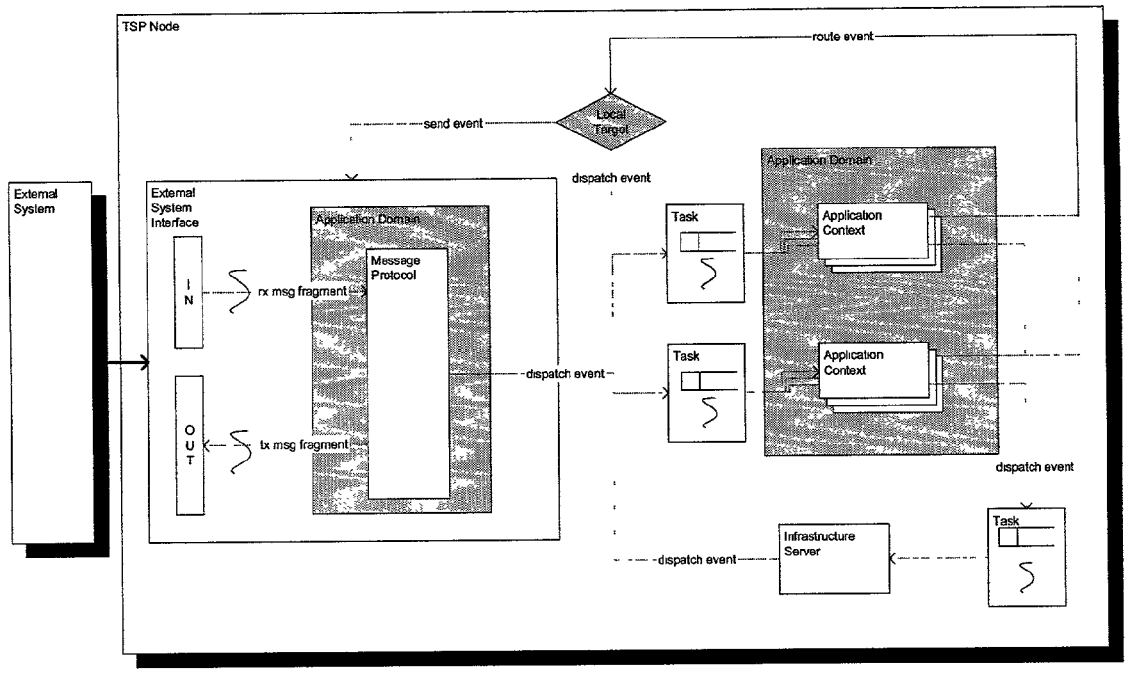
FIGS. 28A–28B depict a basic application framework for routing and dispatching events in a system according to the teachings of the invention.
Figure 28B:
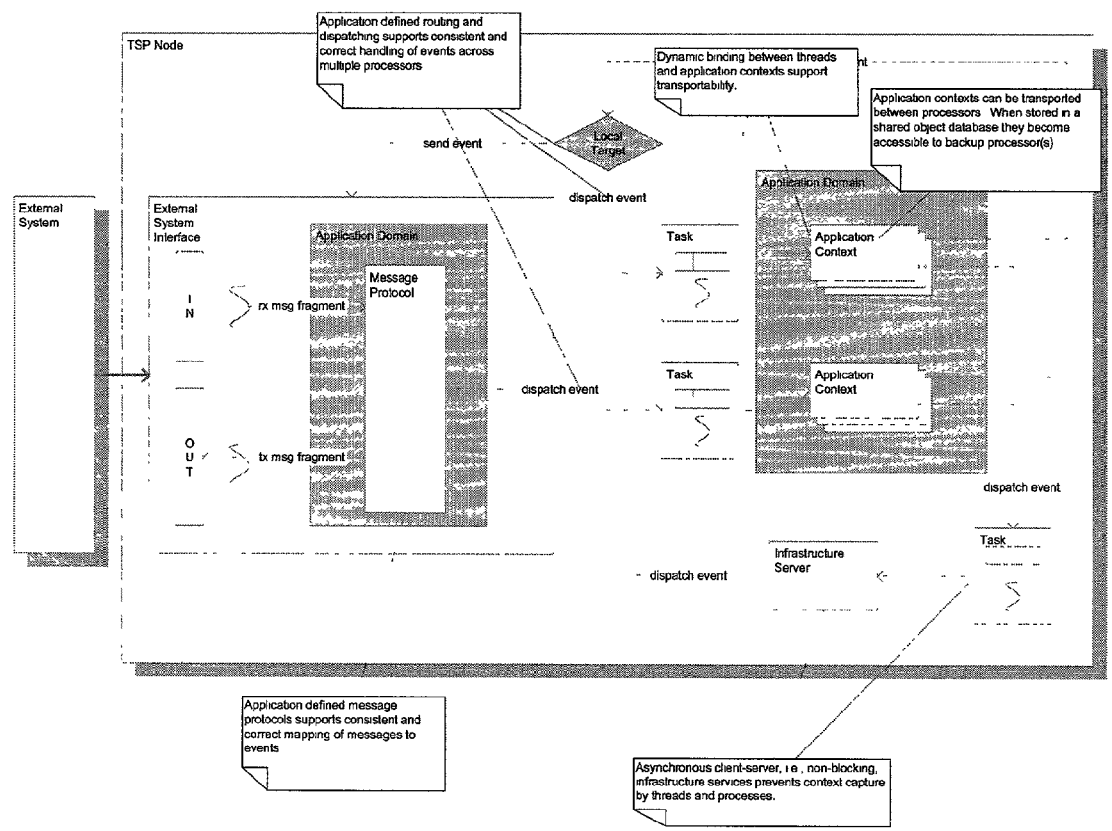

FIGS. 28A and 28B depict a basic application framework that is utilized in one embodiment of the invention. An alternative to the foregoing is the use of CORBA Orb's to effect interprocess message handling.

Messages are received via an external interface component and converted into events as specified by a message protocol. Events are dispatched to the appropriate application context for processing. Inter-object communications, including inter- and intra-processor communications are also supported by the event passing capability. Blocking infrastructure services are implemented in the same fashion as application services using a similar task-processing context binding.

There are two stages to event passing, i.e., event routing and event dispatching. Event routing is a process that identifies the processor that houses the appropriate processing context for an event. Event dispatching is a process that identifies the application context, within a processor, that is responsible for processing an event. The appropriate application domains define the event routing and event dispatching processes (the infrastructure merely executes these behaviors at the appropriate point in the event passing sequence).

Events received from external systems are dispatched without routing. It is assumed that such events have been routed correctly. Events issued from an infrastructure service context are also dispatched without routing. It is expected that infrastructure services are ubiquitous and therefore that inter-processor event passing is not required to access these services.

External Interface Object Model

Figure 29:
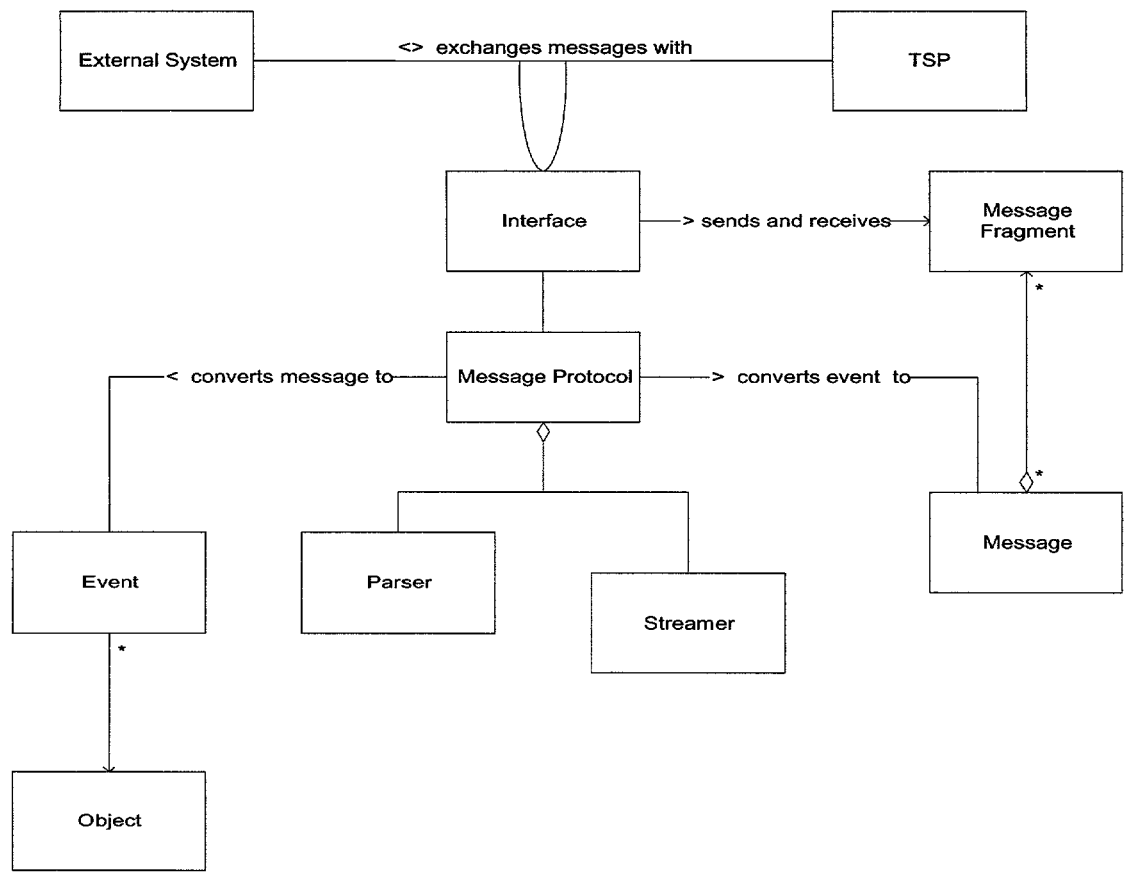
FIG. 29 is an object model illustrating an interface for exchanging messages between a TSP node and another system.

With reference to FIG. 29, the TSP can exchange messages with an external system, such as the CSX. An interface characterizes the messaging association between the TSP and the CSX. The interface sends and receives message fragments. One or more message fragments constitute a message. Messages are converted to events and events are converted to messages according to a message protocol.

A message protocol consists of a parser and a streamer. A parser converts a message to an event. A streamer converts an event into the corresponding message. This arrangement completely encapsulates the mapping of messages to events and events to messages. New external interfaces may be introduced without modifying the event hierarchy so long as the new protocol corresponds to existing events. Introduction of a new protocol may introduce new events, as well.

Event Passing

Figure 30A:
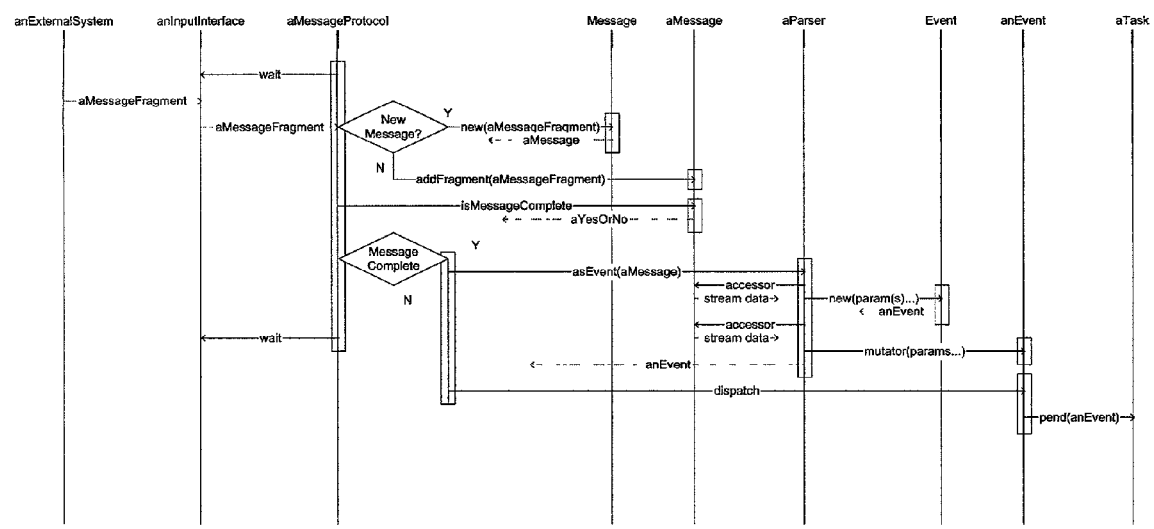
FIG. 30A depicts an event trace outlining a process for receiving a message, converting the message into an event, and dispatching the event to an appropriate processing context in a system of the invention.

FIG. 30A depicts an event trace outlining the process of receiving a message, converting the message into an event, and dispatching the event to the appropriate processing context in a system of the invention.

Figure 30B:
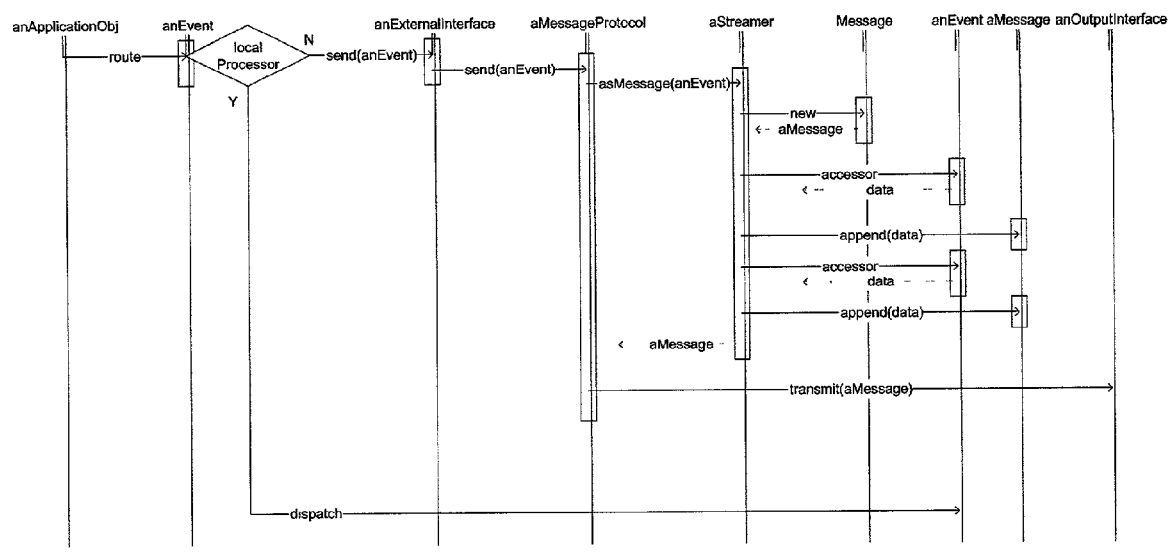
FIG. 30B is a diagram illustrating an event trace that outlines a process of routing an event to an external processor via an external interface.

FIG. 30B presents a diagram illustrating an event trace that outlines the process of routing an event and sending it to an external processor via an external interface, including conversion from an event to a message format.

Figure 31:
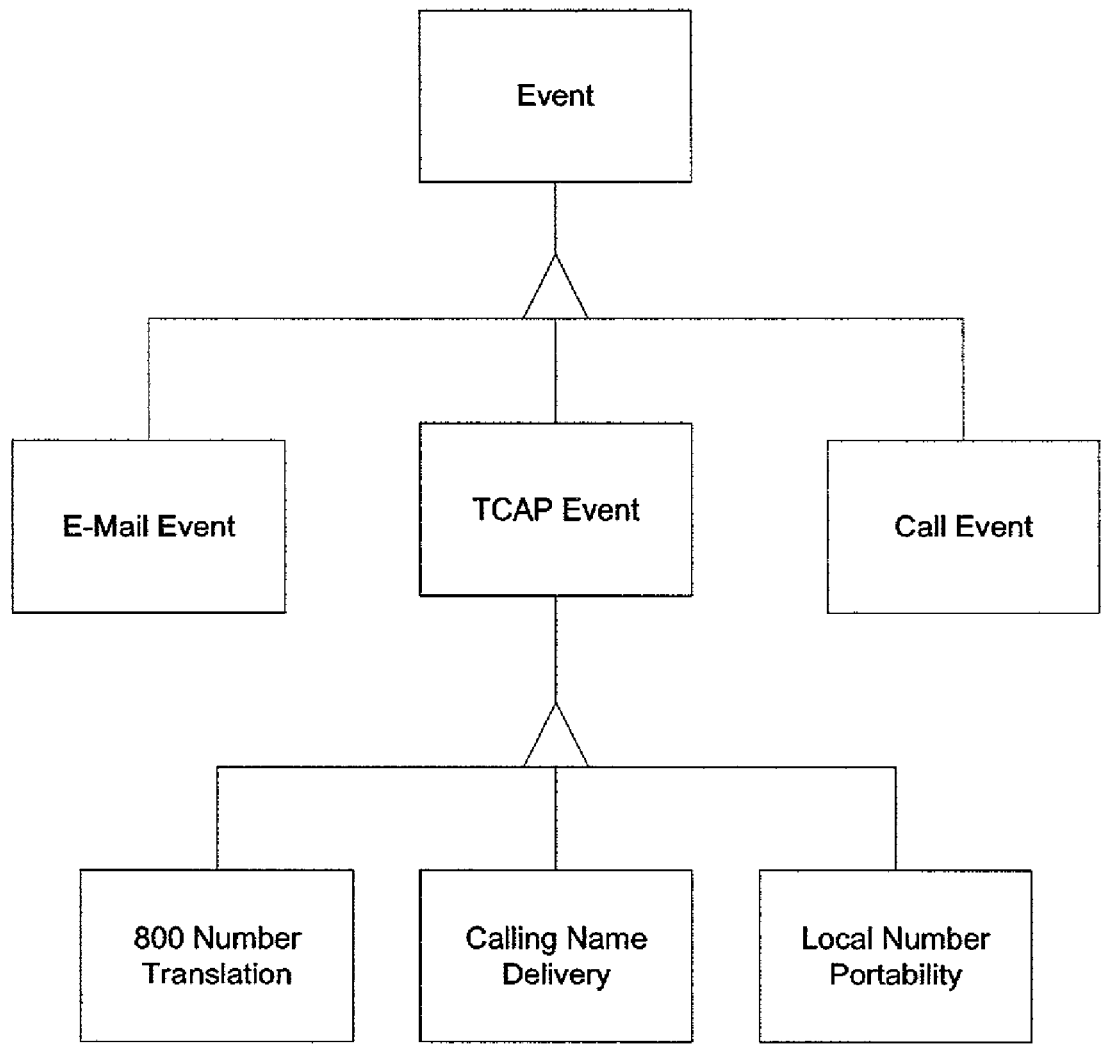
FIG. 31 is a diagram illustrating an event hierarchy.

FIG. 31 is a diagram illustrating the nature of an event hierarchy. Such a hierarchy provides considerable flexibility in routing and dispatching. For instance, all TCAP events could be dispatched to a single processing context that handles all TCAP messages by implementing the routing method in the TCAP class. Alternatively, each event class derived from TCAP event could be routed to an application context dedicated to handling events of a specific type, for example, 800 Number Translation, Calling Name Delivery, and Local Number Portability, by implementing a unique dispatch method for each class.

Data Sets

The data sets that are associated with the TSP (either supporting the TSP or being generated by the TSP) fall into at least five categories. These categories include, for example, (a) data sets that are accessed frequently but whose (persistent) values change infrequently, (b) data sets that are accessed frequently but whose (persistent) values change with moderate frequency, (c) data sets that are accessed frequently and whose (persistent) values change frequently, (d) data sets that are accessed with moderate frequency and whose values change frequently, and (e) static data sets that are created frequently and accessed only infrequently.

Route and Call/Feature policy data sets belong to the above category (a). A summary of these data sets are presented in Tables 34 and 36 of FIGS. 32A and 32B. These data sets support processing of each call, and their database of record in the persistent store. The memory capacity of the system of the invention is preferably sufficient to support complete caching of these data sets. The use of these data sets allows achieving high memory residency, and maintaining consistency with the database of record when updates occur.

The above category (b) of data sets includes primarily the endpoint/subscriber data set, a summary of which is presented in Table 38 of FIG. 32C. This data set supports processing of each call. Although the endpoint/subscriber data values change with greater frequency than those of the Route and Call/Feature policy data sets, they change at a significantly lower frequency than call attempt rates. The database of record for this data set is the persistent store. The endpoint/subscriber data set allows achieving relatively high memory residency with reasonable memory consumption, and maintaining consistency with the database of record when updates occur. The data corresponding to frequency callers achieves higher memory residency than those corresponding to infrequent callers. Further, the memory capacity is preferably sufficient to support complete caching of this data set for a mature, fully configured system, thus achieving good disk access performance upon cache misses.

The above category (c) data set includes primarily call and feature state data, of summary of which is presented in FIG. 32D. This data set supports processing of each call and its value changes frequently during call and feature processing. The frequency of changes in persistent value is less than overall frequency of state change, but it is at least several times per call. The database of record is the memory image. A persistent image is maintained for selected states to support fault tolerance. This data set allows achieving complete memory residency, maintaining consistency between the memory and persistent images for selected states, thereby providing excellent disk access performance for all consistency updates.

The above category (d) consists primarily of equipment and transmission facility state and statistical data sets. FIGS. 32E, 32F, and 32G provide summaries of these data sets. The data sets support network management and system operations. Some members of this data set can change their values as a function of call volume and may be subjected to frequent value changes. Aggregate members are also subject to frequent value changes. Routine polling intervals can govern access to this data set. The database of record is a memory image. Persistent images are provided for historical statistical records (usage and performance) only. The data set allows achieving high memory residency, and further achieving reliable capture of historical statistical records.

The above category (e) data set consists primarily of Call Detail Record (CDR) and Automated Message Accounting (AMA) record sets. FIGS. 32H and 32I provide summaries of this data set. CDR's are generated for each call and/or feature. In selected number of cases, multiple CDR's may be generated for a single call. Once generated, CDR's are captured to disk for subsequent processing. AMA records are in turn derived from CDR's. The database of record is the persistent image. CDR memory images exist only as needed to support reliable capture to the persistent store. That is, there is no memory image of AMA records. This data set allows achieving reliable capture of CDRs to the persistent store. Much of this data set is also subject to sharing and duplication. Sharing is utilized to make the data available to multiple processing elements. Replication is utilized to support fault tolerance.

Data sets that are related to physical equipment and facilities, and related to compiled software elements are not subject to frequent schema changes. Other data sets may experience occasional schema changes. In particular, some embodiments of the invention provide schema flexibility for log data types, such as system logs, exception logs, audit logs, CDRs and AMA records. This can allow altering the contents of these data sets over time without software compiles.

The persistent storage subsystem of the system of the invention provides data sharing. That is, data can be shared among multiple TSP processing nodes. This includes data housed by the TSP on behalf of CSX switch elements, thus ensuring high availability of data elements required by the CSX. Further, the persistent store provides mechanisms for controlling object memory residency (cache management). The purpose of this capability is to provide access performance sufficient to meet the systems's overall performance objectives. In addition, the persistent store allows processors to share transient call/feature state and context objects through data replication. The persistent store also supports multiple threads per process and multiple processes per database. Further, the persistent store provides object level control of database commits to ensure that transient objects are persisted in correct (e.g., stable) states. Another functionality of the persistent store is object level locking. This allows achieving the overall performance objectives by reducing contention to the object level, thus decreasing the occurrence of multiple threads accessing the same object. In addition, the persistent store supports evolution of the object while the system is running.

Figure 33:
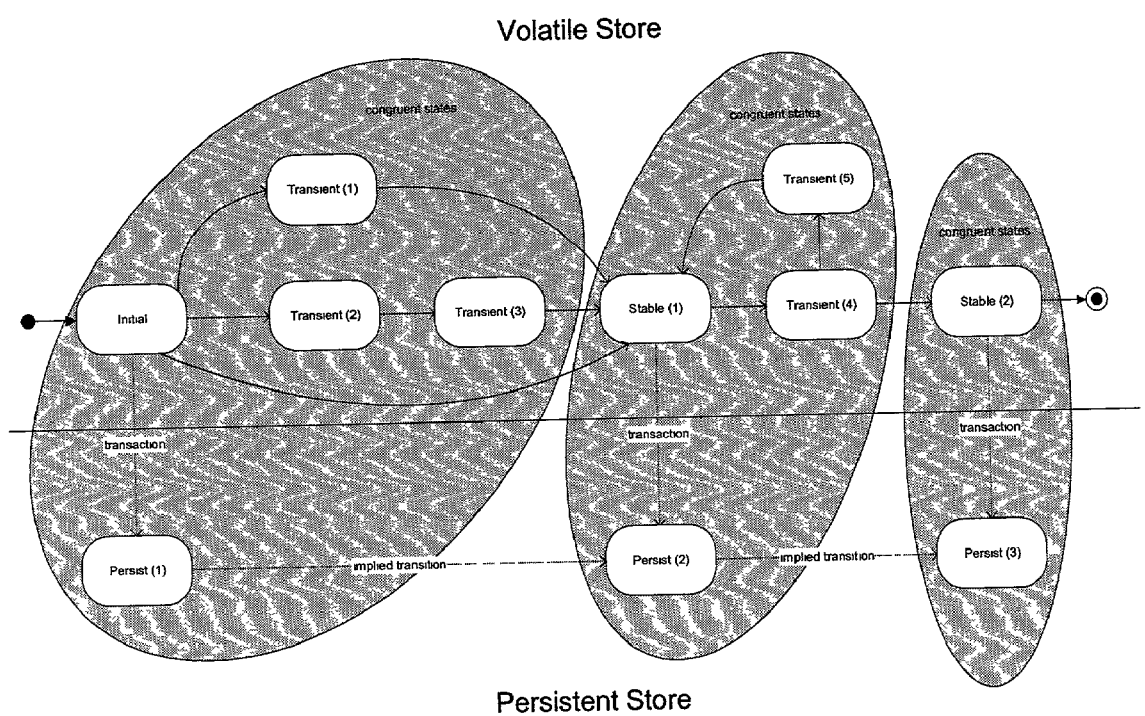
FIG. 33 is a diagram depicting the correlation between call/feature states in the volatile store and in the persistent store.

FIG. 33 illustrates a diagram depicting the nature of the correlation between call/feature states in the volatile store and in the persistent store. The states in the diagram are arbitrary and only for illustrative purposes (they do not correlate to any real call model). When a call is created, the initial state is persisted to the transient data store. This facilitates recovery processing by representing resources that have been in use, but for which no stable call state was ever reached. As the call progresses, it ultimately achieves a stable state. At this point, the image in the persistent store is updated to reflect the stable state. As the call progresses further, it achieves another stable state causing another update to the transient data store. As the call concludes, the persistent image is destroyed because its only purpose is to support recovery of stable state calls. In the event of a fail over, a back up processor has access to the transient data store, and can therefore recover the appropriate stable call images. The call will revert to the state represented in the transient call store regardless of what the actual call state was at the point of failure.

Additional Embodiment

Figure 36:
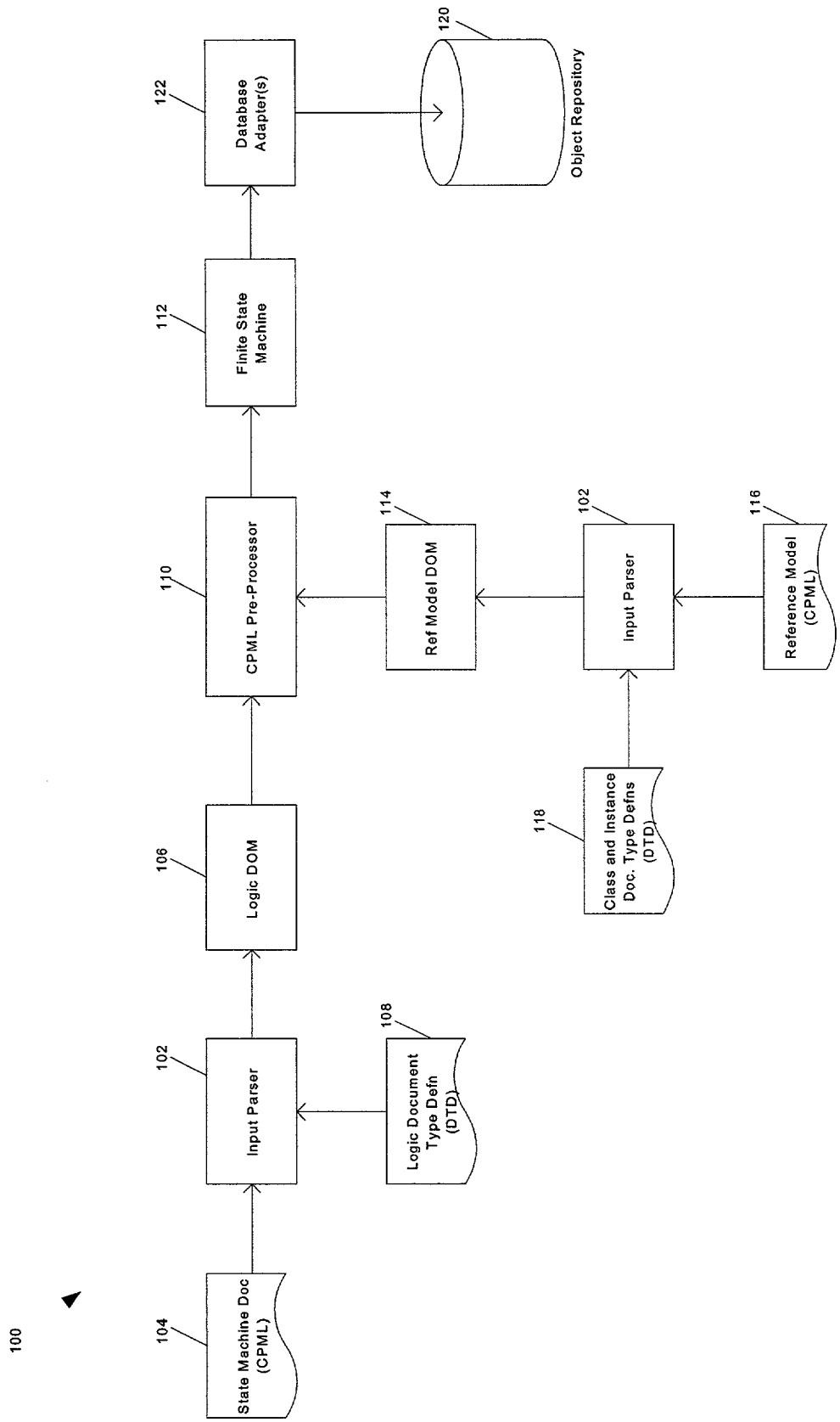
FIG. 36 is a diagram schematically depicting one embodiment of a system of the invention that converts a textual description of a state machine into an object graph, FIG. 36A schematically illustrates an object graph created in accord with one embodiment of the invention.

FIG. 36 schematically illustrates an embodiment of a system 100 of the invention that converts a textual description in a mark-up language of a process, e.g., a state machine, to an object graph, and preferably stores the object graph in an object repository, e.g., an object database. The object graph can be accessed to determine transition of a present state of the process into a new state and to determine actions, if any, to be performed. As described in more detail below, the system of the invention also provides two stages of validation. In the first stage, a lexical structure of the textual description of the process logic is validated by comparison with a document type description, and a "logical" document object model is generated from the textual description. In the second stage, actions or operations referenced by that document object model are validated, e.g., by comparison with a "reference" object model.

More particularly, the exemplary system 100 includes a parser 102 that receives a textual description of a process 104, modeled as a state machine, in a mark-up language and generates an document object model 106. The parser 102 can be of any commercially available type suitable for such purpose. The textual description of the state machine, herein referred to as the state machine document, identifies one or more states and one or more events that cause transitions between these states. For example, in the telecommunications domain, the textual description can identify a state machine representative of a call feature, e.g., call forwarding, provided to a subscriber. In such a case, the call feature state machine transitions from one state to another in response to one or more events, e.g., call progress events such as hookflash, and optionally performs one or more actions, e.g., routing a call.

The mark-up language can be chosen to be any language that is suited to a particular application. HTML, XML, and other mark-up languages which are extensions of XML (e.g., CPML) can be utilized in a system of the invention As an illustrative example, FIG. 38 depicts an XML document that describes a logic for a state machine that provides a call forwarding feature to a subscriber of a telecommunications service.

The model 106, herein referred to as document object model (DOM), includes objects and/or references to objects that represent the states identified in the state machine document. These objects can also reference one or more operations for performing the actions, if any, specified for various states of the state machine. For example, in a C++ object-oriented environment, the object model can include, e.g., structures (struct) and/or classes that represent the states identified in the textual description. In a telecommunications application, the DOM is an object representation of a call processing logic, e.g., the logic for providing a call feature such as call waiting.

The parser 102 is preferably a validating parser that compares the lexical structure, e.g., syntax, of the textual description 104, i.e., the state machine document, with a reference lexical structure 108, herein referred to as logic document type definition (DTD), to ensure that the structure of the textual description 104 conforms with a pre-defined structure. For example, this validation step ensures that the structure of the textual description that defines a state machine is consistent with a pre-defined structure for defining state machines. Provided at the end of this specification is an example of a logic document type definition which provides a reference lexical structure for defining a state machine.

Figure 36A:
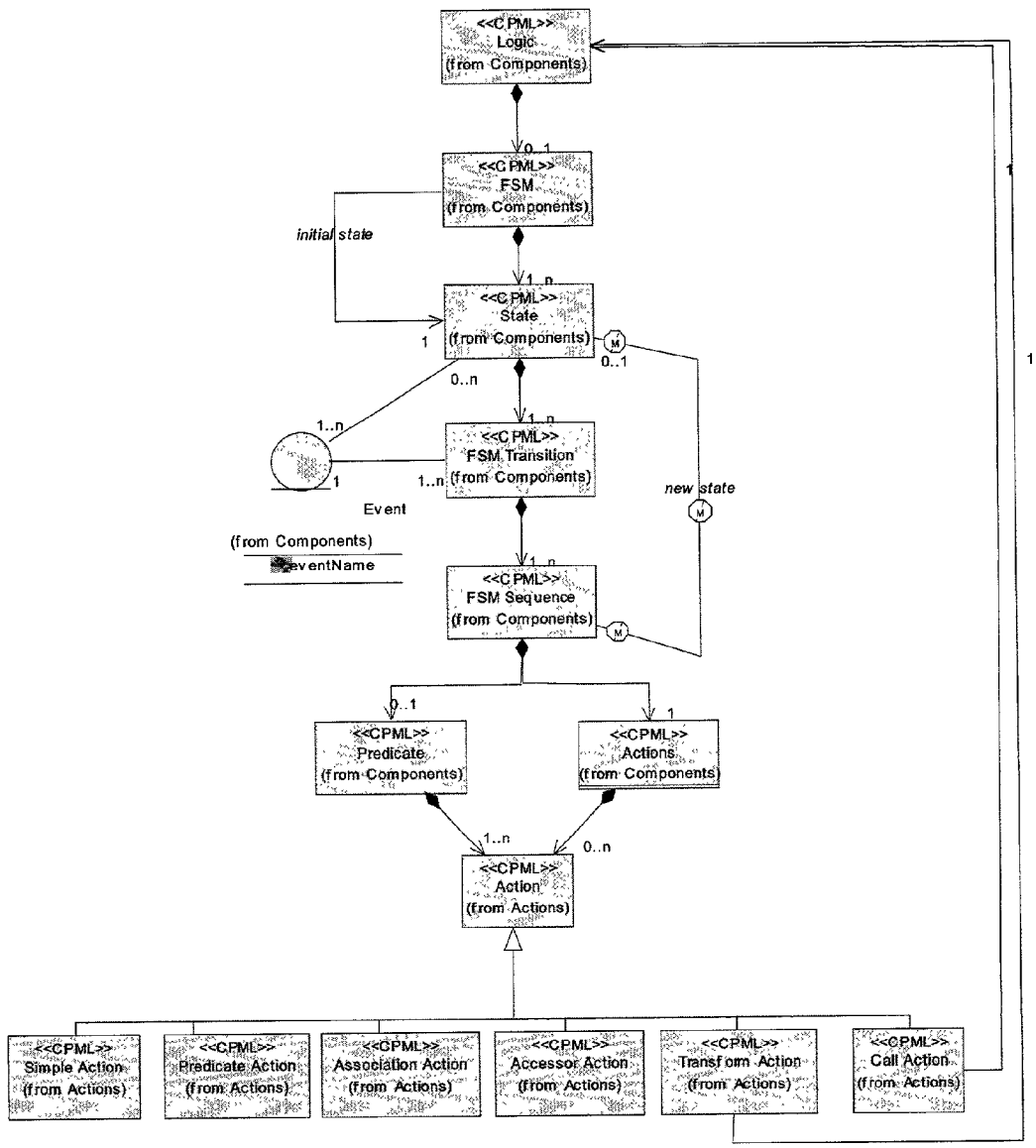
FIG. 36B depicts a methodology for exporting actions from an object repository according to one embodiment of the invention.
Figure 36B:
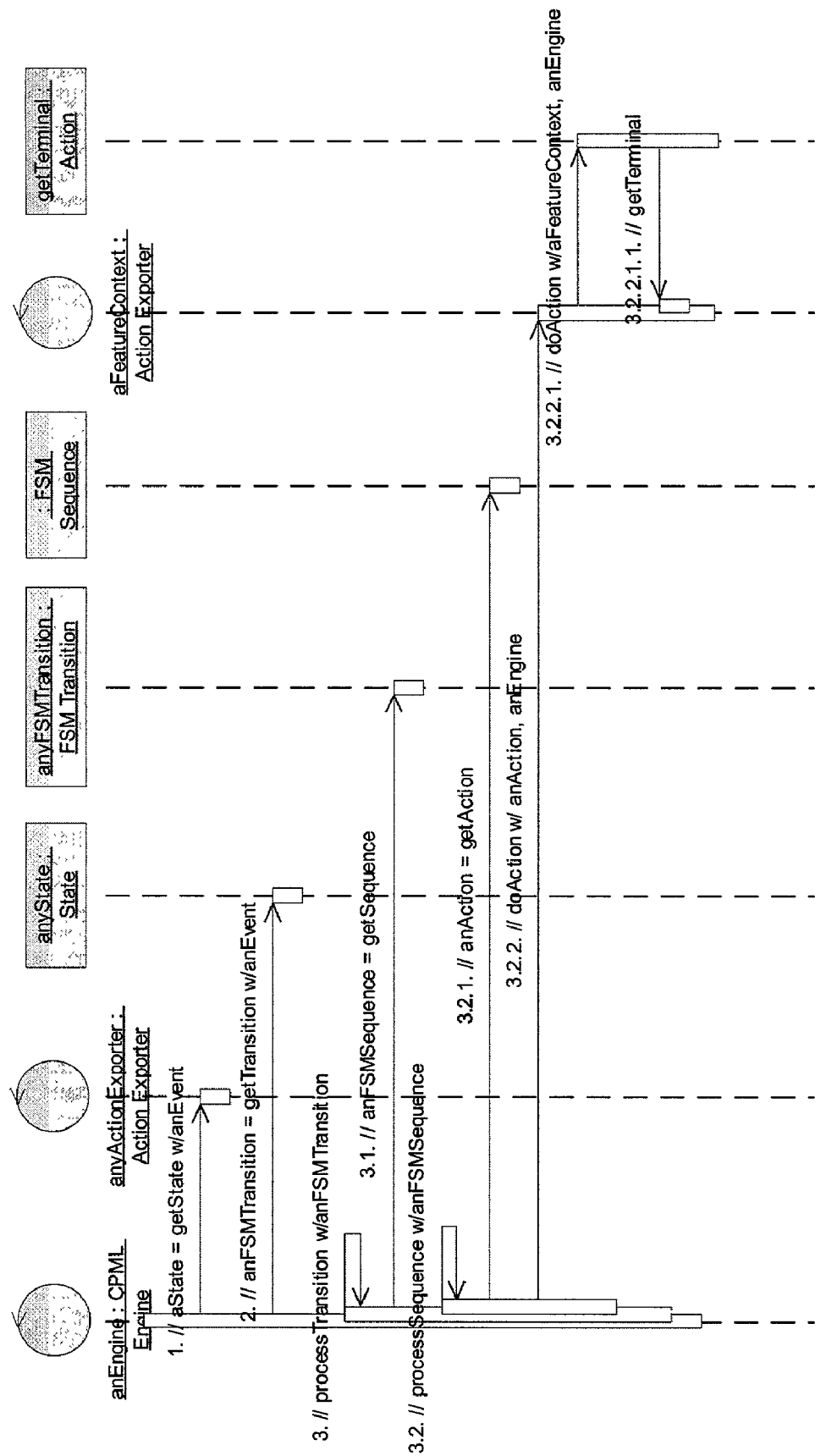

The exemplary system 100 further includes a pre-processor 110 that receives the DOM 106 and generates an object graph 112 which is representative of the state machine defined in the textual description, i.e., state machine document. By way of example, FIG. 36A presents a graphical representation of such an object graph based on logic specifications provided in a mark-up language. In addition to generating the object graph, the preprocessor 110 validates the document object model 106 by comparing it with a reference document object model 114, herein referred to as reference DOM. The reference DOM includes objects which are representative of permissible operations (actions). That is, the reference DOM identifies those operations that the system can support. For example, in a telecommunications application, the object model 110 may have a reference to an operation (action), such as playtone. Validating the object model ensures that such operations are in fact supported by the system. Hence, the object graph 112, generated by the pre-processor 110, provide object representations of validated actions for a given state machine as originally specified in the textual description.

The reference DOM 114 can be generated, for example by the parser 102, from a textual description 116 in a mark-up language of the reference model. In addition, the lexical structure of the textual description of the reference model can be validated by comparing it with a reference lexical structure 118, herein referred to as class and instance document type definition.

The object graph 112 includes nodes which are indicative of the states of the state machine, and edges which are indicative of transitions between these states. The object graph 112 is stored in an object repository 120, e.g., an object database. One embodiment of the invention employs an object database sold by Excelon Corporation. It should be understood that other object databases can also be utilized in a system of the invention. As will be discussed in more detail below, the object graphs can be accessed to execute particular iterations of the state machines represented by the object graphs.

In some cases, it may be necessary to adapt the object graph 112 for storage into the object repository 120. Hence, the exemplary system 100 includes a database adapter 122 that can transform the object graph, if needed, in a manner that renders it compatible for storage into the object repository 120.

Each object graph stored in the object repository generically represents the logic for a particular state machine. This representation is context free in that the object graph does not have any information regarding a particular state of and/or events received from an instantiated state machine, i.e., a particular iteration of the state machine. To execute a state machine, the system of the invention can instantiate an object having information regarding the context of the state machine, i.e., present state of the state machine and events received by the state machine. This context object communicates with an engine that in turn communicates with the object repository to accesses the object graph corresponding to the state machine. The engine navigates the object graph and instructs the context object regarding the state transitions and/or actions that the present state of the state machine requires. Further understanding of the run-time environment of a system of the invention can be obtained by reference to FIG. 13 above.

Figure 37:
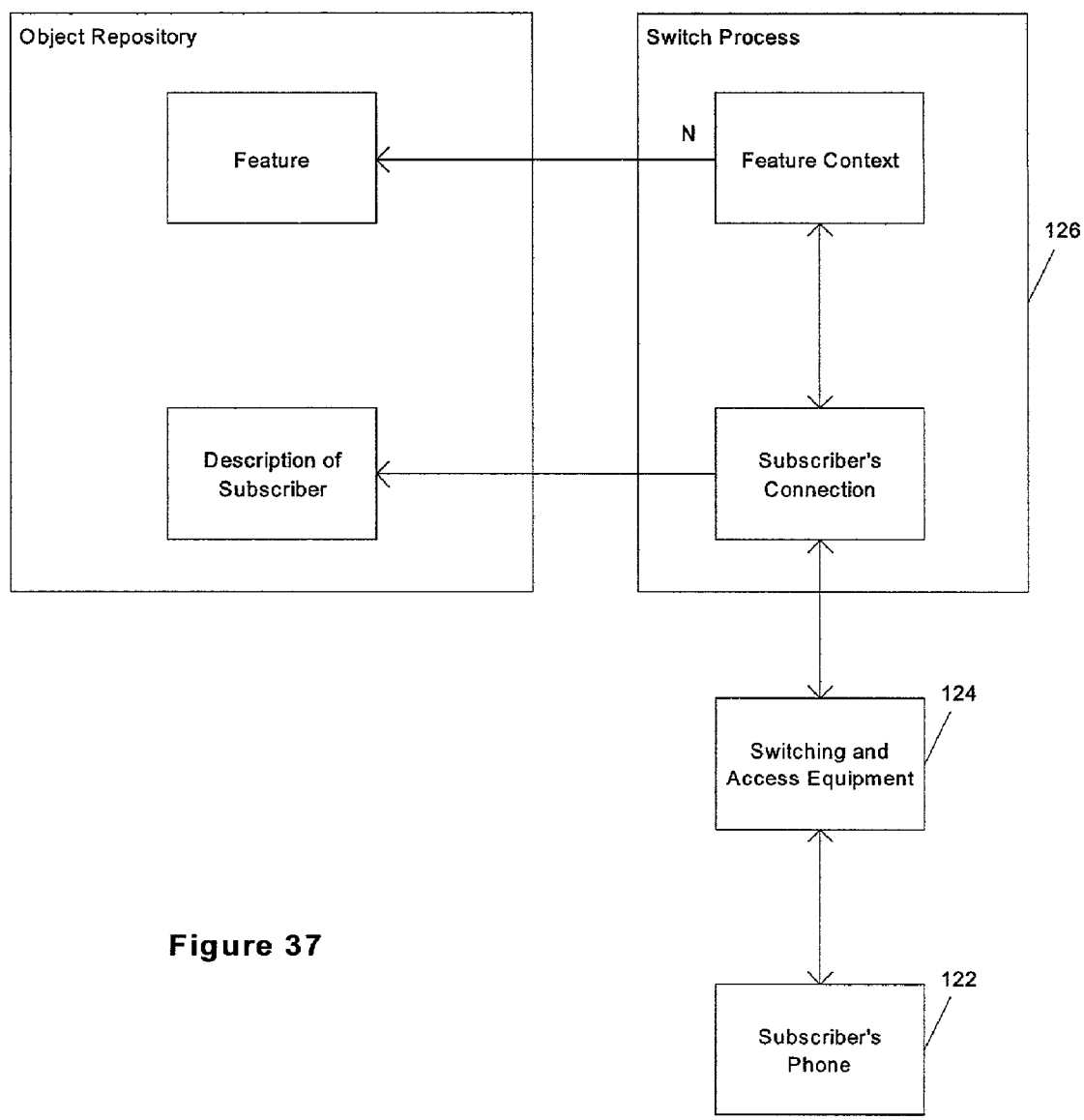
FIG. 37 is a diagram illustrating that an object graph created according to the teachings of the invention can be accessed by an object instantiated to execute a state machine represented by object graph to determine transition from a present state to a new state and any action, if any, to be performed.

The use of an object graph for execution of a state machine can be perhaps better understood by reference to FIG. 37 which schematically illustrates the execution of a call feature provided by a telecommunications system of the invention which utilizes an object graph to represent a state machine corresponding to that call feature. A subscriber's phone 122 can interact with switching and access equipment 124, e.g., PBX, to create a connection with a switch process 126.

The description of the call features of the subscriber are stored as objects in the object repository 120 (FIG. 36). These subscriber objects can be generated, for example, from a textual description of these features in a mark-up language, such as XML. A subscriber context object is instantiated that monitors progress of the subscriber's calls, and can transmit call events to a feature object instantiated in a feature context to provide particular call features to the subscriber. The feature object communicates with an engine which in turn navigates an object graph corresponding to the call feature, which is stored in the object repository 120, and instructs the feature object the state transition and the actions, if any, that need to be performed in response to a received call event.

A system according to the invention provides a number of advantages. For example, defining state machines in a mark-up language provides a more generic implementation of state machine than code based counter parts. Further, such an approach results in an event driven system that is more flexible than code based systems. For example, a system of the invention can be more easily provisioned and implemented. Further, providing an object representation of the state machine results in faster processing compared with interpretive techniques.

Further aspects of the construction and operation of the illustrated embodiment, in particular, for example, system provisioning, feature classifications and interactions, and multiparty calling, can be better understood by referring to the following discussion.

Service Provisioning

Call features and services are provided by a set of collaborating feature components. In many cases it is necessary to provision several feature components in order to provision a single call service. In some cases, simply replacing an existing feature component with another provides a new feature. A service may require a collection of specific components or it may require one or more specific components, one or more of which are chosen from a particular feature classification.

There are well-defined inter-dependencies between the feature component classifications that describe how components of different classification relate to and interact with one another. The se inter-dependencies can be used to support decision making when configuring a particular service.

Each feature component is classified and assigned an identifier. From the EMS perspective, feature component identifiers are strings.

The feature classifications and inter-dependencies as well as a basic POTS service configuration are described in more detail below.

Feature Classifications

Origination Request Handler

Figure 39:
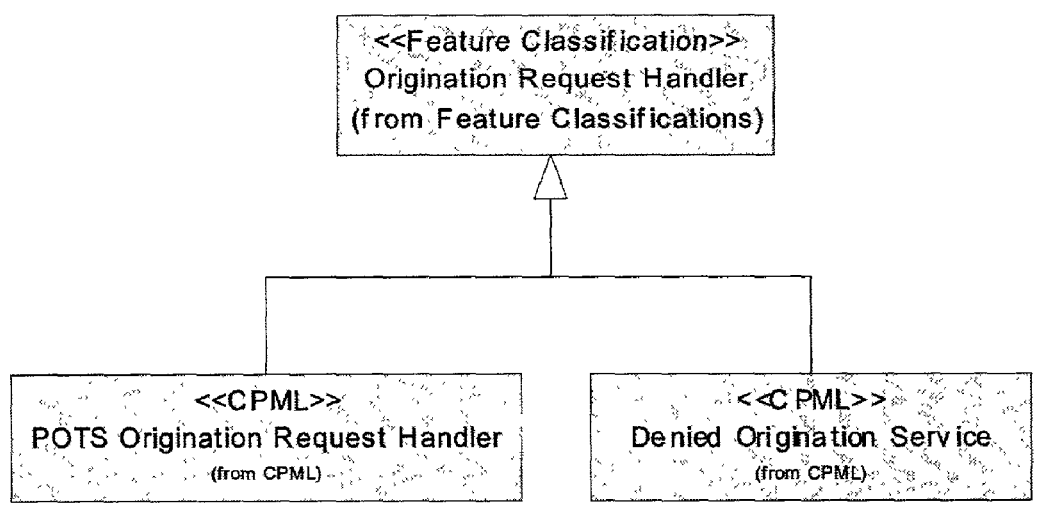
FIGS. 39–46 depict request handlers and feature handlers in accord with one embodiment of the invention.

With reference to FIG. 39, an origination request handler responds to a subscriber's attempt to place a call, invoke a vertical service feature, or invoke a special service. Origination request handlers typically provide feedback to the subscriber, such as dial tone, and gather a DTMF digit sequence that indicates the subscriber's intent. However, origination request handlers may provide unique behavior such as originating a call automatically, providing customized responses, etc.

An origination request handler is usually invoked by a subscriber lifting the telephone handset. However, an origination request handler may be invoked directly by other feature components. For instance, a feature that terminates by "re-originating" may invoke an origination request handler directly.

Each subscriber is provisioned, by definition, with one origination request handler. FIG. 39 shows that the following two origination request handlers have been defined:

1. POTS Origination Request Handler—this feature provides the standard "black telephone" response when a subscriber lifts the handset. This includes providing dial tone, collecting a dialed number, analyzing the dialed number, and invoking the subscriber's call origination feature, a vertical service feature, or a special service. This feature is provisioned for each subscriber having basic POTS service.

2. Denied Origination Service—this request handler is provisioned for all subscribers that are prohibited from originating calls.

Call Authorization Feature

Figure 40:
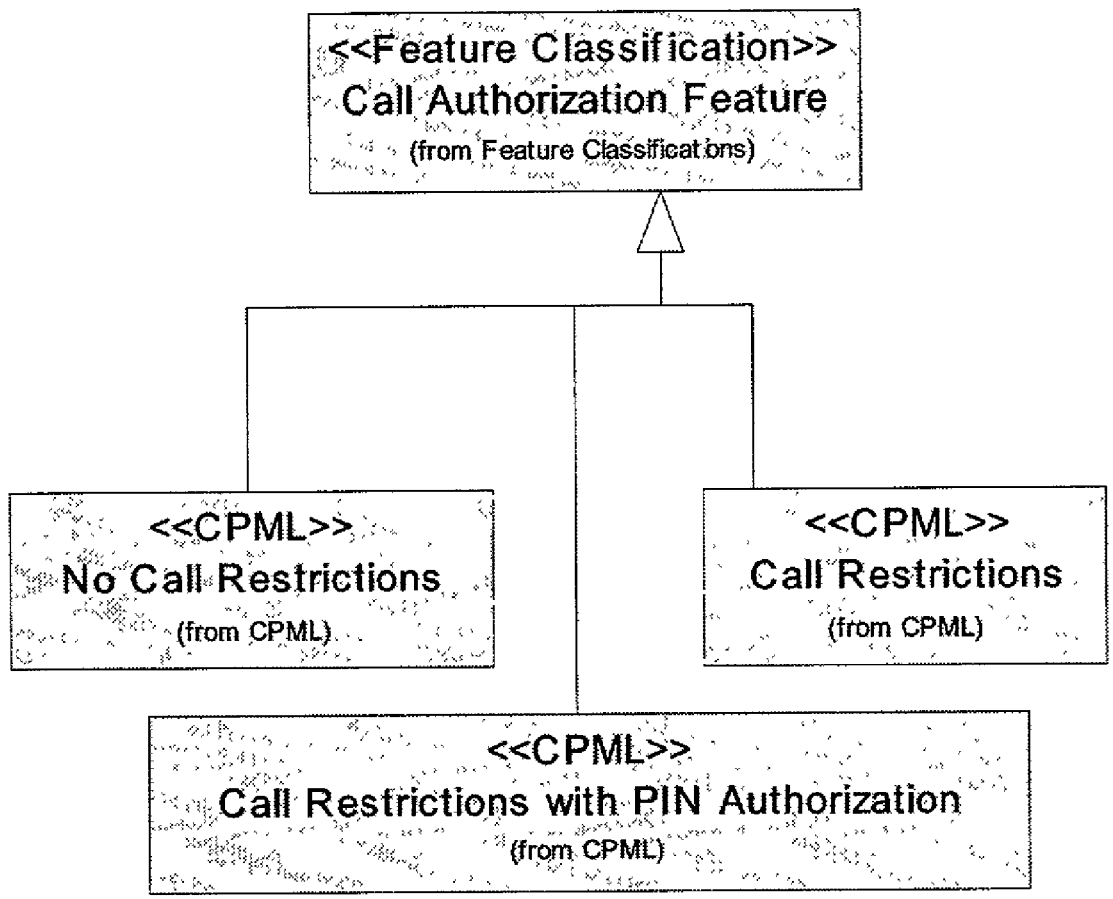

With reference to FIG. 40, a call authorization feature determines whether or not a specific call origination attempt is authorized. These features typically invoke one or more feature restriction components, which determine whether or not the specified call is subject to a restriction or subject to a class of restrictions, and report whether or not the call is authorized. Call authorization features may also provide alternative behaviors such as a PIN code authorization for specific call types.

Call authorization features are invoked as needed by origination request handlers and other features in order to determine whether or not a call is authorized. This may include circumstances wherein the call may occur at a later time. For example, a call authorization feature may be invoked to validate a call forwarding destinationnumber when the subscriber specifies the number.

Each subscriber is provisioned, by definition, with one call authorization feature. For example, FIG. 40 shows the following three such feature:

1. No Call Restrictions—this feature simply approves all calls. This feature is provisioned for all subscribers that have POTS Call Origination Service without any call restrictions.
2. Call Restrictions—this feature evaluates each provisioned restriction and reports the result. A call shall be authorized only if none of the provisioned restrictions apply. This feature must be provisioned whenever a subscriber has one or more call restrictions.
3. Call Restrictions with PIN Authorization—this represents an advanced call authorization feature that includes a PIN based restriction override capability.

Call Restriction Feature

Figure 41:
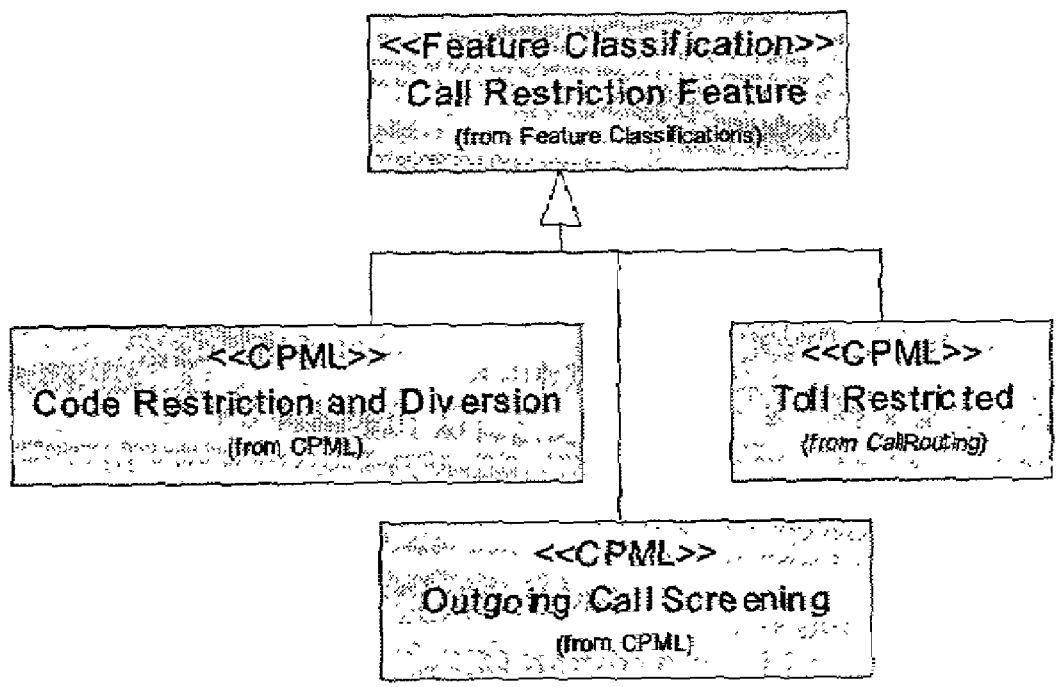

With reference to FIG. 41, a call restriction feature, operating in conjunction with subscriber attribute values, defines one or more prohibited calls or call types. A call restriction feature is invoked as a subroutine to report whether or not a specified call is prohibited.

Each subscriber may be provisioned with 0 or more call restriction features and associated attribute values. For example, FIGURE X schematically illustrates the following three call restriction features:

1. Code Restriction and Diversio
2. Toll Restricted
3. Outgoing Call Screenin

Call Origination Feature

A call origination feature originates and manages a call placed by a subscriber. A call origination feature selects and invokes a call routing function, based on call type, supports or directly provides call progress indications, and manages voice path.

Figure 42:
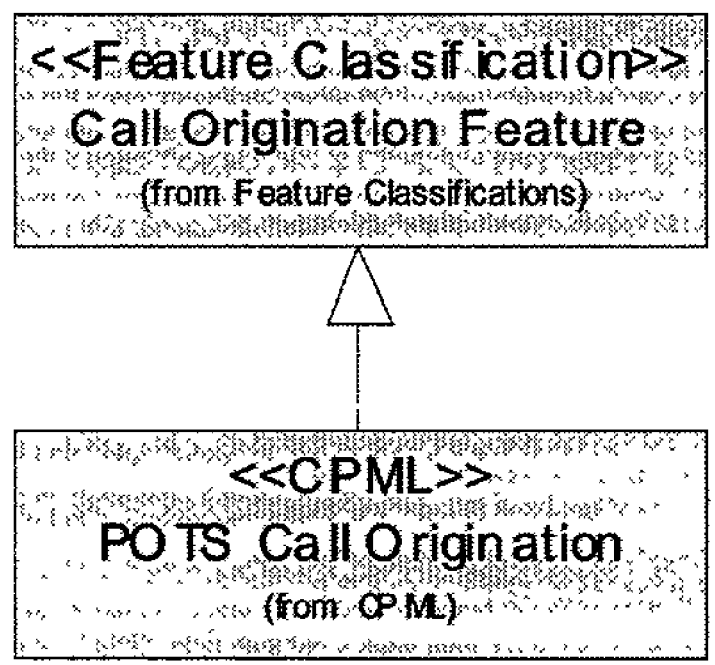

Each subscriber may be provisioned with no more than one call origination feature. For example, FIG. 42 illustrates a POTS call origination feature, provisioned for each subscriber having basic POTS service, that originates and approves POTS calls.

Vertical Service Feature

A vertical service feature is invoked in response to a dialed vertical service code, e.g., "*70". Vertical service features may be part of a larger service, e.g., Cancel Call Waiting, Activate Call Forward Busy Line, or may be a standalone feature, e.g., Customer Originated Trace (COTS).

A dialing plan defines zero or more associations between vertical services codes and vertical service features. Each subscriber should be provisioned with a dialing plan that provides appropriate vertical service code to vertical service feature associations.

Figure 43:
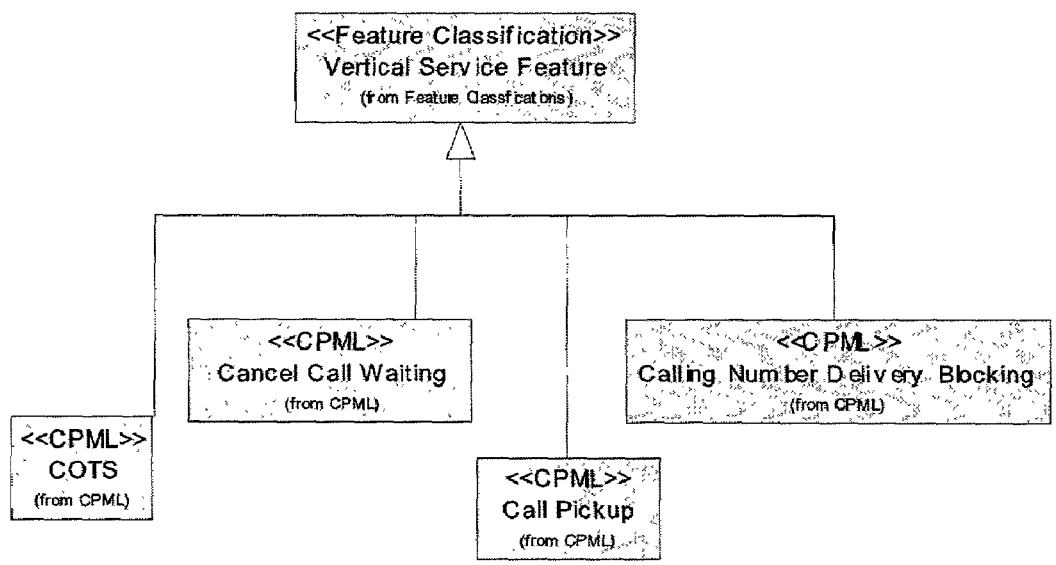

FIG. 43 provides a diagram depicting the following exemplary vertical service features:

1. COTS—this feature reports information about the most recently received call.
2. Cancel Call Waiting—this feature temporarily deactivates the Call Waiting feature.
3. Call Pickup—this feature allows a subscriber to receive a call placed to another directory number.
4. Calling Number Delivery Blocking—this feature temporarily marks the subscriber's directory number as private thus prohibiting its display to a called party.

Termination Request Handler

A termination request handler usually responds to a call termination attempt by choosing the most appropriate call termination feature from the subscriber's provisioned call termination features for the circumstances present at the time. A termination request handler chooses a feature by evaluating each terminating feature's activation criteria in sequence according to feature precedence. The call termination feature whose activation criteria are satisfied and has the highest precedence is invoked to terminate the call. However, a termination request handler may take direct action such as denying the call.

Figure 44:
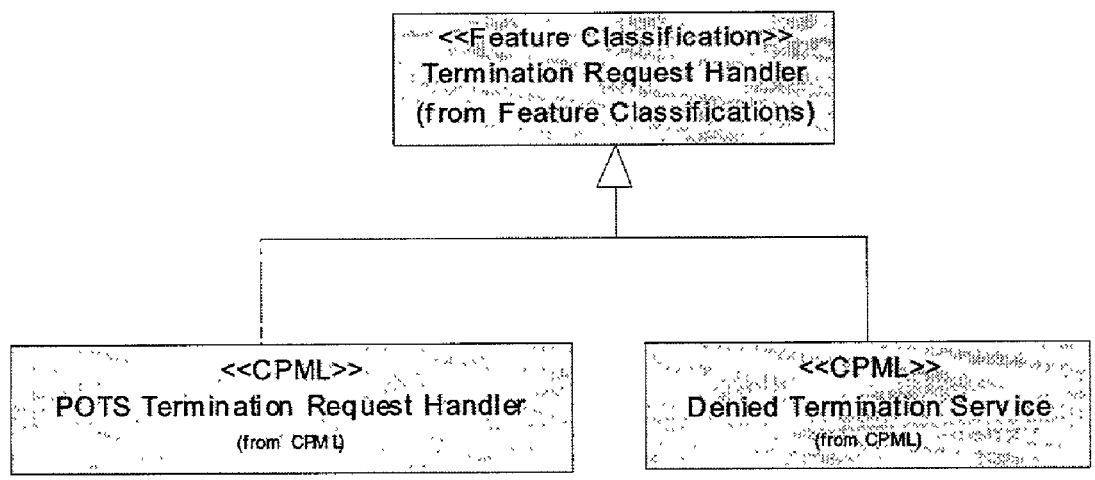

Each subscriber is provisioned with one termination request handler. By way of example, FIG. 44 illustrates the following two termination request handlers:

1. POTS Termination Request Handler—this feature provides the standard "black telephone" response to a call termination request. This request handler selects and invokes the most appropriate call termination feature. This feature is provisioned for each subscriber having basic call termination service.
2. Denied Termination Service—this termination request handler refuses all call termination attempts. This feature is provisioned for each subscriber that is prohibited from receiving calls.

Call Termination Feature

A call termination feature provides a specific call termination behavior. Call termination behaviors include presenting a call to the subscriber, forwarding a call, refusing a call, etc.

Figure 45:
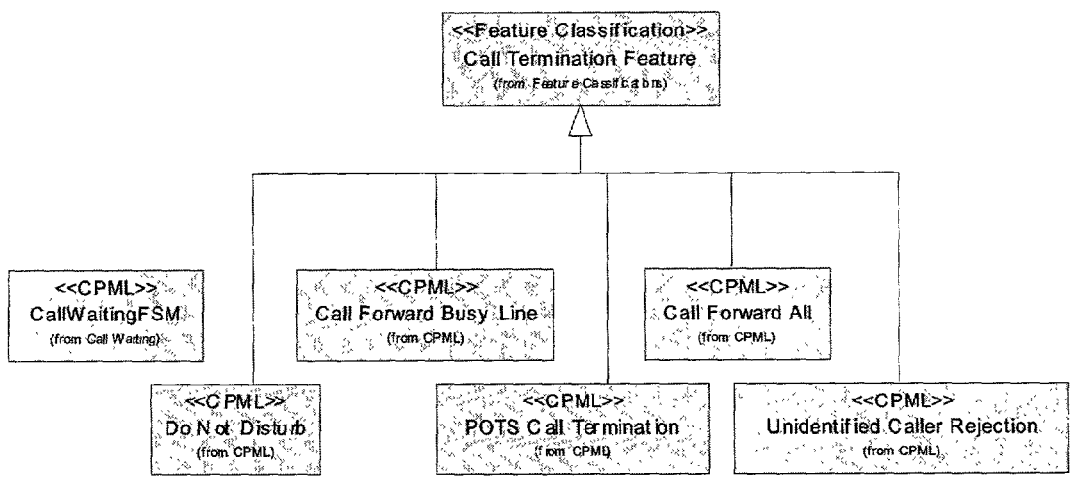

FIG. 45 schematically depicts the following exemplary call termination features:

1. Call Waiting—this feature presents a call to a subscriber when another call is already present and allows the subscriber to alternate conversation between the two calls.
2. Do Not Disturb—this feature, when active, refuses all calls.
3. Call Forward Busy Line—this feature, when active and the subscriber is busy at the time a call is presented, forwards the call to a previously specified directory number.
4. POTS Call Termination—this feature presents a call to the subscriber.
5. Call Forward All—this feature, when active, forwards all calls to a previously specified directory number.
6. Unidentified Caller Rejection—this feature, when active, refuses all calls wherein the calling party number is private, i.e., when the call's originator prohibits presentation of the calling party number.

Alerting Feature

An alerting feature notifies a subscriber that an inbound call is present. In one embodiment, there exists the following three sub-classifications of alerting features:

1. Idle Alerting Features—notify the subscriber by ringing the phone. These features are invoked when the subscriber's handset is on hook.
2. Mid-Call Alerting Features—notify the subscriber by generating an audible tone during conversation. These features are invoked when the subscriber is connected with another call at the time the inbound call is presented.
3. Bounded Alerting Features—notify the subscriber that an inbound call is present and generate a "no answer" event if the subscriber does not "answer" within a predetermined time limit. These features are further specialized into idle and mid-call altering features.

Figure 46:
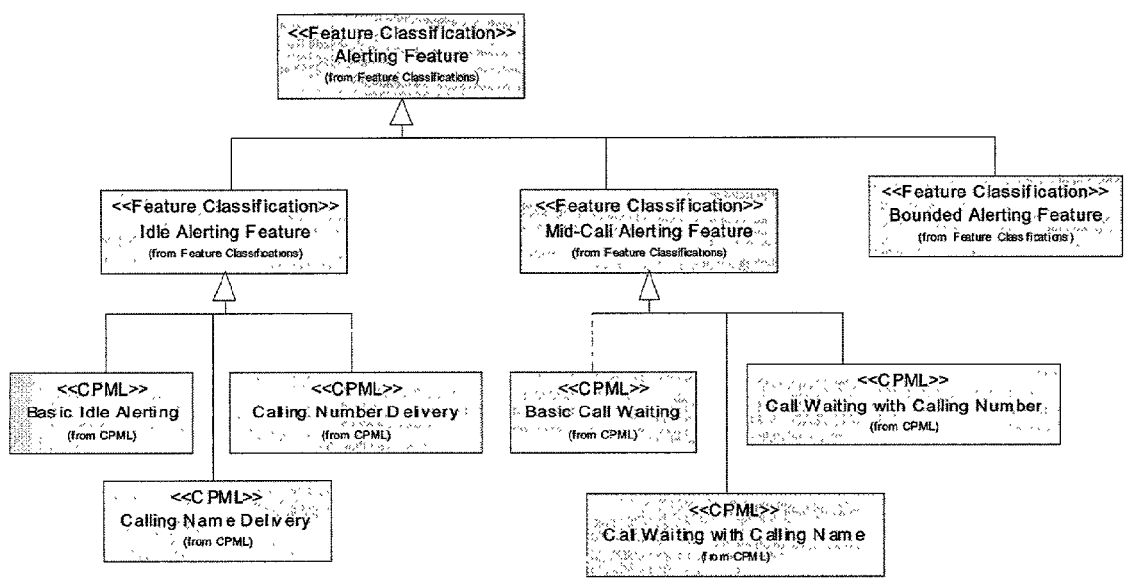

By way of example, FIG. 46 depicts the following exemplary alerting features utilized in one embodiment of the invention:
1. Basic Idle Alerting,
2. Calling Number Delivery,
3. Calling Name Delivery,
4. Basic Call Alerting,
5. Call Waiting with Calling Number, and
6. Call Waiting with Calling Name.

Originating Feature Interactions

Figure 47:
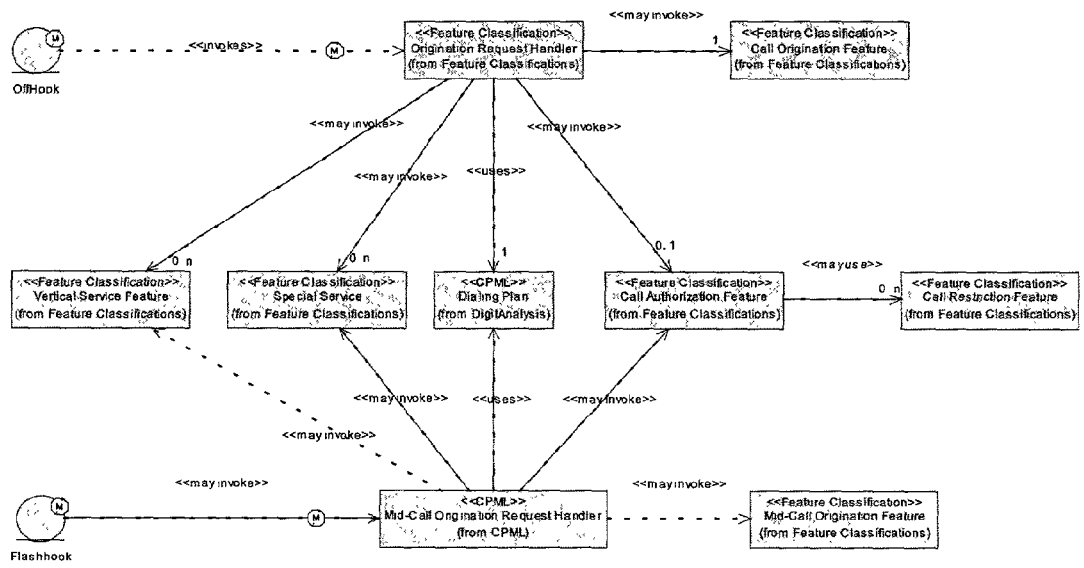
FIG. 47 depicts interaction of originating feature classifications in a system according to the invention.

FIG. 47 provides a diagram that depicts the relationship between boundary events, e.g., offhook, and the classifications of features. as well as relationships among various originating feature classifications defined in one embodiment of the invention. In particular, FIGURE X shows how a feature handler resolves potential conflicts among different features. A feature handler, preferably implemented in a mark-up language, is chosen based on the feature passed to a context object by a subscriber terminal (or the network terminal).

For example, an Origination Request Handler is invoked in response to an off hook event. An Origination Request Handler employs a Dialing Plan for dialed number analysis and translation. An Origination Request Handler may invoke a Vertical Service Feature in response to a dialed vertical service code. Alternatively, an Origination Request Handler may invoke a Special Service in response to a dialed special service code, or may invoke a Call Authorization Feature in response to a dialed directory number.

A Call Authorization Feature may use one or more Call Restriction Features to identify unauthorized calls or call types. An Origination Request Handler may invoke a Call Origination Feature to place an authorized call.

A Mid-Call Origination Request Handler may be invoked in response to an event, e.g., flash hook during a call. A Mid-Call Origination Request Handler utilizes a Dialing Plan for dialed number analysis and translation. A Mid-Call Origination Request Handler may invoke a Vertical Service Feature in response to a dialed vertical service code. Alternatively, a Mid-Call Origination Request Handler may invoke a Special Service in response to a dialed special service code. Further, a Mid-Call Origination Request Handler may invoke a Call Authorization Feature in response to a dialed directory number. A Mid-Call Origination Request Handler may invoke a Mid-Call Origination Feature to place an authorized call.

Terminating Feature Interactions

Figure 48:
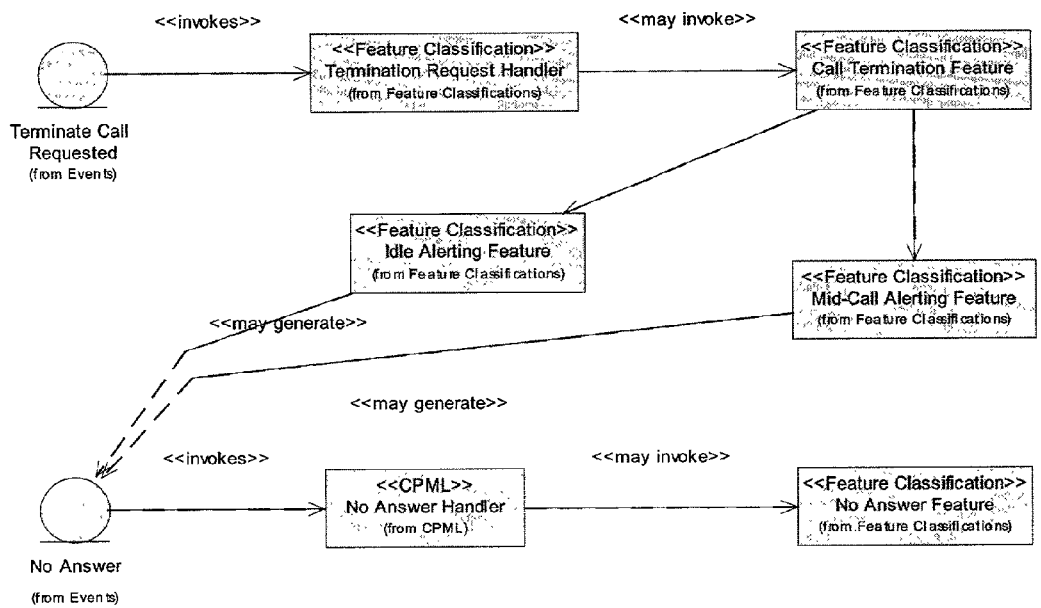
FIG. 48 depicts interaction of terminating feature classifications in a system according to the invention.

FIG. 48 provides a diagram that depicts the inter-action of the terminating feature classifications. Similar to an origination request handler, a termination request handler processes call terminal events and ensures that no conflict arises among various features.

Multi-party Call Scenario

The following example depicts the evolution of call and feature processing objects configuration starting with the origination of a two-party call and ending with a three-way call.

Subscriber Idle

Figure 49A:
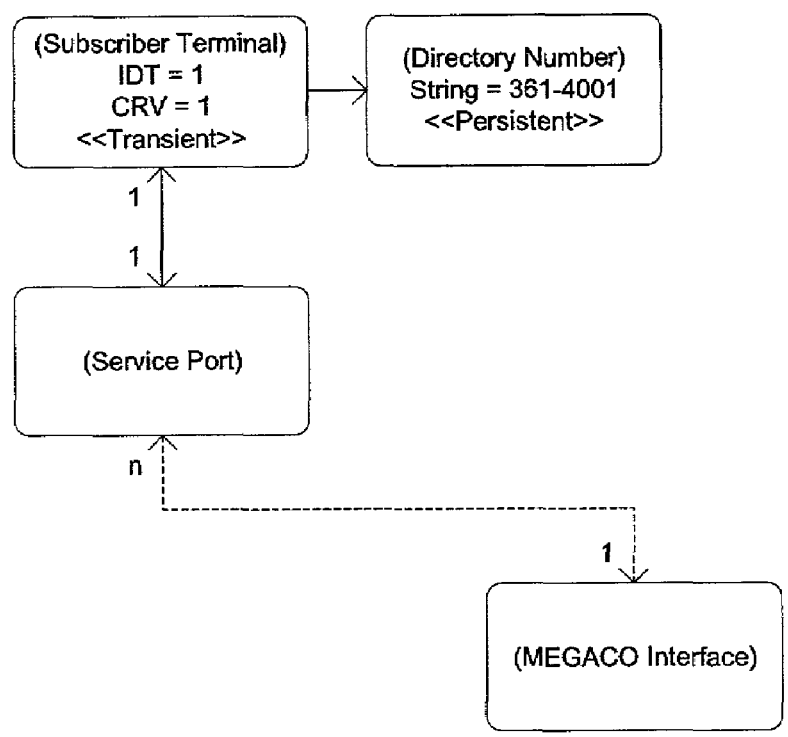
FIG. 49A depicts objects representing a subscriber in an idle state in a system according to the invention.
Figure 49B:
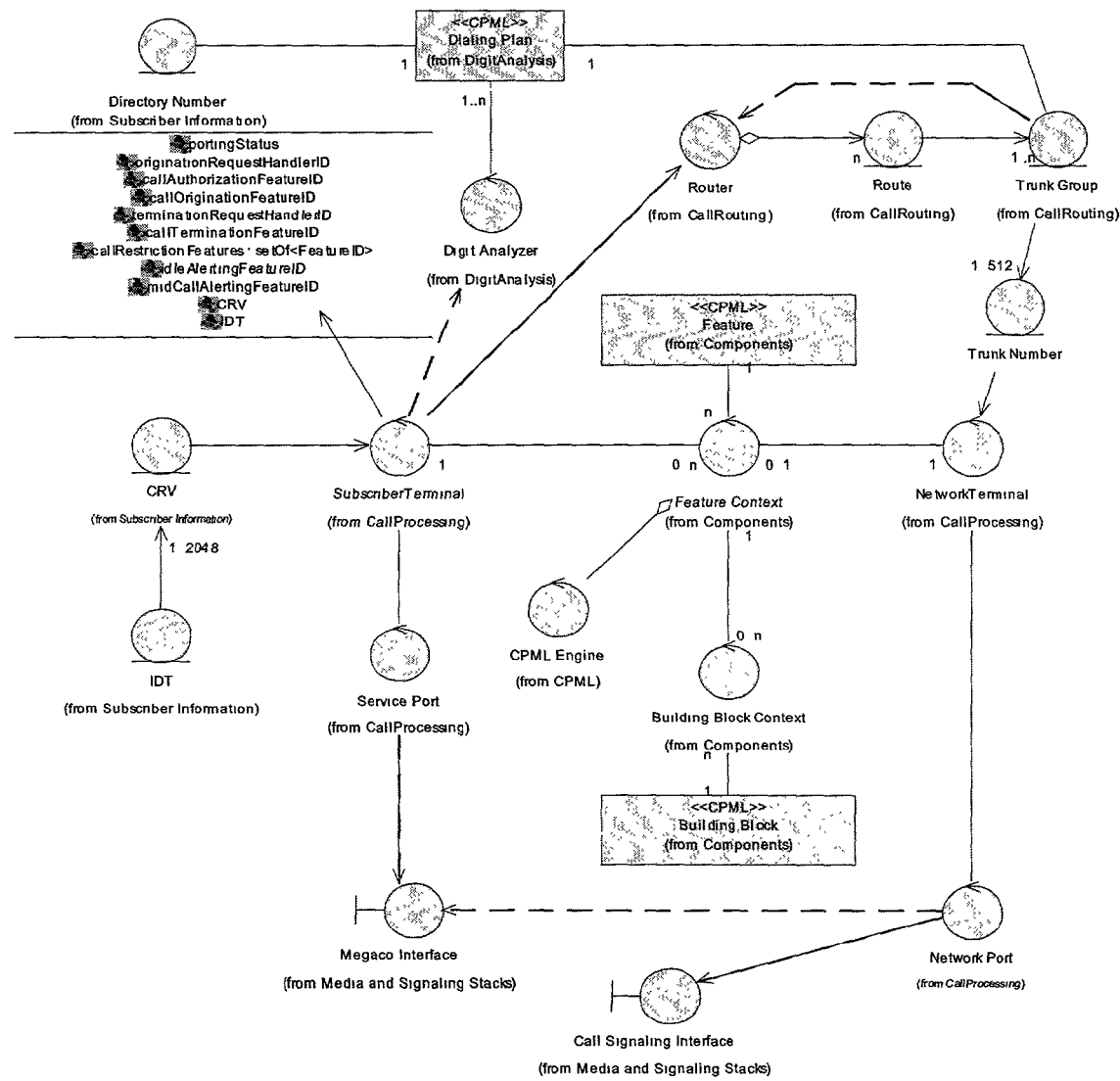
FIG. 49B depicts an object model for a system according to the invention.

FIG. 49A provides a diagram that depicts the objects representing a particular subscriber in an idle state. With reference to both FIGS. 49A and 49B, a SubscriberTerminal is a non-persistent object representing the current state of a subscriber. Each SubscriberTerminal contains a one-way reference to a persistent DirectoryNumber object. A DirectoryNumber object is the persistent representation of a particular subscriber including the subscriber's directory number string, the subscriber's provisioned features, and so forth. Each SubscriberTerminal also has a two-way association with a ServicePort.

A ServicePort provides the associated SubscriberTerminal with an interface to the underlying switch. It converts the terminal's commands into MEGACO transactions and/or call signaling messages. It also converts MEGACO notifications and call signaling messages into events for processing.

Subscriber Offhook

Figure 50:
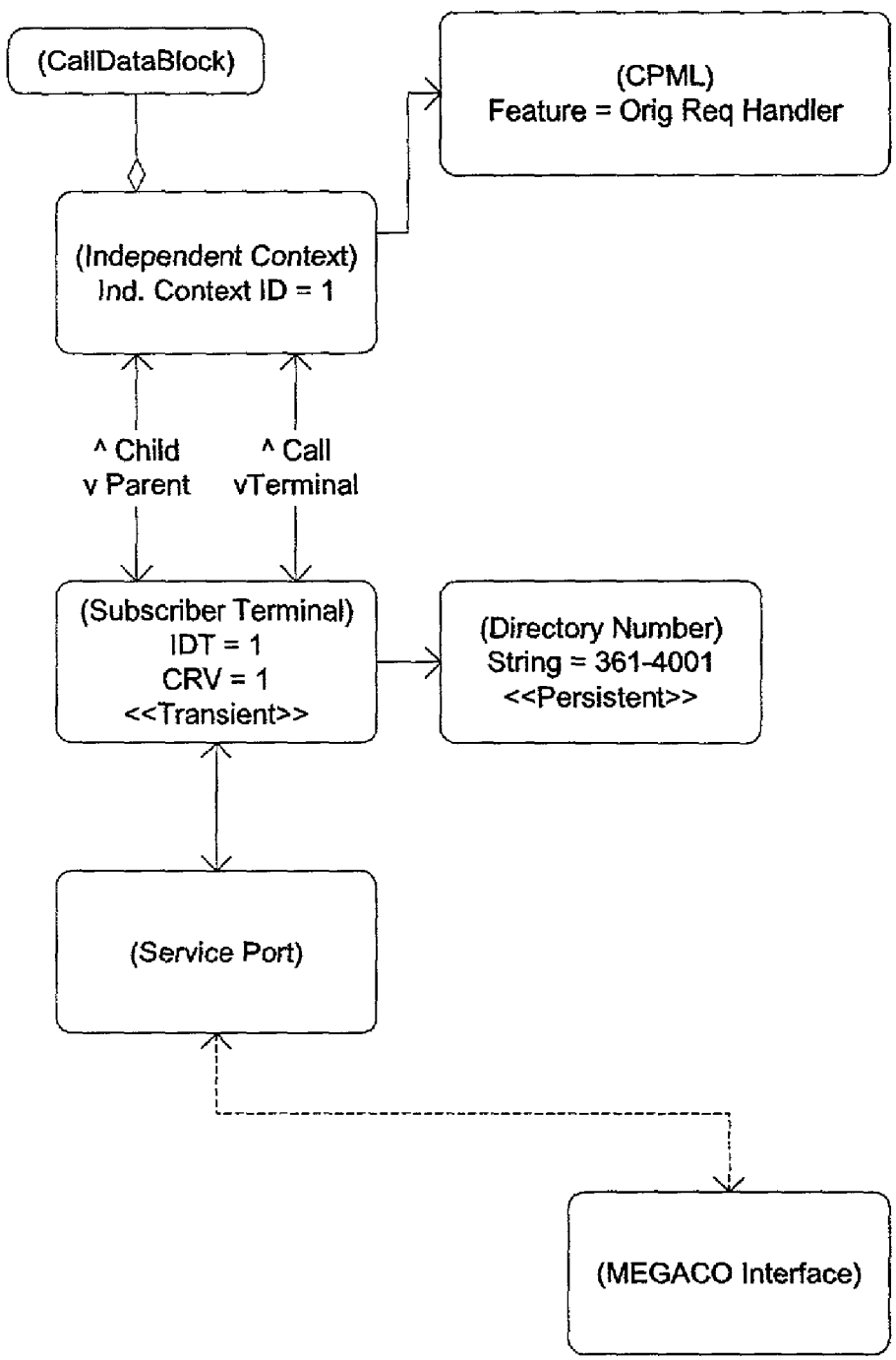
FIG. 50 depicts processing of an originating call in a system according to the invention.

FIG. 50 provides a diagram that depicts changes that occur after the subscriber lifts the handset to originate a call or invoke a vertical service feature element.

When an offhook event is observed and the subscriber is in the idle state, the SubscriberTerminal invokes the subscriber's origination request handler. An origination request handler is a provisioned feature that defines how to proceed when offhook occurs from the idle state.

To execute the origination request handler, the SubscriberTerminal obtains the subscriber's origination request handler feature ID from the DirectoryNumber, and constructs an IndependentContext object, and passes the feature ID to this object. Upon construction, the IndependentContext object obtains a pointer to the objects that define the specified feature's state machine, initializes the processing engine, and executes the feature from the start state with the start event.

The IndependentContext has a two-way, parent-child relationship with the SubscriberTerminal. The parent/child relationship is established primarily for memory management and message routing purposes. Further, the call/terminal relationship reflects to whom each object sends messages (e.g., terminal to context object for new non-boundary events and/or context to terminal for commands). This association is established upon construction of the IndependentContext and supports the following capabilities:
1. The SubscriberTerminal is responsible for releasing the memory allocated to each IndependentContext it creates. However, a SubscriberTerminal cannot determine independently when an IndependentContext can be deleted. Each feature defines its own lifespan. An IndependentContext remains viable until each of its associated feature elements has concluded. Therefore, the last feature element to conclude must execute an action instructing the SubscriberTerminal to delete the IndependentContext. This instruction is always conveyed from child to parent.
2. Messages exchanged between originating and terminating features are routed from object to object using the SubscriberTerminal's IDT and CRV plus the destination feature's independent context ID. Each message is dispatched first to the SubscriberTerminal specified by the IDT and CRV values. The SubscriberTerminal examines the independent context ID and either processes the message, when the value is 0, or forwards the message to the appropriate IndependentContext, when the value is greater than 0.

The IndependentContext also has a two-way call-terminal relationship with the SubscriberTerminal. This association supports propagation of events and commands related to call and feature processing. Events originating from the underlying CSX switch, received via the ServicePort, are propagated from terminal to call. Events originating from peer features are communicated directly to the destination independent context. Commands are always propagated from call to terminal.

Subscriber Dialed a Directory Number

Figure 51:
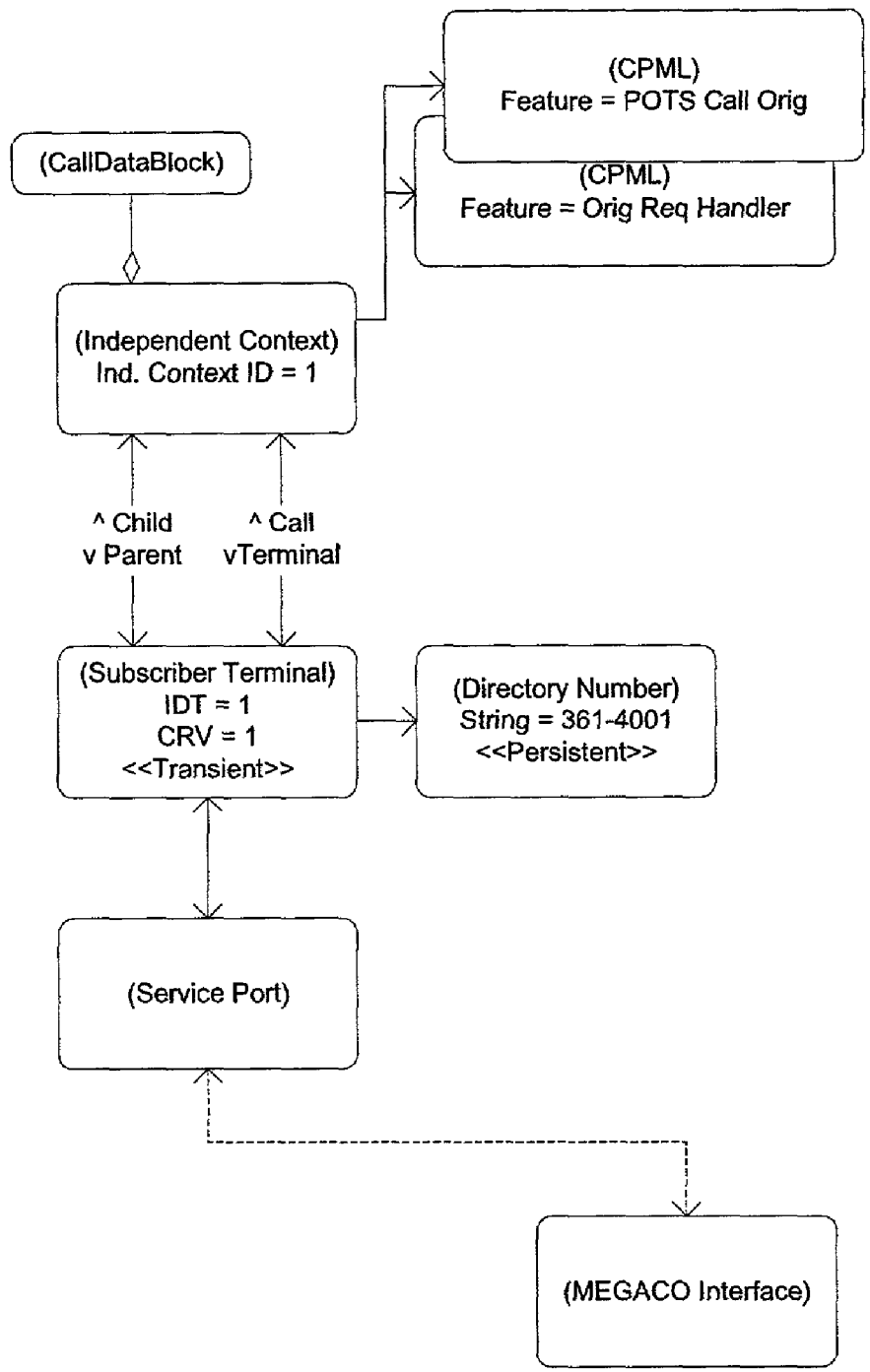
FIG. 51 depicts further processing sequences in a system according to the invention.

FIG. 51 provides a diagram that depicts the changes that occurred after the subscriber dialed a valid directory number.

Upon receiving the dial number, the "Orig Req Handler" calls upon the digit analyzer to classify the digit sequence. A subscriber may dial a destination code (directory number), a special service code, or a vertical service code depending upon the provisioned dialing plan. When the digit sequence is classified as a directory number and the call is authorized, the "Orig Req Handler" invokes (calls) the subscriber's call origination feature. In this example, the subscriber's provisioned call origination feature is "POTS Call Orig".

As shown here, the "Orig Req Handler" has invoked the specified feature using a "function call" model. As the name implies, the called feature is stacked on top the calling feature. Events are propagated from the top of the stack down. Each event is presented to each feature in this manner until a feature consumes the event, i.e., reacts to the event, or the end of the stack is reached. If the stack is exhausted, the event becomes stale. The SubscriberTerminal defines the handling of stale events.

Call Request Routed From Calling to Called Subscriber

Figure 52:
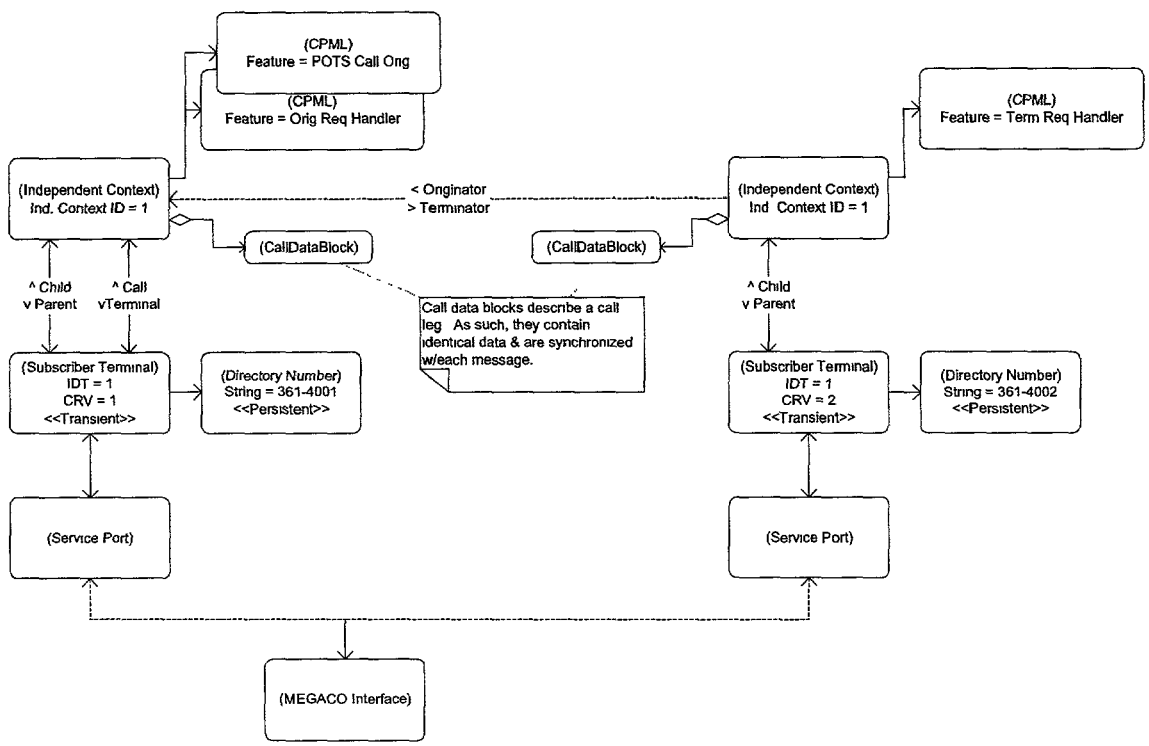
FIG. 52 depicts processing of a termination request in a system according to the invention.

FIG. 52 illustrates a diagram depicting the changes that occur after the called subscriber has been identified and presented with a call termination request.

The call origination feature calls the router to route the call to the appropriate destination; in this case another local subscriber. The router identifies and forwards a terminate call request to called subscriber. Upon receiving a terminate call request, a SubscriberTerminal invokes a termination request handler. A termination request handler is a provisioned feature that defines how to proceed when a terminate call request is received.

Invocation of a termination request handler is similar to invocation of the "Orig Req Handler". In this scenario, the subscriber's termination request handler is POTS Termination Request Handler. This particular request handler selects and invokes the appropriate call termination feature.

Note that a one-way originator-terminator relationship has been established from the called subscriber, the terminator, towards the calling subscriber, the originator. This relationship supports message propagation between originator and terminator. However, it is one-way at this point because the originator has not yet learned the terminator's identity.

Note also that a call-terminal association has not yet been established between the SubscriberTerminal and the IndependentContext. Many call termination features don't present the call to the subscriber; there are various features that refuse the call and various features that forward the call. Call termination features that don't present the call do not require control of the subscriber's access connection and therefore don't need to occupy that active call role. A feature only needs to occupy the active call role when and if it needs control of the subscriber's access connection. Therefore, the termination request handler defers creation of the call-terminal association to the selected termination feature.

The CallDataBlock, depicted in this diagram as well as in previous diagrams, describes a particular call leg between an originator and terminator. This object contains all attributes that must be shared between the originator and terminator; attributes such as the originator and terminator ID information, call answer date and time, call disconnect date and time, and so forth. This object is carried with each message exchanged between originator and terminator to maintain synchronization and to provide up to date information.

Terminating Call Presented to Called Subscriber

Figure 53:
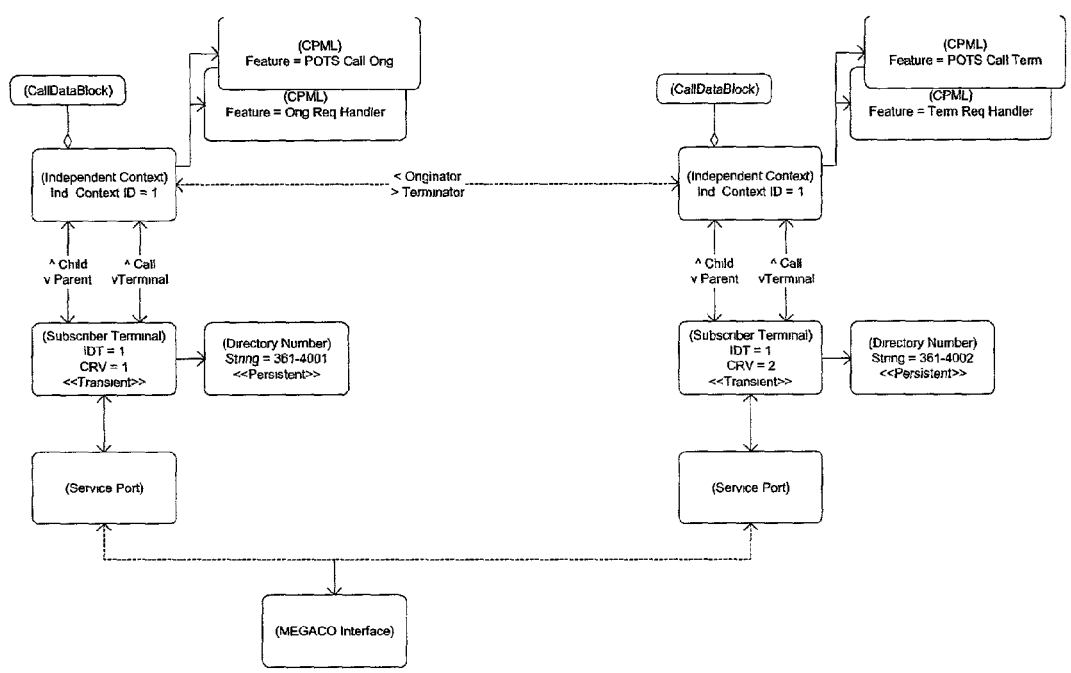
FIG. 53 depicts a stable two-party call in a system according to the invention.

FIG. 53 presents a diagram that depicts an exemplary stable two-party call. A selected call termination feature, in this case POTS Call Termination, is invoked using the function call model. This particular feature presents the call to the subscriber. It therefore establishes the call-terminal association, rings the phone, and sends a call proceeding message to the originator.

With the call proceeding message, the terminator's ID information passes to the originator in the CallDataBlock and the originator-terminator relationship becomes bi-directional. This message also enables call progress indication to the originator; since this is a local subscriber-to-subscriber call audible ringing will be applied to the originating termination.

When the called subscriber answers, an answer indication passes from the terminator to the originator. This message carries the answer date and time and informs the originator that ringback can be terminated. At this point, a stable two-party call has been established.

Calling Subscriber Executes a Mid-call Origination

Figure 54:
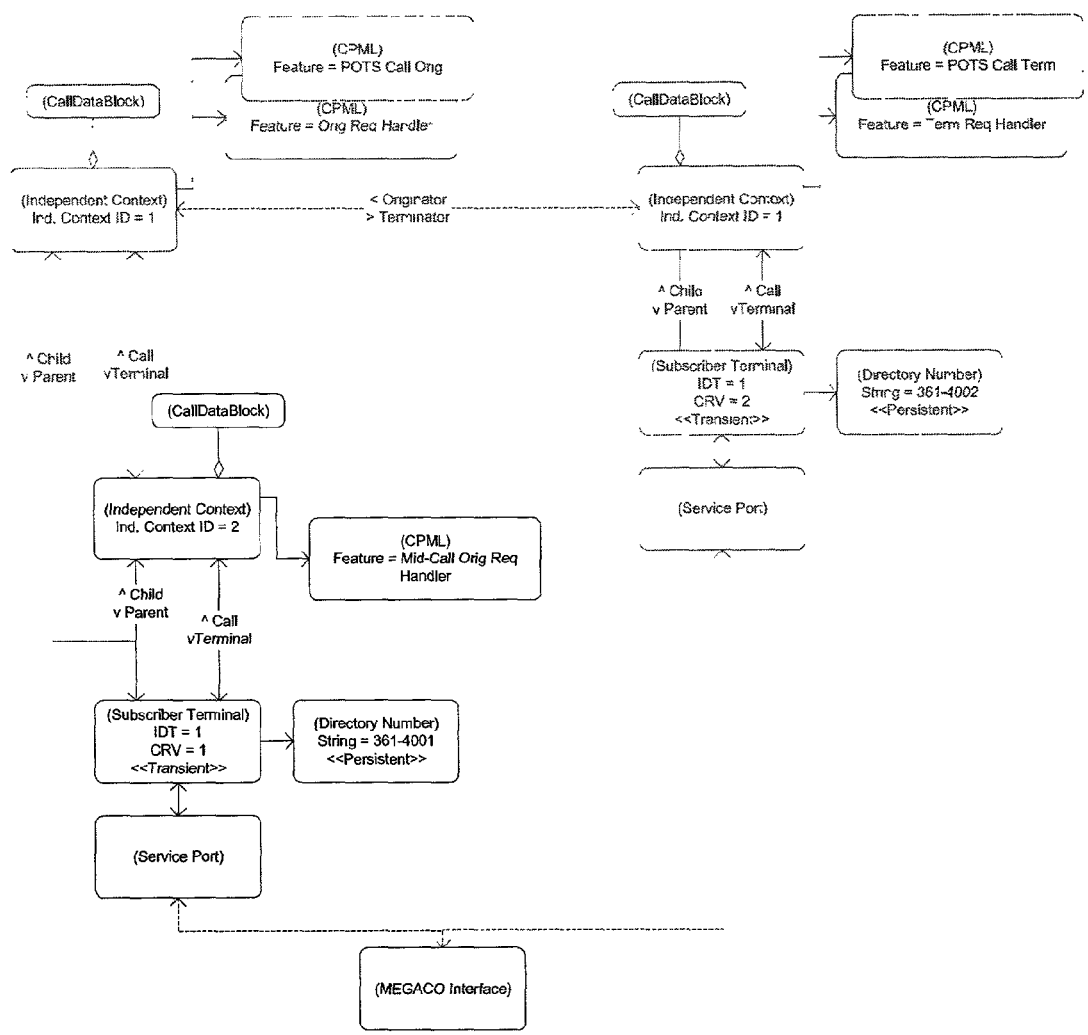
FIG. 54 depicts processing of an event, e.g., a flashhook, in a system according to the invention.

FIG. 54 presents a diagram that depicts the changes that occur after the originating subscriber issues a flashhook. An active call feature may consume a flashhook or the flashhook may represent a mid-call origination attempt. A mid-call origination attempt is identified when, and if, a flashhook event becomes stale.

In this scenario, the flashhook event was propagated to the active call but was ignored because it is not meaningful to POTS Call Origination or to "Orig Req Handler". The event became stale so the SubscriberTerminal created an independent context and invoked the mid-call origination request handler; as seen here the subscriber's mid-call origination request handler is "Mid-Call Orig Req".

By definition, an origination request handler takes control of the subscriber's audio connection in order to provide feedback (tones) to and collect information (digits) from the subscriber. A mid-call origination request handler is an origination request handler. Therefore, "Mid-Call Orig Req" assumed the active call role.

In assuming the active call role with respect to the SubscriberTerminal, a mid-call origination request handler must also assume the role of terminal with respect to the existing call and inform the existing call that a multiparty feature is now present. The behavior of a two-party feature is altered by the presence of a multi-party feature in that it must terminate unconditionally if and when the far end party hangs up. The mid-call origination request handler and any subsequent mid-call origination feature must know if and when the existing call terminates. By assuming the terminal role with respect to the existing call, the mid-call origination request handler places itself in the flow of information pertaining to the existing call. Any subsequent mid-call origination feature inherits these associations; terminal with respect to the previously existing call and call with respect to the SubscriberTerminal, thus satisfying its need to be in the information flow regarding the existing call.

The respective features each retain responsibility for disposition of their respective call legs and call detail recording.

Mid-call Origination Feature Invoked

Figure 55:
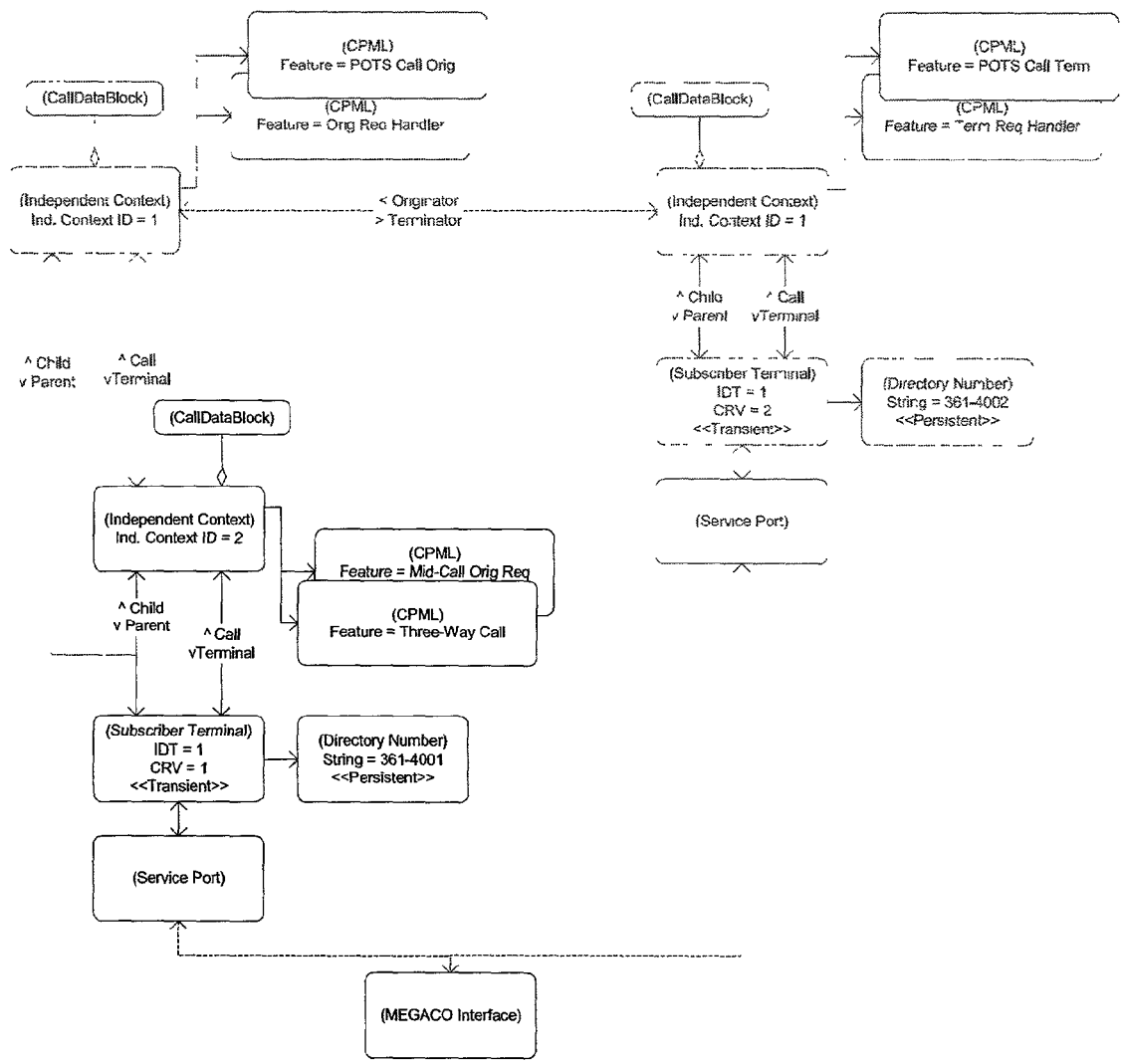
FIG. 55 depicts invocation of a mid-call origination feature in a system according to the invention.

FIG. 55 illustrates a diagram that depicts the changes that occur after the subscriber dials a directory number.

The dialed digit sequence is classified as a destination code by the digit analyzer. Thus, the subscriber's mid-call origination feature is invoked. A mid-call origination feature is a provisioned feature that is invoked when a subscriber originates a call while participating in a two-party call. As shown here, the subscriber's mid-call originating feature is three-way calling. A second context object1, e.g., the context object of second call, serves as proxy terminal for the context object of the first call., thereby ensuring consistency in event processing.

The call origination aspects of a mid-call origination feature are similar to a two-party call origination feature.

Call Routed to Called Subscriber

Figure 56:
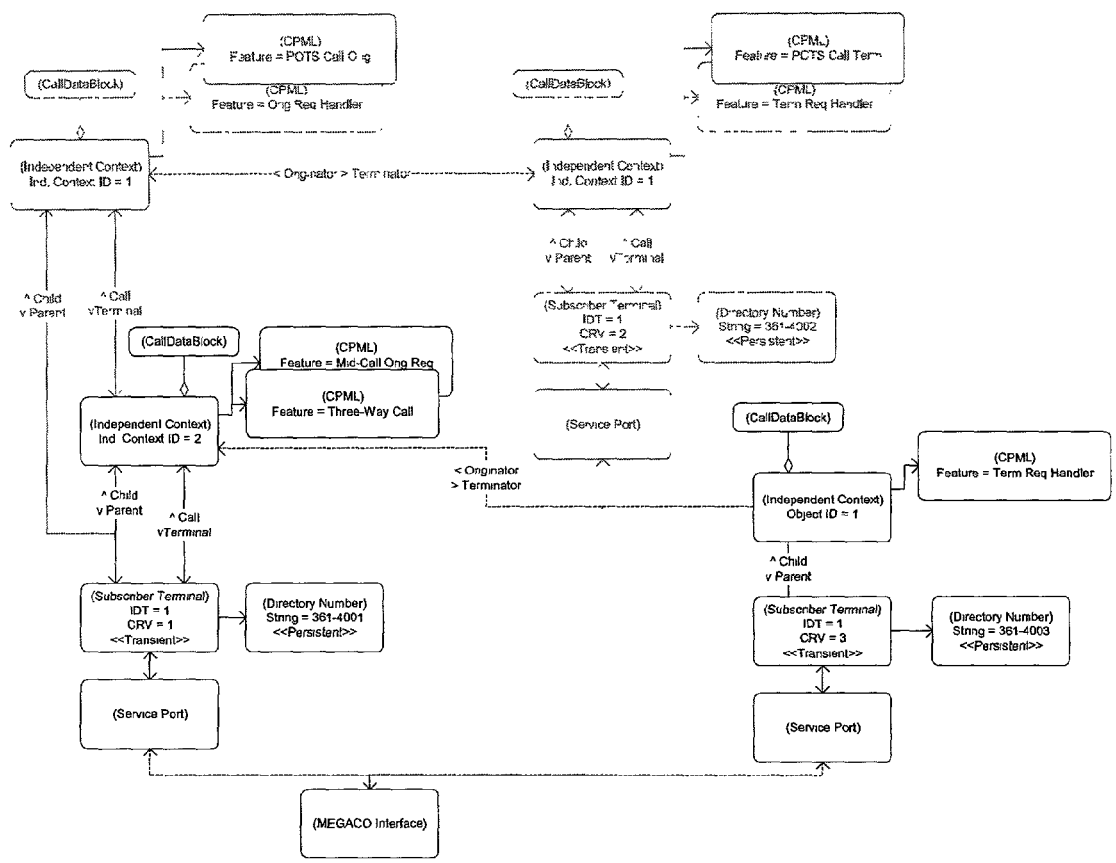
FIG. 56 depicts three-way calling in a system according to the invention.

FIG. 56 presents a diagram that depicts the changes that occur after the second call is routed to the called subscriber.

Processing on the called subscriber's side is identical to that observed with the two-party call since the called subscriber is responding to a terminate call request. Features, object configuration, and associations are similar to those on the caller's side.

Terminating Call Presented to Called Subscriber

Figure 57:
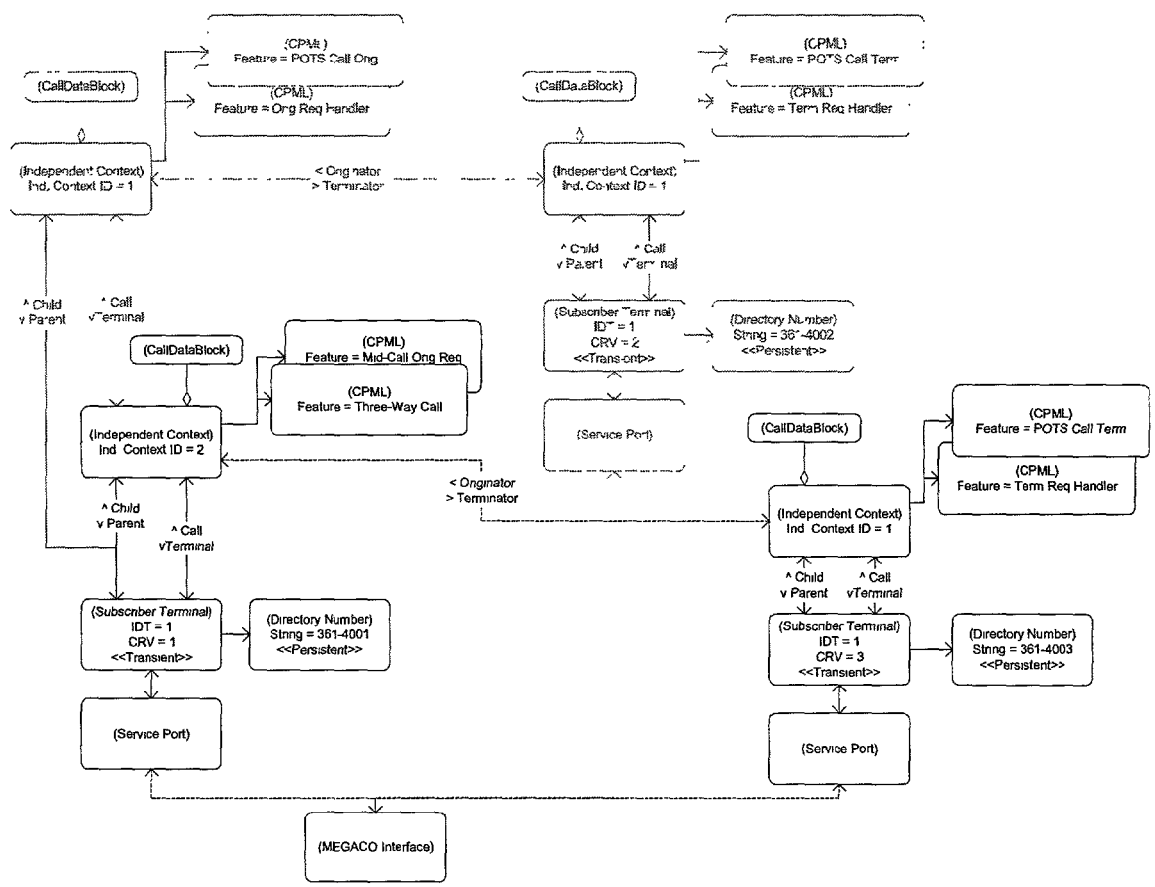
FIG. 57 depicts object configuration upon establishment of a three-way call in a system according to the invention, and FIG. 58 schematically illustrates selected processes and their interactions in a system of the invention.

FIG. 57 depicts the objects' configuration once the three-way call is completely established.

The original call's configuration remains unchanged except for the substitution of the SubscriberTerminal by the IndependentContext supporting the three-way call. The three-way call feature acts as terminal to the previously existing call and as originator to the second call. The configuration of the two terminators is similar.

Figure 58:
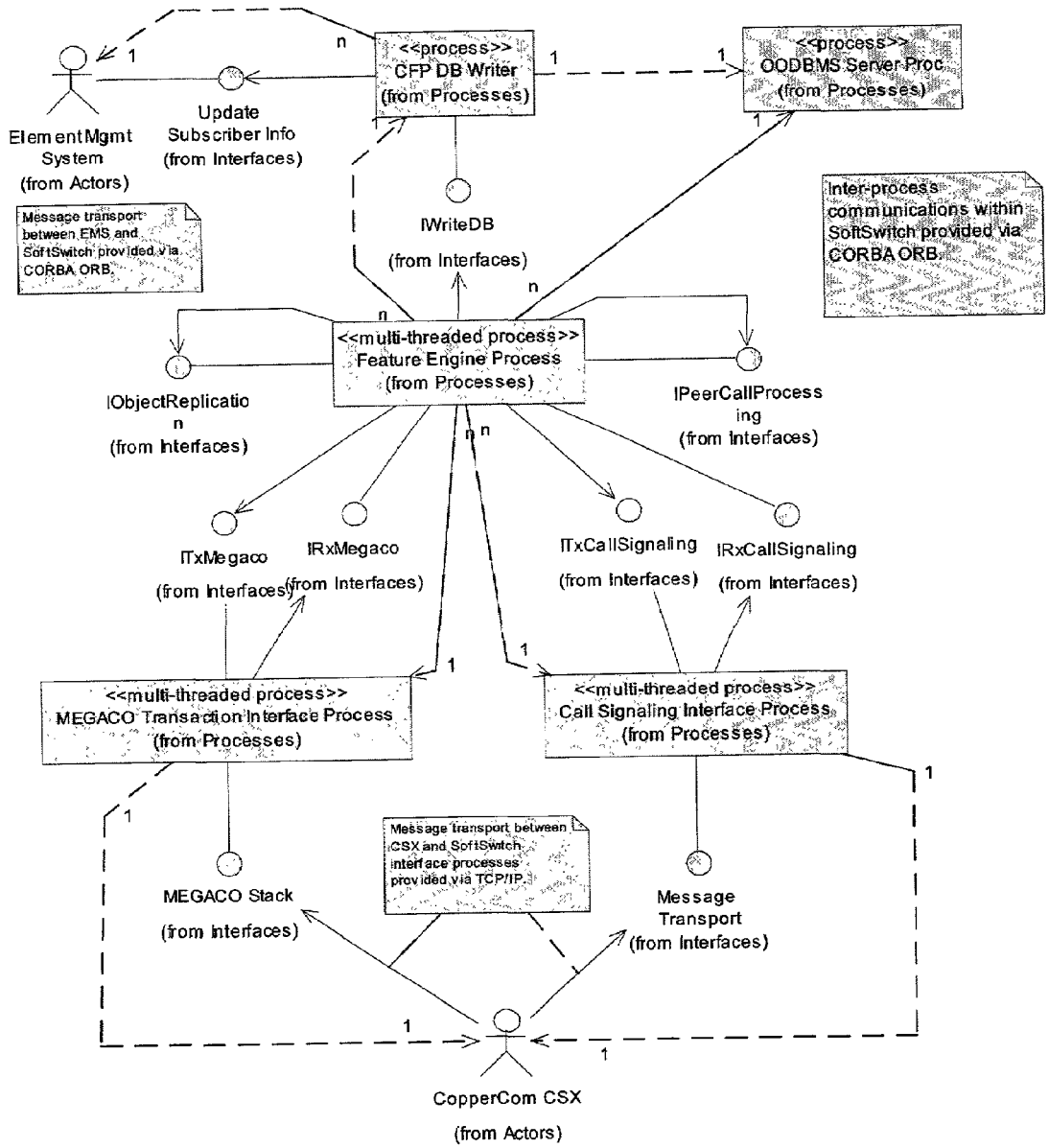

FIG. 58 schematically illustrates selected processes and their interactions in a system of the invention. The interprocess communications can be provided by Corba orb, particularly within a TSP node. In addition, message transport between element management system (EMS) and a TSP node can also be provided by Corba orb.

Figure 59:
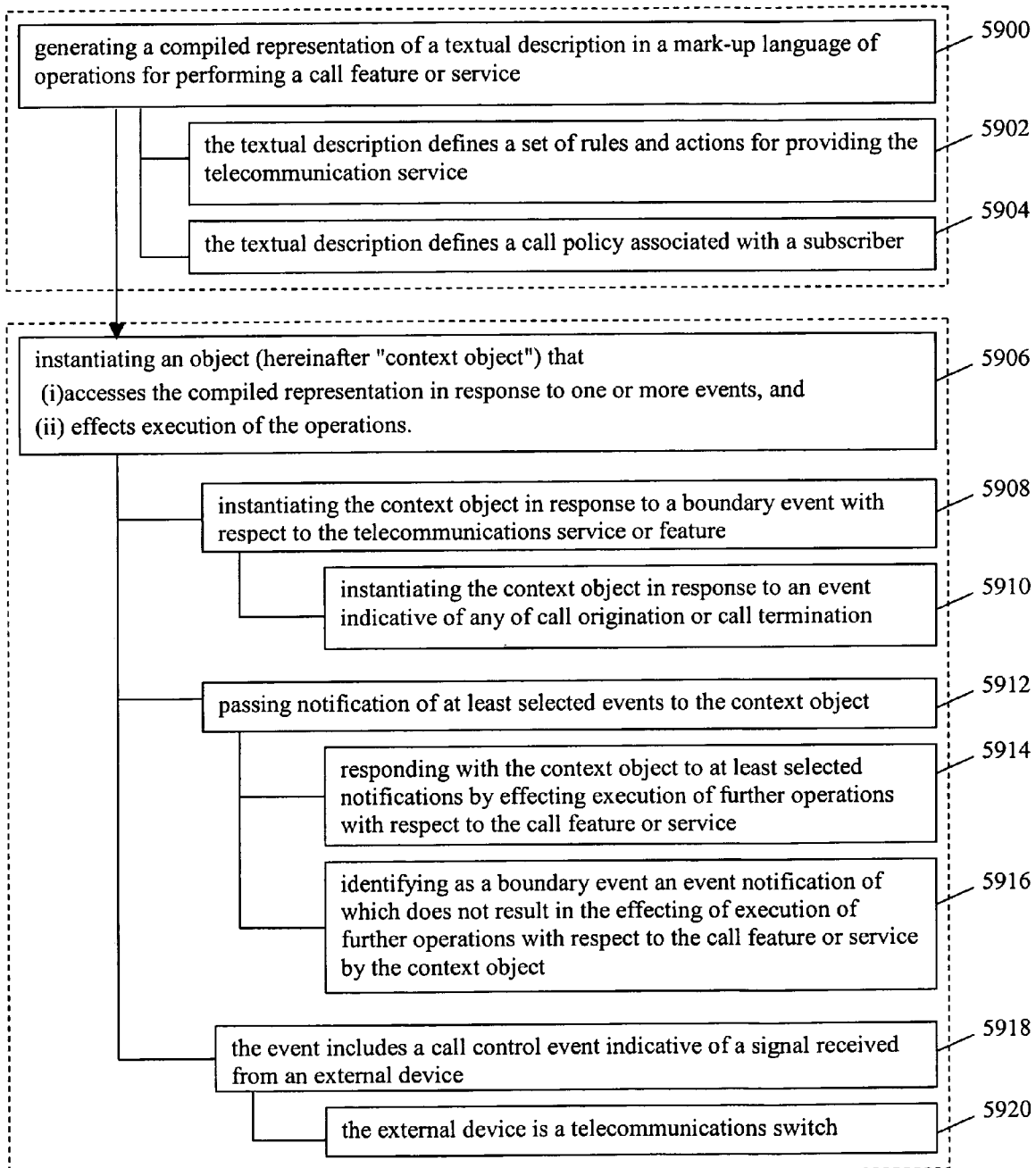
FIG. 59 illustrates a flowchart for generating a compiled representation of a textual description in a mark-up language of operations for performing a call feature of service, and instantiating a context object.

FIG. 59 illustrates a method for providing telecommunication services that includes generating a compiled representation of a textual description in a mark-up language of operations for performing a call feature or service 5900. The textual description defines a set of rules and actions for providing the telecommunication service 5902, and can include the definition of a call policy associated with a subscriber 5904. The method includes instantiating a context object 5906 that accesses the compiled representation in response to one or more events, and effects execution of the operations. The context object can be instantiated in response to a boundary event with respect to the telecommunications service or feature 5908, such as an event indicative of any of call origination or call termination 5910. Notification is passed to the context object of at least selected events 5912. The context object can respond to at least selected notifications by effecting execution of further operations with respect to that call feature of service 5914. The method also includes identifying as a boundary event an event notification of which does not result in the effecting of execution of further operations with respect to the call feature or service by the context object 5916. With regard to step 5906, the events can include a call control event indicative of a signal received from an external device 5918, which can include a telecommunications switch 5920.

Figure 60:
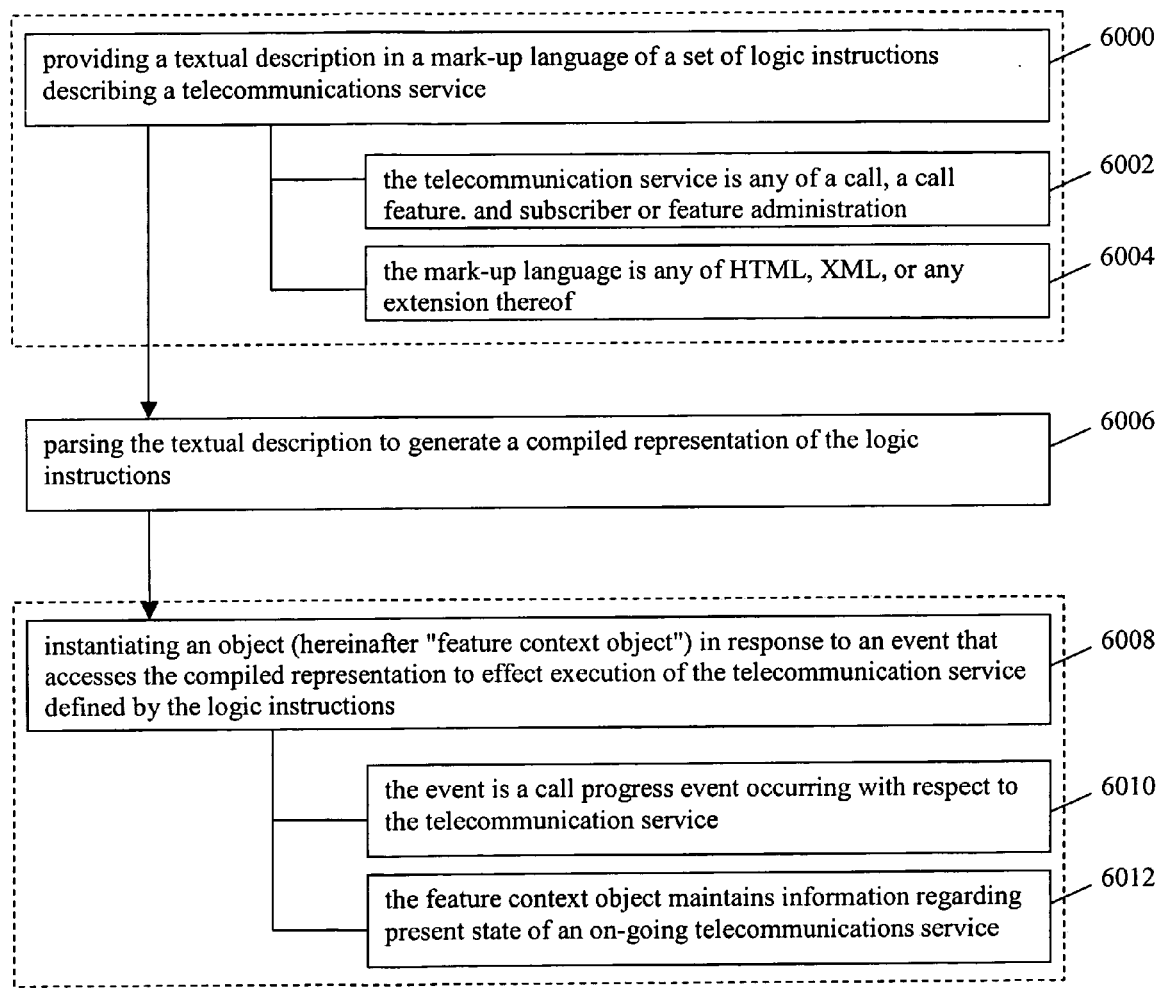
FIG. 60 illustrates a flowchart for providing a textual description in a mark-up language of a set of logic instructions describing a telecommunications service, parsing the textual description to generate a compiled representation of the logic instructions, and instantiating a feature context object.

FIG. 60 illustrates a method for providing telecommunication services that includes providing a textual description in a mark-up language of a set of logic instructions describing a telecommunication service 6000. The telecommunications service can be any of a call, call feature, and subscriber of feature administration 6002, and the mark-up language can be any of HTML, XML, or any extension thereof 6004. The method further includes parsing the textual description to generate a compiled representation of the logic instructions 6006, and instantiating a feature context object in response to an event that accesses the compiled representation to effect execution of the telecommunications service defined by the logic instructions 6008. The event can be a call progress event occurring with respect to the telecommunication service 6010. The feature context object can maintain information regarding the present state of an on-going telecommunications service 6012.

FIG. 61 illustrates a method for providing telecommunication services that includes a call control module that controls a call processing context associated with a subscriber 6100. A call feature module is in communication with the call control module 6102. The feature control module access a compiled representation of textual description in a mark-up language of logic defining a telecommunication service provided to a subscriber in response to an event to effect execution of the service. The event can be a call progress event provided by the call control module in response to a signal received with respect to status of an on-going telecommunication service 6104. The on-going telecommunication service can be an active telephone call 6106. An external device can generate the signal with respect to the statue of the on-going telecommunication service 6108, and the external device can be a telecommunication switch 6110. The call feature module instantiates a feature context object that accesses the compiled representation to determine at least an action to be effected for providing the telecommunication service 6112. A parser can receive the textual description of the logic defining a telecommunication service and can generate a compiled representation thereof 6114, and the telecommunication service can be any of a call, a call feature, and a subscriber or feature administration 6116. The compiled representation can include objects in a C++ programming environment 6118.

The following text provides further details regarding the method and system of the invention.

Class 5 Feature List

This text provides an exemplary list of class 5 features that a TSP system of the invention can implement.
1. Basic 911 Service
2. CALEA/Wire Tap (future release)
3. 800 Number Service (800NS)
4. 900 Number Blocking
5. Abbreviated Dialing (future release)
6. Advance Do Not Disturb (ADND)

7. Automatic Callback (AC)
8. Automatic Recall (AR)
9. Call Forwarding Busy Line (CFBL)
10. Call Forwarding Don't Answer (CFDA)
11. Call Forwarding Variable (CFV)
12. Calling Number Delivery (CNT))
13. Calling Number Delivery Blocking (CNT)B)
14. Calling NAMe delivery (CNAM)
15. Call Transfer (CT)
16. Call Waiting (CW)
17. Cancel Call Waiting (CCW)
18. Denied Origination
19. Denied Termination
20. Distinctive Ringing/Call Waiting (DR/CW)
21. Do Not Disturb (DND)
22. Intercept treatment—announcement and tone
23. Local Number Portability (LNP)
24. Message Waiting Indication (MWI)—not supported in the initial release, no plan for voice mail feature.
25. Multi-line hunt group
26. Multi-PIC
27. Operator Service
28. Selective Call Forwarding (SCF)
29. Selective Call Reject (SCR)
30. Series Completion
31. Speed Calling (SC)
32. Three-Way Call
33. Toll Restriction
34. Un-identified Call Reject (UCR)

Feature Analysis

This text provides a brief description of the a number of services listed in the section above entitled CLASS 5 Feature List. The descriptions are extracted from Belcore LSSGR.

| Feature Name | Abbreviation | FSD | Access Code | Availability |
|---|---|---|---|---|
| 800 Service | INWATS | 02-01-0020 | n/a | all |

Extracted from LSSGR—begin

This feature is a terminating-only service that allows a subscriber to receive message calls originating within specified service areas, with the call charges billed to the called party instead of the calling party.

The service is provided to one or more dedicated access lines.

The 800 service billing information and appropriate service measurements are registered by the Automatic Message Accounting (AMA) recording arrangement serving the terminating exchange. When the billing arrangement used by the switching system is via a "connection to Centralized Automatic Message Accounting (CAMA) offices" (55-01-0300), the 800 service billing information is recorded on auxiliary equipment separate from the CAMA billing arrangement.

Extracted from LSSGR- end

| | |
|---|---|
| Event: | 800NS (DialComplete + dialed number is prefixed with 800)<br>Seizure |
| Action: | 800NS<br>Initiate an 800 service TCAP query and starts a timer<br>When receiving a successful TCAP response, return the billing DN and routing DN and terminate the feature<br>When receiving a failed TCAP response, provide the instruction for intercept treatment and terminate the feature<br>If the TCAP query timer expires before a response is received, provide the instruction for intercept treatment and terminate the feature<br>Seizure<br>Generate AMA record if the access line is of type INWATS |
| Interaction: | INWATS-AR<br>Activation of AR is not allowed on INWATS line. |

| Feature Name | Abbreviation | FSD | Access Code | Availability |
|---|---|---|---|---|
| 911 | 911 | 15-01-0000 | n/a | all |

Extracted from LSSGR—begin

The basic 911 emergency service feature provides a 3-digit universal telephone number (911) that gives the public direct access to an emergency service bureau, usually without charge to the calling subscriber. The emergency service is one-way only, terminating to the service bureau. The emergency service bureau is usually located Within a police department, although in some communities it is located in a fire department or in an independent agency serving as a communications center. A given local switching system should serve no more than one emergency service bureau.

When the originating line and the emergency service bureau are served by the same switching system, the bureau has the capability of holding and disconnecting the connection and monitoring the supervisory state, and ringing the originating station back.

When the local switching system is in an area with expanded emergency service (E911) served through a tandem switch, the emergency call is advanced to the tandem switch with calling line ANI.

After the attendant answers a line originated call and the conversation path is established, the calling line should not be released even if the disconnect signal is received from the calling, until a disconnect signal is received from the service bureau. It is also desirable to release the call after approximately 45 minutes have elapsed since the caller disconnect signal has been received. This time-out period begins again on receipt of an emergency ring back request from the operator (optional service). On time-out, the calling line should be idled, reorder tone should be applied to the service bureau and a message printed to inform telephone company personnel of the condition.

A disconnect signal from the service bureau should result in a forced-disconnect of an established connection at any time, independent of the calling line status. Forced-disconnect should occur immediately on detection of a valid disconnect signal from the service bureau for both line and trunk originated calls.

On trunk originated 911 calls, an on-hook signal should be sent toward the calling end. Normal called party timed disconnect in the originating office should then release the trunk portion of the connection.

| Extracted from LSSGR - end |
| --- |

Event: 911 (DialComplete + dialed string =='911')
Action: Enable the localRelease event
Enable the remoteRelease event
When the localRelease event is detected, apply ring signal on the originator local loop and start a 45-minute timer.
Upon expiration of the 45-minute timer, release the call.
When the remoteRelease event from the 911 operator is received, cancel the timer, disable the localRelease and remoteRelease events, and terminate the 911 feature.
Interaction: 911 - 4_ and 8_ party line
On ringback, all parties should be rung, interleaved, until someone answers.
911-DOS (Denied Originating Service)
If these two features are allowed to be assigned to the same line, DOS should take precedence.
911-DTS (Denied Terminating Service)
Ringback should be performed when requested by the service bureau.
911-Code Restriction and Diversion
911 should not be screened out, so a line with code restriction can always call 911.
911-Series Completion
The switching system should not be able to series complete to 911.
911-CFBL
CFBL forwarded DN cannot be 911.
911-CFDA
CFDA forwarded DN cannot be 911.
911-CFV
CFV forwarded DN cannot be 911.
911-Make Busy Key
Ringback should be performed regardless of the make busy condition.
911-CW
During a call to 911 attendants, CW is inhibited.
911-TWC (including usage sensitive TWC)
During a call to 911 attendants, TWC cannot be used.
In a normal 2-way call, a TWC subscriber places the call on consultation hold and initiates a 911 call. It is desirable that the TWC subscriber can flash once to establish a TWC connection. All subsequent flashes should be ignored.

Design note: 911 FLO should handle all call progress events so that it can control the handling of these events.

| Feature Name | Abbreviation | FSD | Access Code | Availability |
| --- | --- | --- | --- | --- |
| Selective Call Rejection | SCR | 01-02-0760 | *60 or *80 | Subscription Usage |

Extracted from LSSGR—begin

Selective Call Rejection allows customers to block subsequent calls from a calling DN after receiving a harassing call. After receiving an undesired call, the customer dials a code that places the last calling party's DN on a list for rejection. Subsequent calls from the rejected party are intercepted and routed to an announcement. Selective call rejection also enables customers to enter additional DNs onto the list in a manner similar to selective call forwarding or VIP alert (01-02-1270). Calls from these parties are also intercepted and routed to a rejection announcement.

| Extracted from LSSGR - end |
| --- |

Event: Seizure
Action: Compare the calling number with the SCR list
Play the SCR announcement/tone and release the call if the calling DN is on the list
Continue the call termination treatment otherwise
Note: the administration of the SCR list is part of SLE, and therefore it uses the procedures defined for SLE.
Interaction: SCR takes precedence over other features at seizure event.
If a call is rejected due to the calling number is on the SCR list, all other features at seizure event are disabled.
SCR-AC
SCR customers can activate Automatic Callback (AC) to numbers on their SCR lists.
Ringback for such activations is never blocked; rather, it is given to the customer.
SCR-AR
An incoming call with calling number on SCR list will be rejected and the incoming memory slot will not be updated.
SCR-SCF
SCR overrides SCF.

| Feature Name | Abbreviation | FSD | Access Code | Availability |
| --- | --- | --- | --- | --- |
| 1.1.1.1 Do Not Disturb | DND | 01-92-0750 | | n/a |

Extracted from LSSGR—begin

The Do Not Disturb feature is activated/deactivated by the customer. It routes calls destined to the customer's DN either to a special do not disturb announcement or to a special tone. The announcement may return answer supervision. An option of the service provides that the calling party may dial a prearranged Personal Identification Number (PIN) while listening to the announcement/tone. The local switching system collects the DTMF digits and, if they correspond to the customer-specified number, the calling party will override the do not disturb function and receive normal terminating treatment. The customer may dial the activation code to enable this service, dial the deactivation code to disable the service, or dial the PIN change code to initially enter or modify the number.

| Extracted from LSSGR - end |
| --- |

Event: Seizure
Action: DND Meta-feature
Basic treatment -
Play the DND announcement and release the call
Advanced treatment -
Play the DND + collect PIN announcement/tone to prompt of user input
Collect digits
Allow the call to go through if the collected digits match the PIN
Reject the call otherwise
Interaction:

| Feature Name | Abbreviation | FSD | Access Code | Availability |
| --- | --- | --- | --- | --- |
| Cancel Call Waiting | CCW | 01-02-1204 | *70 | Subscription Usage |

Extracted from LSSGR—begin

Cancel call waiting is a feature that allows the customer with CW service to inhibit the operation of CW for one call. The customer dials the cancel call waiting code, obtains recall dial tone, and places a call normally. During this call, CW service should be inactive so that anyone calling the CW customer should receive the normal busy treatment, and no CW tones should interrupt the customer's call.

Extracted from LSSGR—end

| Extracted from LSSGR - end | |
|---|---|
| Event: | DialComplete |
| Action: | CCW Meta-feature |
| | At DialComplete detect CCW |
| | Remove CW FLO from busy event stack |
| | Enable local release event |
| | Upon detection of local release, |
| | place CW FLO back to busy event stack |
| | Terminate |
| Interaction: | CCW-TWC |
| | If the initiator of TWC hangs up with a party on hold, he/she should be rung back and connected to the held party on answer. If the initiator's CW was disabled prior to hanging up on the held party, it should remain disabled after the customer answers the ringback. |

| Feature Name | Abbreviation | FSD | Access Code | Availability |
|---|---|---|---|---|
| Call Waiting | CW | 01-02-1201 | | Subscription Usage |

Extracted from LSSGR—begin

CW is a feature whereby a line in the talking state is alerted by a call waiting tone when another call is attempting to complete to that line. The call waiting tone is only audible to the line with the CW feature activated. Audible ringing is returned to the originating line. The service also provides a hold feature that is activated by a switchhook flash. Consecutive flashes allow the custumer (with the service activated) to alternately talk to the original and the new calling party. If the customer with the service activated hangs up while one party is on hold, the customer with the service activated is automatically rung back, and upon answer is connected to the held party.

| Extracted from LSSGR - end | |
|---|---|
| Event: | Busy |
| Action: | Apply the call waiting tone |
| | Enable hookflash, localRelease, and remoteRelease events |
| | At hookflash event, swap the speech path to the other call leg |
| | At localRelease event, disconnect the remote talking party, apply ringing signal to the endpoint, and enable answer event. At the subsequent answer event, disable hookflash, localRelease, remoteRelease, and answer events, and terminate the feature. |
| | At remoteRelease event, swap the speech path to the other call leg if the release event is from talking party. And then disable hookflash, localRelease, and remoteRelease events. Finally terminate the feature. |

| -continued | |
|---|---|
| Extracted from LSSGR - end | |
| Interaction: | CW-SC (Series Completion) |
| | A new call terminated on a CW user, if there is only one existing call terminated on the user's line and the call is in talk stage, CW overrides SC. |
| | A new call terminated on a CW user, if there is only one existing call terminated on the user's line and the call is not in talk stage, SC overrides CW. |
| | A new call terminated on a CW user, if the user uses Make-Busy key to become busy, SC overrides CW. |
| | A new call terminated on a CW user, if there are more than one existing calls terminated on the user's line, SC overrides CW. |
| | CW-CFBL |
| | If a line has CW and CFBL, CW should take precedence, unless |
| | 1. the existing call is not in talk state |
| | 2. the Make-Busy key is used by the user to become busy |
| | 3. there are more than one calls on the line |
| | CW-CFDA |
| | CW and CFDA can be assigned to a line and be active simultaneously. |
| | When a line is busy and in talk state, an additional call is offered to the line, the call should be offered under CW and CFDA timer should be started. If the CFDA timer expires before the user answers, the additional call should be forwarded. |
| | CW-Make-Busy Key |
| | The Make-Busy key should take precedence over CW. If CFBL or Series Completion is also assigned to the line, see the interaction defined for these two features. |
| | CW-CCW |
| | CW and CCW should not be active simultaneously. |
| | CW-TWC |
| | If both features are assigned to a line, the flash after the call waiting tone should be treated as the request to initiate the TWC. Also if the party to whom the customer was talking hangs up and another is held, the flash should be recognized as a request to establish a talking connection with the held party. |
| | The initiator of TWC should not receive any CW treatment while in a TWC mode or while a party is on hold. |
| | When a user is in a TWC, but not the TWC initiator, CW overrides TWC. |
| | The additional call attempt should be treated using the CW treatment. |
| | CW-USTWC |
| | The initiator of TWC with USTWC activated should not receive Call Waiting (CW) calls. |
| | The other parties to TWC should be able to receive CW Calls. |
| | In flash interpretation, CW should take precedence over USTWC. |
| | CW-911 |
| | During a call to a 911 attendant, the CW feature should not take place. |
| | CW-Operator service |
| | CW should take precedence over operator recall when the system detects a flash after CW tone is applied to the connection. Subsequent flashes control CW; no operator recall should be allowed until a two-way connection is reestablished. |

This text provides an exemplary supplementary document type definition for CPML. It further provides examples of CPML+scripts for call control, and an example of an endpoints feature description in CPML+.

Supplementary Document Type Definition for CPML

```
<!ENTITY %  result      'result       (true|false)          "true"'>

<!ENTITY %  eventId                   'id     (OFFHOOK | ONHOOK |
    DIGITS|PROCEEDING|
    ALERT|ANSWER|LOCALRELEASE|
    REMOTERELEASE|
    ......)             #REQUIRED '>

<!ENTITY %  param       'param        (CDATA|none)
        "none"'>
<!ENTITY %  testMethod  'method       (testDNISPrefix|
        testDNISPostfix|
                                      testDNISSubString|
testCFBLActive|
                                      testCFDAActive|       ....)
                #REQUIRED'>
<!ENTITY %  execMethod  'method       (makeCall|
collectDigit|
                                      acceptCall|
answerCall|
                                      releaseCall
abortCall|
                                      applyTone|
collectDigits|
                                      playAnnouncement|    ....)
                #REQUIRED'>

<!ELEMENT   script                    (state+)>
<! ATTLIST  script                    id      (CDATA)       #REQUIRED
billingId       (CDATA)       "none">
```

```
<!ELEMENT    state                (event+) >
<! ATTLIST   state                id              (CDATA)       #REQUIRED>

<!ELEMENT    event                (do*)>
<!ATTLIST    event                %eventId;
billingId           (CDATA)       "none">

<!ELEMENT    do                   (test?, (execute|link)+, nextState?)>
<!ELEMENT    test>
<!ATTLIST    test                 %testMethod;
                                  %param;
                       %result;>

<!ELEMENT    execute>
<!ATTLIST    execute                    %execMethod;
                                  %param;
billingId           (CDATA)       "none">

<!ELEMENT    nextState>
<! ATTLIST   nextState            id              (CDATA)       #REQUIRED>

<!ELEMENT    loadScript>
<! ATTLIST   loadScript           target          (CDATA)       #REQUIRED
data         event|none) "none">

<!ELEMENT    userProfile          (event+)>
<! ATTLIST   userProfile          name            (CDATA)       #REQUIRED
uid          (CDATA|none)         #REQUIRED
group        (CDATA|none)         "none"
system              (CDATA)       #REQUIRED>
```

Examples of Call Control CPML+ scripts

```
<script id="CallControlScript">

< -- This script has one single state />

<state id="idle">

<event id="offhook">
      <do>
      <loadScript target=" OriginationScript" data=event/>
      </do>
    </event>

<event id="seizure">
      <do>
      <loadScript target="TerminationScript" data=event/>
      </do>
    </event>

</state>

</script>

<script id="OriginationScript">

< -- Implements Origination Basic Call Model />

<state id="idle">

<event id="offhook">
      <do>
      <execute method="timeStampOffhook" param="none"/>
      <execute method="processOffhookEvent" param="none"/>
      </do>
      <do>
      <test method="testDNISReceived" param="none" result="true"/>
      <execute method="routeCall">
```

```xml
      <nextState id="awaitAnswer "/>
    </do>

</event>

</state>

<state id=" awaitAnswer">

<event id="remoteAnswer">
    <do>
    <execute method="timeStampRemoteAnswer" param="none"/>
    <execute method="connectSpeechPath" param="none"/>
    <nextState id="connect "/>
    </do>
  </event>

<event id="release">
    <do>
    <execute method="timeStampRelease" param="none"/>
    <nextState id="_terminate"/>
    </do>
   </event>

</state>

<state id="connect">

<event id="release">
      <do>
      <execute method="timeStampRelease" param="none"/>
      <execute method="releaseRemoteParty" param="none"/>
      <execute method="disconnectSpeechPath" param="none"/>
<nextState id="_terminate"/>
      </do>
    </event>

<event id="remoteRelease">
```

```
    <do>
        <execute method="timeStampRelease" param="none"/>
        <execute method="localRelease" param="none"/>
        <execute method="disconnectSpeechPath" param="none"/>
<nextState id="_terminate"/>
        </do>
    </event>

</state>

</script>
```

*An example of an endpoint's feature subscription in CPML+*

```
< -- CPML for subscriber Simon St. Laurent - with  Message Waiting,
Call Forwarding Don't Answer and Call Waiting  features />

<useProfile name="Simon St.  Laurent"
uid="abcd-1234-gbdc-4566-143333"
group="St.  Laurent Family"
system="LATA101-Area2">
    <event id=offhook>
        <do>
            <execute method="incrementOffhookCount">
        </do>
        <do>
            <test method="isMessageWaiting" result="true"/>   ←We can use
else structure here
            <execute method="applyTone" param="stutterTone">
            <nextState id="_terminate"/>
        </do>
        <do>
            <test method="isMessageWaiting" result="false"/>
            <execute method="applyTone" param="dialTone">
            <nextState id="_terminate"/>
        </do>
    </event>

<event id=911Event>
```

```
    <do>
     <execute method="runFSM" param="911FSM">
     <nextState id="_terminate"/>
    </do>
  </event>

<event id=dialComplete>
    <do>
       <test method="is800Dialed" result="true"/>
       <execute method="runFSM" param="800FSM">
       <nextState id="_terminate"/>
    </do>
    <do>
       <test method="is900Dialed" result="true"/>
       <execute method="releaseCall" param="900 number blocked">
       <nextState id="_terminate"/>
    </do>
    <do>
       <test method="isCFDAActivationDialed" result="true"/>
       <execute method="runFSM" param="CFDAActivationFSM">
       <nextState id="_terminate"/>
    </do>
    <do>
       <test method="isCFDADeactivationDialed" result="true"/>
       <execute method="runFSM" param="CFDADeactivationFSM">
       <nextState id="_terminate"/>
    </do>
  </event>

<event id=CFDA_Timer>
    <do>
       <execute method="routeCall" param="5551212">
       <nextState id="_terminate"/>
    </do>
  </event>

<event id=busy>
    <do>
```

```
            <execute method="runFSM" param="CWFSM">
            <nextState id="_terminate"/>
        </do>
    </event>
</useProfile>
```

Figure 34:
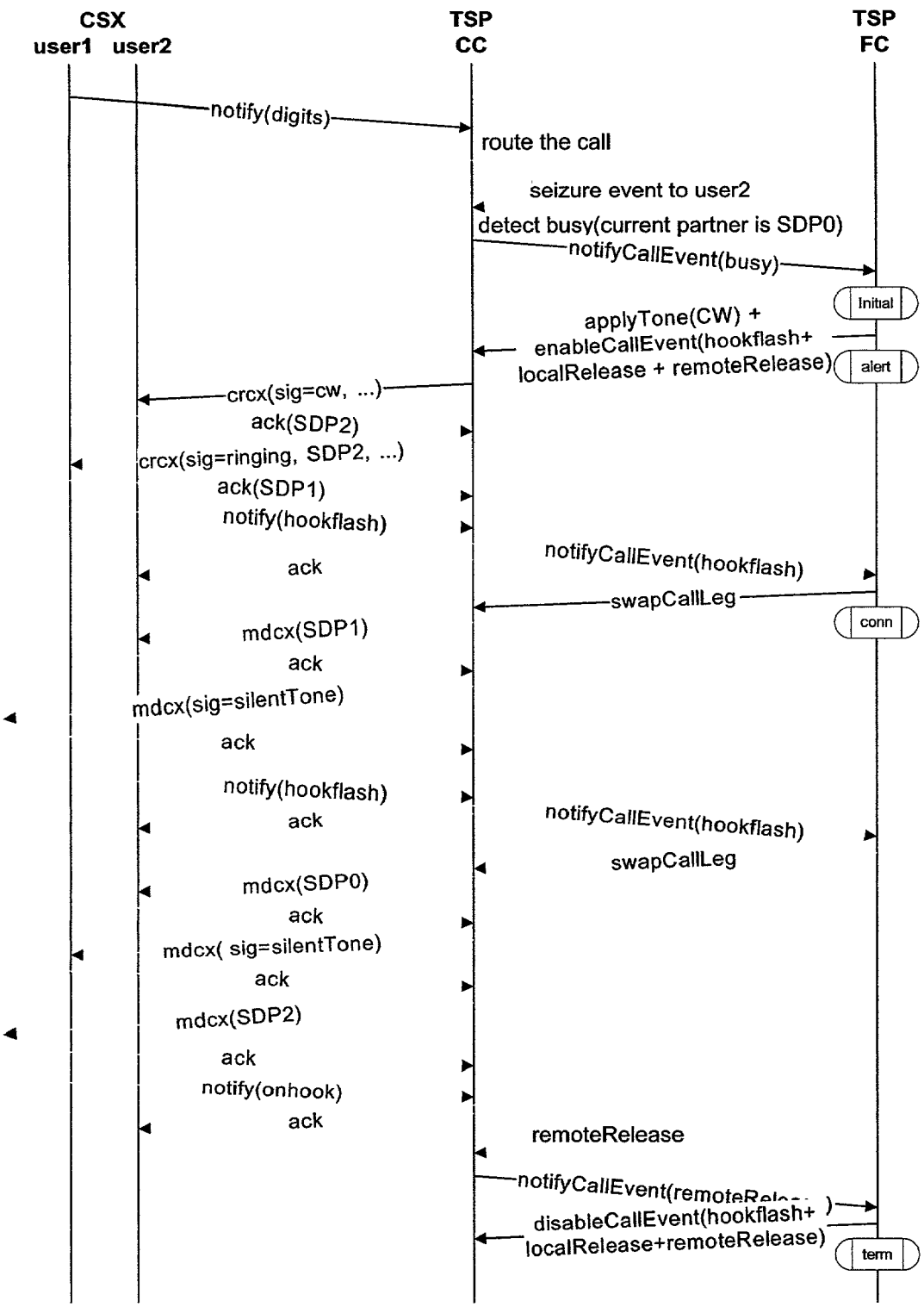
FIGS. 34 and 35 depict a state machine for a call waiting feature provided a system according to the teachings of the invention.

This text presents call waiting CPLM+scripts, and a call waiting logic that can be better understood with reference to FIG. 34.

Example of Call Waiting CPML+ scripts

```
<script id="CallWaitingFeature">

<state id="Initial">

<event id="busy">
      <do>
      <execute method="incrementCallWaitingAttempt" param="none"/>
      <execute method="applyTone" param="CW"/>
      <execute method="enableCallEvent" param="hookflash, localRelease, remoteRelease"/>
                <execute method="setFirstCallLegHandle" param="none"/>
      <execute method="setFirstCallLegActive" param="none"/>
<nextState id="Alert"/>
      </do>
    </event>

</state>

< state id="Alert">

<event id="hookflash">
      <do>
      <execute method="setSecondCallLegHandle" param="none"/>
<execute method="swapToSecondCallLeg" param="none"/>
            <execute method="setSecondCallLegActive" param="none"/>
            <nextState id="Conn"/>
      </do>
    </event>

<event id="localRelease">
      <do>
```

```xml
        <execute method="disableCallEvent" param="hookflash,
localRelease, remoteRelease"/>
            <nextState id="_terminate"/>
      </do>
    </event>

<event id="remoteRelease">
      <do>
        <execute method="disableCallEvent" param="hookflash,
localRelease, remoteRelease"/>
            <nextState id="_terminate"/>
      </do>
    </event>

</state>

< state id="Conn">

<event id="hookflash">
      <do>
        <test method="isFirstCallLegActive" result="true"/>
<execute method="swapToSecondCallLeg" param="none"/>
            <execute method="setSecondCallLegActive" param="none"/>
      </do>
      <do>
        <test method="isSecondCallLegActive" result="true"/>
<execute method="swapToFirstCallLeg" param="none"/>
            <execute method="setFirstCallLegActive" param="none"/>
      </do>
    </event>

<event id="localRelease">
      <do>
        <execute method="releaseRemoteTalkingParty" param="none"/>
        <execute method="enableCallEvent" param="offhook"/>
            <nextState id="Rung"/>
      </do>
    </event>
```

```xml
<event id="remoteRelease">
  <do>
  <test method="isReleasingPartyTalking" result="true"/>
<execute method="connectToHeldParty" param="none"/>
  </do>
  <do>
  <execute method="disableCallEvent" param="hookflash, localRelease, remoteRelease"/>
    <nextState id="_terminate"/>
  </do>
  </event>

</state>

<state id="Rung">

<event id="offhook">
  <do>
  <execute method="disableCallEvent" param="hookflash, localRelease, remoteRelease,
   offhook"/>
<nextState id="_terminate"/>
  </do>
  </event>

</state>

</script>
```

```
(CallWaitingLogic
        //Initial state
        (Initial    (    busy
(       ()      //predicate
(       //method
                            incrementCallWaitingAttempt();
    setFirstCallLegHandle()
    setFirstCallLegActive()
    applyTone(cwTone)
                            enableCallEvent(hookflash, localRelease,
remoteRelease)
)
                            (Alert)    //next state
                    )
                    )
        ) //end of Initial state //Alert state
        (Alert    (    hookflash
(       ()      //predicate
(       //method
    setSecondCallLegHandle()
    swapToSecondCallLeg()
    setSecondCallLegActive()
)
                            (Conn)        //next state
                    )
                    )
                    (    localRelease
(       ()      //predicate
(       //method
                            disableCallEvent(hookflash, localRelease,
remoteRelease)
)
                            (_terminate)    //next state
                    )
```

```
                          )
                    (        remoteRelease
(       ()    //predicate
(       //method
                          disableCallEvent(hookflash, localRelease,
remoteRelease)
)
                          (_terminate)     //next state
                    )
                    )
        ) //end of Alert state //Conn state
        (Conn      (    hookflash
(       (isFirstCallLegActive())    //predicate
(       //method
        swapToSecondCallLeg()
        setSecondCallLegActive()
)
                          (Conn)       //next state
                    )
(       (isSecondCallLegActive())   //predicate
(       //method
        swapToFirstCallLeg()
        setFirstCallLegActive()
)
                          (Conn)       //next state
                    )
                    )
                    (    localRelease
(       ()     //predicate
(       //method
                          releaseRemoteTalkingParty()
                          enableCallEvent(offhook)
)
                          (Rung)       //next state
                    )
                    )
```

```
                        (       remoteRelease
(       (isReleasingPartyInTalk())    //predicate
(       //method
                                connectToHeldParty()
)
                                ()      //next state
                        )
(       ()                              //predicate
(       //method
                                disableCallEvent(hookflash, localRelease,
remoteRelease)
)
                                (_terminate)     //next state
                        )
                    )
            ) //end of Conn state //Rung state
        (Rung        (       offhook
(       ()     //predicate
(       //method
                                disableCallEvent(hookflash, localRelease,
remoteRelease,
  offhook)
)
                                (_terminate)     //next state
                        )
                    )
            ) //end of Rung state )   //end of CallWaitingLogic
```

TMN Compliance

Telephone service providers, e.g., CLEC and ILEC, use many Operations Systems (OSs) to provide centralized support for the maintenance and administration of the telephony network equipment. More often than not, the network equipment are obtained from different vendors all over the world. Thus, the tasks of incorporating heterogeneous network equipment and providing seamless end-to-end services to customers have become very challenging. Telecommunications Managed Network (TMN) recommendations are defined by TLU in the M.3000 series to provide a framework for a standardized mechanism to manage the networks. TMN enables the service providers to achieve interoperability across all managed networks over heterogeneous network equipment.

In the TMN architecture, a Network Element (NE) contains manageable information of a network equipment that is monitored and controlled by an OS. In order to be managed within the scope of TMN, an NE must have a standard TMN interface, which is the Common Management Information Protocol (CMIP). If an NE does not have a standard interface, the NE can still be managed via a Q-Adapter. Currently two Q-adapters are supported; TL1 Q-adapter and SNMP Q-adapter.

SNMPv3 has been chosen as the network management protocol for TSP and CSX, which renders the TSP/CSX system a TMN manageable network equipment. SNMPv3 offers the acknowledgement mechanism to the message originator, which is required in the TMN architecture.

Figure 35:
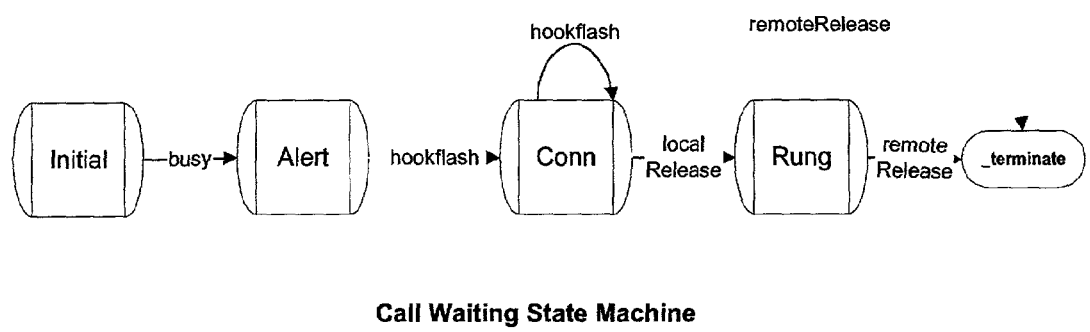

With reference to FIG. 35, TMN comprises layers of building blocks that provide overall epitome of the management issues and functions of TMN. TMN includes a network element layer, an element management layer, a network management layer, a service management layer, and a business management layer.

The network element layer presents the manageable information that is managed and controlled by OSs. The MIBs of TSP/CSX, the SNMP proxy agent on TSP, and the SNMP Q-adapter reside in this layer. Through the SNMP Q-adapter, TSP and CSX are TMN enabled. TSP/CSX will be SNMPv3 compliant.

The element management layer manages one or multiple NEs. This layer deals with, for example, the configuration data, logs, statistics of one or multiple network elements. The Network Management System (NMS) in TSP provides the functions of this layer. In some embodiments, however, the element management layer will not be TMN conformant. That is, it does not provide Q3 interface to communicate with the network element layer and network management layer. NMS is the tool to provision the operation and support of TSP/CSX.

The network management layer has the managed view of the entire network. It coordinates all network activities and supports the service management layer functions via Q3 interface.

The service management layer utilizes information presented by network management layer to manage contracted service to existing and potential customers. This is the basic point of contact with customers for provisioning, accounts, quality of service, and fault management. It is also the key point for interactions with service providers and other administration domains. This layer communicates with the network element layer and element management layer via Q3 interface.

The business management layer includes high-level planning, budgeting, goal selling, executive decisions, business level agreements, etc.

This text provides an example of a reference lexical structure for defining a state machine.

```
<!--
================================================================================================
Element    : LOGIC
Summary    : A logic represents either a state machine or a rules machine structure.

This element exist to let us handle both state and rules machines in the same fasion.

A rules set specification defines the behavior of a stateless logic.

A finite state machine specification defines the behavior of state-full logic
        elements.
-->
<!ELEMENT LOGIC ( FSM ) >
<!ATTLIST LOGIC Name NMTOKEN #REQUIRED >

<!--
================================================================================================
  Element    : FSM (Finite State Machine)

Summary    : The State Machine is composed of a collection of states.
These states specify behavior
             that defines the state machine.  The state machine CPML element has an attribute
             of the initial state for this machine.

Validation : The inital state attribute shall be validated against the child elements of
             FSM to make sure that the initial state is defined.
-->
<!ELEMENT FSM ( (STATE+, END_STATE*) ) >
<!ATTLIST FSM InitState NMTOKEN #REQUIRED >

<!--
================================================================================================
  Element    : STATE Summary    : A State is composed of a collection of transitions.  Each state element has a
             name attribute which is used to identify the state.
```

Example   : This is an example of a state with the logical name Initial.

<STATE Name="Initial">
-->
<!ELEMENT STATE ( TRANSITION+ ) >
<!ATTLIST STATE Name NMTOKEN #REQUIRED >

<!--
================================================================================================
   Element   : END_STATE Summary   : An end state is a state that has no transitions.  Each state element has a
               name attribute which is used to identify the state.

Example   : This is an example of a end state.

<END_STATE Name="Stop">
-->
<!ELEMENT END_STATE EMPTY >
<!ATTLIST END_STATE Name NMTOKEN #REQUIRED >

<!--
================================================================================================
   Element: TRANSITION Summary: A transition belongs to a state.  These are the pathways out of that state, given
            an event.  If we get an event we will take the transition associated with that event
            from the current state to another state.  A transition has a set of sequences. Once
            a sequence is able to execute successfully we will stop testing the other sequences,
            and will transition to the next state defined by that sequence.

Example: If we are in the "S1" state and we get an event "OneBit" that event will trigger the
            execution of the transition associated with that event. Once the transition is executed
            the behavior ("Actions") associated with that transition will be executed.

<STATE Name="S1">
                <TRANSITION Name="T1_1" Event="OneBit">
                    <FSMSEQUENCE NextState="Odd">

Validation: The Event name shall be validated against a list of known events.
-->
<!ELEMENT TRANSITION ( FSMSEQUENCE+ ) >
<!ATTLIST TRANSITION Name NMTOKEN #REQUIRED >

```
<!ATTLIST TRANSITION Event NMTOKEN #REQUIRED >

<!--
================================================================================
=========================
  Element: FSMSEQUENCE Summary: A sequence is the set of all possible actions for the current
event.
          An optional predicate or guard condition is used to distinquish
between
          the different sequences.

The predicate refers to a method that yields a boolean "true"
or "false" result.
          The predicate sequence shall be executed until the first one
fails. In other words
          the results of the predicates are anded together.

If all of the predicates returned true we will execute the
sequence. Otherwise
          we will continue going through the sequences until we find one
that is successful.

A sequence with no predicate guards is always executed, and any
remaining sequences
          are never invoked.

The predicates function like other actions they will invoke a
method on the current
          focal point.

The sequence has an attribute that corresponds to the name of
the next state.

Validation: Predicate methods shall be validated against the core
object model specification.
              The sequences next state attribute will be validated
against the specified
              state names.

Example:  In this example the sequence does not have any predicates.
So it will execute
            the current sequence.  If all of the actions are successful we
will transition to
            the state named "Odd".

<FSMSEQUENCE NextState="Odd">
                  <ACTIONS/>

Example 2: This is a place holder for an example that makes use of
predicates.  Currently predicates are
             not implemented in our prototype, so they have not been
included yet...
-->
```

```
<!ELEMENT FSMSEQUENCE ( PREDICATES?, ACTIONS+ ) >
<!ATTLIST FSMSEQUENCE NextState NMTOKEN #REQUIRED >

<!--
================================================================
=========================
  Element: ACTIONS
  Summary: An Action is a container for all of the actions that are
associated with this sequence.
          The set of actions is what gives a sequence its behavior.

It can contain any type of action.

A transform or a call action has to be the last element in
the actions sequence.

Example: In the below example you can see how the actions are
structured.
            <FSMSEQUENCE NEXTSTATE="Odd">
               <ACTIONS>
                  <STR_ASSOCIATION FocalPoint="ParityChecker"/>
                  <ACTION NAME="print1BitAction"/>
                  <ACTION NAME="printOddAction"/>
               </ACTIONS>
            </FSMSEQUENCE>

ACTIONS ( ACCESSOR | ACTION | ASSOCIATION | STR_ASSOCIATION |
TRANFORMATION | CALL_ACTION | LITERAL)*

-->
<!ELEMENT ACTIONS ( (ACCESSOR | ACTION | ASSOCIATION | STR_ASSOCIATION |
LITERAL)* |
                   ((ACCESSOR | ACTION | ASSOCIATION | STR_ASSOCIATION |
LITERAL)*,
                    (TRANSFORMATION | CALL_ACTION) )) >

<!--
================================================================
=========================

Element: PREDICATES

Summary: An Action is a container for all of the actions that are
associated with this sequence.

Example: In the below example you can see how the actions are
structured.

PREDICATES ( ACCESSOR | ACTION | ASSOCIATION | STR_ASSOCIATION |
TRANFORMATION | CALL_ACTION | LITERAL)*
```

```
-->

<!ELEMENT PREDICATES ( (ACCESSOR | ACTION | ASSOCIATION |
STR_ASSOCIATION | LITERAL)* ) >
```

```
<!--
================================================================================
===========================
   Element: ACTION Summary: An Action represents a small atomic piece of behavior.  The
name attribute on action
          refers to a method on the current focal point.  The focal
point is the object that
          the actions are called on.  When the action is executed it
will call the
          corresponding method on its focal point.

Validation: Action names shall be validated against the core object
model specification, to
          verify that the method exists.

Example:
          In the below example,  we will call the apply dial tone method
on the current
          focal point of the engine.  In this case the current focal
point will have a
          method that applies the dial tone.

<ACTION Name="applyDialTone"/>
ELEMENT ACTION EMPTY
-->
<!ELEMENT ACTION ( ACCESSOR | ACTION | ASSOCIATION | STR_ASSOCIATION |
LITERAL)* >
<!ATTLIST ACTION Name NMTOKEN #REQUIRED >
```

```
<!--
================================================================================
===========================
   Element: ACCESSOR Summary: An ACCESSOR I think is a remanent now.  All actions are able
to pass parameters
          back and forth.  Currently it is just treated like other
actions.

Example:
          In the below example,  we will call the apply dial tone method
on the current
          focal point of the engine.  In this case the current focal
point will have a
``` method that applies the dial tone.

```
<ACTIONS>
    <ACCESSOR Name="getDialTone"/>
```

Validation: Accessor names shall be validated against the core object model specification, to
    verify that the method exists.
-->
<!ELEMENT ACCESSOR EMPTY >
<!ATTLIST ACCESSOR Name NMTOKEN #REQUIRED >

<!--
================================================================================================
  Element: ASSOCIATION Summary: An association will move the focal point ( see Action ), to a new location.
        The name of the element will correspond to a method on the current focal point.
        It will move the focal point to the result of that method.

Validation: Association names shall be validated against the core object model specification,
        to verify that the method exists.

Example:
        In the below example, we will call the getTerminal method on the current focal point.
        We will then set the focal point of engine, to the returned value. In this case the
        current focal point will have a method that gets the terminal.

```
<ACTIONS>
    <ASSOCIATION Name="getTerminal"/>
```
-->
<!ELEMENT ASSOCIATION EMPTY >
<!ATTLIST ASSOCIATION Name NMTOKEN #REQUIRED >

<!--
================================================================================================
  Element: STR_ASSOCIATION Summary: This kind of string association is used for testing. It will eventually be removed.
        I can pass in the name of the new focal point ( see Action ), that will be looked
        up instead of having to call a method to get the new focal point and then set it.

The name of the element will correspond to a method on the current focal point.
        It will move the focal point to the result of that method.

Example:
    In the below example, we will set the focal point to the focal point associated with the
    name "Dialog Box".

<ACTIONS>
            <STR_ASSOCIATION FocalPoint="Dialog Box"/>

-->
<!ELEMENT STR_ASSOCIATION EMPTY >
<!ATTLIST STR_ASSOCIATION FocalPoint NMTOKEN #REQUIRED >

<!--
================================================================================
==========================
    Element: CALL_ACTION Summary: A Call Action represents a nested state machine.  When executed it will create a
        contexts that represents the state of that new state machine, and will begin executing
        on that new state machine.  The nested state machine will be a component state machine
        of the caller.  A state machine may composed of one or more nested state machines
            using the call action construct.  This lets us decompose our state machine into reusable
        simpler state machines.

When the nested state hits an end state it will return to the calling state machine
        where it will continue executing where it left off.

All return values from nested state machines will be able to pass information back
        and forth, using a parameter passing technique that is available to all actions.

Validation: The specified feature attribute (i.e. Nested State Machine) shall be a known feature.

Example:
        In the below example, we will call the state machine associated with the ParityChecker
        name.

<ACTIONS>
                <CALL_ACTION Feature="ParityChecker"/>
-->
<!ELEMENT CALL_ACTION EMPTY >
<!ATTLIST CALL_ACTION Feature NMTOKEN #REQUIRED >

<!--

```
===========================================================================
========================
  Element: TRANSFORMATION Summary: A Transformation Action will replace the current context's
state machine logic with
          another logic specified by the Feature attribute.  A context
represents the current
          state of a state machine.

Validation: The feature attribute shall be validated against known
features.

Example:
          In the below example,  we will be transforming our current
context into a
          Origination Terminal state machine.

<ACTIONS>
                   <TRANSFORMATION Feature="OrigTerm"/>
-->
<!ELEMENT TRANSFORMATION EMPTY >
<!ATTLIST TRANSFORMATION Feature NMTOKEN #REQUIRED >

<!--
===========================================================================
========================
  Element: LITERAL
  Summary: This is a constant value that is pushed on to the parameter
stack of the engine.

Example: A literal could be used in any action.  The startTimer action
takes two parameters,
          the number of seconds to set the timer for ( an integer ) and
an event to post when
          the timer goes off.

<ACTION Name="startTimer">
                       <LITERAL Name="IntLiteral" Value="3"/>
                       <LITERAL Name="EventLiteral" Value="Timeout"/>

-->
<!ELEMENT LITERAL EMPTY >
<!ATTLIST LITERAL Name NMTOKEN #REQUIRED >
<!ATTLIST LITERAL Value NMTOKEN #REQUIRED >
```

Described above are systems end methods meeting the desired goals. Those skilled in the art will, of course, appreciate the illustrated embodiment is merely and example of the invention and that modifications can be made thereto without departing from the scope of the invention. By way of non-limiting example, it will be appreciated that markup languages other than HTML, XML, CPML and so forth, as described above, may be utilized in practice of the invention. By way of further example, it will be appreciated that the methods and systems may be implemented with programming structures other than OOP objects.

what is claimed is:

1. A method for providing telecommunications services, the method comprising the steps of:

generating a compiled representation of a textual description in a mark-up language of operations for performing a call feature or a call service;

instantiating a feature object embodying the compiled representation;

instantiating a context object that maintains information regarding a present state of the call feature or service in response to a boundary event with respect to the call service or the call feature, the context object signaling the feature object in regard to events occurring with respect to the call feature or the call service, and the feature object responding to said signaling from the context object by effecting execution of one or more of the operations in the compiled representation of the textual description in the mark-up language, and passing notification of at least selected events to the context object, wherein the textual description defines a set of rules and actions for providing the call service, said rules and actions corresponding to a call policy associated with a subscriber.

2. The method according to claim 1, comprising instantiating the context object in response to a boundary event with respect to the call service or feature.

3. The method according to claim 2, comprising instantiating the context object in response to an event indicative of any of call origination or call termination.

4. The method according to claim 1, comprising passing notification of at least selected events to the context object.

5. The method according to claim 4, responding with the context object to at least selected notifications by effecting, via the feature object, execution of further operations with respect to the call feature or service.

6. The method according to claim 4, identifying as a boundary event an event notification of which does not result in the effecting of execution of further operations with respect to the call feature or service by the context object.

7. The method of claim 1, wherein the event includes a call control event indicative of a signal received from an external device.

8. The method of claim 7, wherein the external device is a telecommunications switch.

9. A method for providing telecommunications services, comprising the steps of:

providing a textual description in a mark-up language of a set of logic instructions describing a call service;

parsing the textual description to generate a compiled representation of the logic instructions;

instantiating a feature object embodying the compiled representation;

instantiating a context object in response to a boundary event with respect to the call service, the context object maintaining information regarding a present state of the call service, the context object signaling the feature object to access the compiled representation and to effect execution of the call service defined by the logic instructions, and passing notification of at least selected events to the context object, wherein the textual description defines a set of rules and actions for providing the call service, said rules and actions corresponding to a call policy associated with a subscriber.

10. The method of claim 9, wherein the call service is any of a call, a call feature, and subscriber or feature administration.

11. The method of claim 9, wherein the event is a call progress event occurring with respect to the call service.

12. The method of claim 9, wherein the feature context object maintains information regarding the present state of an on-going telecommunications service.

13. The method of claim 9, wherein the mark-up language is any of HTML, XML, or any extension thereof.

* * * * *